United States Patent
Noureldin

(10) Patent No.: US 8,032,262 B2
(45) Date of Patent: *Oct. 4, 2011

(54) SYSTEM, METHOD, AND PROGRAM PRODUCT FOR SYNTHESIZING NON-CONSTRAINED AND CONSTRAINED HEAT EXCHANGER NETWORKS

(75) Inventor: Mahmoud Bahy Noureldin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 12/767,217

(22) Filed: Apr. 26, 2010

(65) Prior Publication Data

US 2011/0087475 A1    Apr. 14, 2011

Related U.S. Application Data

(63) Continuation-in-part of application No. 12/575,743, filed on Oct. 8, 2009, now Pat. No. 7,729,809.

(60) Provisional application No. 61/256,754, filed on Oct. 30, 2009.

(51) Int. Cl.
*G06F 19/00* (2011.01)
*G05D 11/00* (2006.01)

(52) U.S. Cl. ........ 700/299; 700/300; 165/101; 165/203; 165/279

(58) Field of Classification Search .......... 700/299, 700/300; 165/101, 203, 279

See application file for complete search history.

(56) References Cited

U.S. PATENT DOCUMENTS

| | | | |
|---|---|---|---|
| 5,517,428 A | 5/1996 | Williams | |
| 6,785,633 B2 | 8/2004 | Patanian | |
| 7,103,452 B2 | 9/2006 | Retsina | |
| 7,657,347 B2* | 2/2010 | Campbell et al. | 700/300 |
| 7,698,022 B2 | 4/2010 | Noureldin | |
| 2004/0074850 A1* | 4/2004 | Kelly | 210/806 |
| 2008/0257537 A1* | 10/2008 | Hatta et al. | 165/263 |

FOREIGN PATENT DOCUMENTS

| | | |
|---|---|---|
| CN | 101206754 A | 6/2008 |
| JP | 2004272347 A | 9/2004 |
| WO | W00108054 A | 2/2001 |

OTHER PUBLICATIONS

"Simultaneous optimization models for heat integration—II. Heat exchanger network synthesis", Yee et al, Carnegie Mellon University, Computers & Chemical Engineering, vol. 14, Issue 10, pp. 1165-1184, Jun. 1990.*

"On the optimum heat exchanger sizing for heat recovery", Soylemez et al, University of Gasiantep, Turkey, Elsevier Science Ltd, Apr. 1999.*

(Continued)

*Primary Examiner* — Michael D Masinick
(74) *Attorney, Agent, or Firm* — Bracewell & Giuliani, LLP

(57) ABSTRACT

Systems, methods, and program product to synthesize a grass-roots heat exchanger network for a plurality of hot process streams to be cooled and a plurality of cold process streams to be heated according to a plurality of utilities targets, are provided. An exemplary system includes a heat exchange network synthesizing computer and heat exchange network synthesizing program product configured to analyze the waste heat recovery problem without decomposition to produce a result having an optimal number of network heat exchanger units through application of advanced process-to-process matching schemes for both non-constrained and non-thermodynamically constrained problems.

37 Claims, 41 Drawing Sheets

OTHER PUBLICATIONS

"A global MINLP optimization algorithm for the synthesis of heat exchanger networks with no stream splits", Zamora et al, Carnegie Mellon University, Oct. 1996.*

Furman, K.; A Critical Review and Annotated Bibliography for Heat Exchanger Network Synthesis in the 20th Century, Ind. Eng. Chem. Res. 2002, 41, 2335-2370.

Gundersen, T.; The Synthesis of Cost Optimal Heat Exchanger Networks, Comput. chem.Engng., vol. 12, No. 6, pp. 503-530, 1988.

Yerramsetty, K.; Synthesis of Cost Optimal Heat Exchanger Networks Using Differential Evolution, Computers & Chemical Engineering 32 (2008) pp. 1861-1876.

* cited by examiner

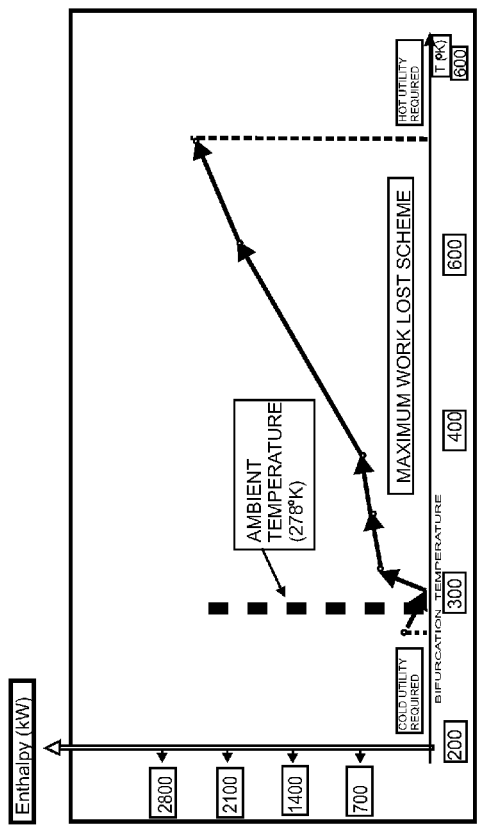
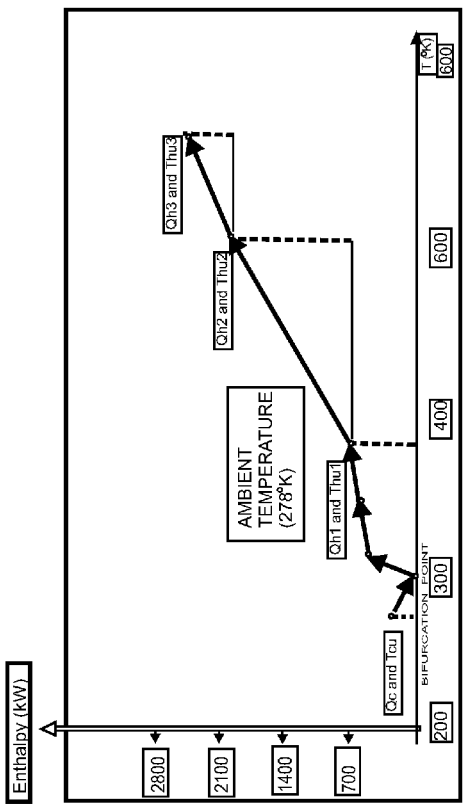
FIG. 4A.
FIG. 4B.

PINCH DESIGN WITH SOFTWARE
OPTIMIZATION USES 8 HEAT EXCHANGERS

FIG. 14.   NUMBER OF HEAT EXCHANGERS USED IS 5.

PINCH DESIGN WITH SOFTWARE
OPTIMIZATION USES 4 HEAT EXCHANGERS

PINCH DESIGN FOLLOWED BY SOFTWARE
OPTIMIZATION USES 6 HEAT EXCHANGERS

NETWORK USES 10 HEAT EXCHANGERS

FIG. 24.    NUMBER OF HEAT EXCHANGERS USED IS 7.

PINCH DESIGN FOLLOWED BY SOFTWARE
OPTIMIZATION USES 7 HEAT EXCHANGERS

FIG. 27.   NUMBER OF HEAT EXCHANGERS USED IS 5.

FIG. 34. SAME NUMBER OF HEAT EXCHANGERS

FIG. 39.   THREE PROCESS-TO-PROCESS HEAT EXCHANGERS, TWO COOLERS, AND TWO HEATERS.

FIG. 40. — THREE PROCESS-TO-PROCESS HEAT EXCHANGERS, BUT ONLY ONE COOLER AND TWO HEATERS
— SAME PROCESS STRUCTURE BUT DIFFERENT LOADS.

*FIG. 41.* — THREE PROCESS-TO-PROCESS HEAT EXCHANGERS, BUT ONLY ONE COOLER AND ONE HEATER
— SAME STRUCTURE BUT DIFFERENT LOADS.

- THREE PROCESS-TO-PROCESS HEAT EXCHANGERS, ONE COOLER, AND ONE HEATER.
- SAME STRUCTURE BUT DIFFERENT LOADS.

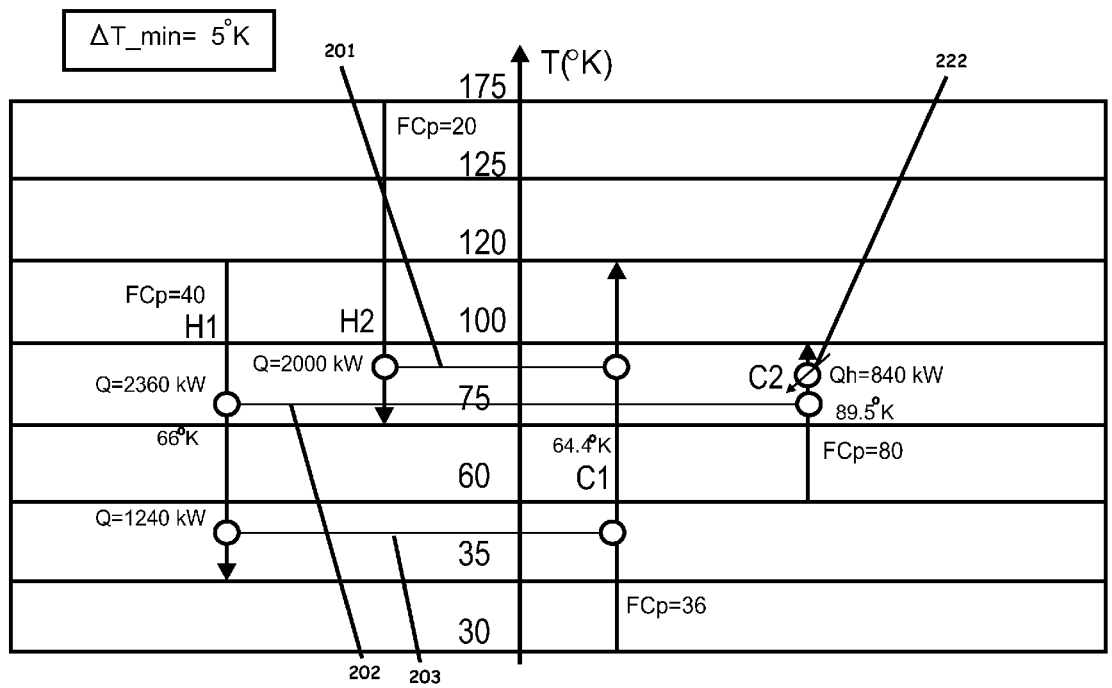
FIG. 43. -THREE PROCESS-TO-PROCESS HEAT EXCHANGERS, BUT ONLY ONE HEATER
-SAME STRUCTURE BUT DIFFERENT LOADS.

SYSTEM, METHOD, AND PROGRAM PRODUCT FOR SYNTHESIZING NON-CONSTRAINED AND CONSTRAINED HEAT EXCHANGER NETWORKS

RELATED APPLICATIONS

This application is a non-provisional of and claims priority to U.S. Provisional Patent Application No. 61/256,754, filed Oct. 30, 2009, titled "System, Method, and Program Product for Synthesizing Non-Constrained and Constrained Heat Exchanger Networks and Identifying Optimal Topology for Future Retrofit"; is a continuation-in-part of and claims priority to in the benefit of U.S. patent application Ser. No. 12/575,743, filed Oct. 8, 2009, titled "System, Method, and Program Product for Targeting and Identification of Optimal Process Variables in Constrained Energy Recovery Systems"; and is related to U.S. patent application Ser. No. 12/767,275, filed Apr. 26, 2010, titled "System, Method, and Program Product for Synthesizing Non-Thermodynamically Constrained Heat Exchanger Networks," U.S. patent application Ser. No. 12/767,315, filed Apr. 26, 2010, titled "System, Method, and Program Product for Synthesizing Heat Exchanger Networks and Identifying Optimal Topology for Future Retrofit," U.S. patent application Ser. No. 12/715,255, filed Mar. 1, 2010, titled "System, Method and Program Product For Targeting and Optimal Driving Force Distribution in Energy Recovery Systems," U.S. patent application Ser. No. 11/768,084, filed Jun. 25, 2007, now U.S. Pat. No. 7,698,022, titled "System, Method, and Program Product for Targeting an Optimal Driving Force Distribution in Energy Recovery Systems," and U.S. Patent Application No. 60/816,234, filed Jun. 23, 2006, titled "Method and Program Product for Targeting and Optimal Driving Force Distribution in Energy Recovery Systems," each incorporated herein by reference in its entirety.

BACKGROUND OF THE INVENTION

1. Field of the Invention

The present invention relates in general to the field of energy recovery systems, and in particular, to systems, program product, and methods related to synthesizing a heat exchanger network for a process or cluster of processes including a plurality of hot process streams to be cooled and a plurality of cold process streams to be heated.

2. Description of the Related Art

Many different types of processes consume multiple steam levels and electricity to obtain an output result, or to produce a required product or compound. For large-scale processes that, for example, consume significant amounts of fuel steam, it is preferable to optimize the consumption of energy through careful operation, design or reconfiguration of the plant and the equipment used. Further, in some industrial manufacturing processes, specific streams of material flows need to be supplied to different types of equipment and machinery at specific temperatures. These material flows may need to be heated or cooled from an original starting or supply temperature to a target temperature. This, in turn, will require the consumption of steam to heat specific streams and consumption of water, for example, to cool down specific streams.

The total energy employed or consumed by the industrial manufacturing processes can be optimized to a global minimal level, for example, through careful placement and configuration of specific material streams with respect to one another. There may be, for example, the potential for hot streams that require cooling to be placed in proximity with cold streams that require heating. Streams having thermal energy already present that need to be removed (waste heat) or streams that need to have heat added can be associated with one another to optimize the energy consumption of the process. A network of heat exchangers can be synthesized to provide a medium for utilizing this waste heat to provide heat to those streams that need to have heat added. This heat exchanger network can be a very important sub-system in any new plant.

As such, the heat exchanger network synthesis problem has arguably been one of the most studied problems in the field of process synthesis in the last four decades. The systematic synthesis of heat exchangers network, however, has proven to be a challenging task. During the last three decades a considerable number of methods have been proposed and utilized in commercial software and/or academia. These methods are referenced in the two famous review papers of T. Gundersen and L. Naess, "The Synthesis of Cost Optimal Heat Exchanger Networks," Computers and Chemical Engineering, vol. 12, pp. 503-530 (1988), and of Kevin C. Furman and Nikolaos V. Sahinidis, "A Critical Review and Annotated Bibliography for Heat Exchanger Network Synthesis in the $20^{th}$ Century," Industrial Engineering & Chemistry Research vol. 41, pp. 2335-2370 (2002).

Other methodologies include mathematical programming-based methods. Although such methods have been in academia since the late eighties, they are still not widely used on a large scale in industrial applications for several reasons. The academics claim that the reasons behind this are: (1) that the computational requirements of such methods are substantial, especially for large problems; and (2) that the resultant solution, in general, can not guarantee globality. These two reasons might be considered the most important obstacles, but there are also other very important ones. Other significant obstacles include the black box nature of the methods, the assumptions regarding problem economics, the types of heat exchangers used in the network (shell & tube, twisted tube, plate and frame types, etc.), the need to know the several utilities types and temperatures beforehand, and the non-inclusive nature of the "transshipment model" used for streams matching and superstructure application. Use of the transshipment model can be seen clearly in superstructures that produce networks that exhibit the structures in which utilities heat exchangers are always at the terminals of the network. In superstructure construction where it is required for the designer to know ahead of time just how many times a stream or one of its branches are going to meet another stream, however, the transshipment model is inadequate as it does not include or account for various situations, such as, for example: those in which it would be beneficial to allow the optimization process to select the utility types and supply temperatures to be used; those in which it would be beneficial for one or more streams to change their identities; and those in which it would be beneficial for one or more utilities streams to effectively become process streams, and so on, or consider the effect of including such possibilities on such streams superstructures.

The state-of-the-art software widely used in industry for initial synthesis of the heat exchange network (HEN) includes, for example, an AspenTech Inc. product known as Aspen Pinch, a Hyprotech Inc. product known as HX-NET (acquired by AspenTech), a KBC product known as Pinch Express, and a UMIST product known as Sprint, which attempt to address the heat exchanger network synthesis problem, systematically, using the well known pinch design method, followed by an optimization capability that optimizes the initial design created by the pinch design method through use of streams split flows in streams branches and the global network heat recovery minimum approach temperature as optimization variables in a non-linear program to recover more waste heat, shift loads among heat exchangers to remove small units, redistribute the load among units, and optimize surface area, of course, always within the constraints of the topology determined using the pinch design method. The pinch design method, followed by the optimization capability method, or combination of methods, has seen wide spread acceptance in the industrial community due to its non-black box approach. That is, the process engineer is in the feedback loop of the design of the heat exchangers network such that process engineer can take design decisions that can change with the progress of the design.

Recognized by the inventor, however, is that in all applications of near pinch and multiple pinches problems to the above software applications, their respective calculations render a larger than optimal number of heat exchange units. Also recognized is that, in addition, software applications that use the pinch design method or that use the pinch design method as a basis for its initial design followed by the optimization option for branches and duties can not handle certain situations/constraints/opportunities that can render better economics, for example, from energy, capital, or both points of view, which means that some superior network designs will never be synthesized using such applications. For example, such software applications do not systematically handle or allow for: stream-specific minimum approach temperatures; situations in which a hot stream is matched with a hot stream and/or a cold stream is matched with one or more cold streams; or situations in which a hot stream is partially converted to a cold stream and/or a cold stream is partially converted to hot stream.

Accordingly, recognized by the inventor is the need for an improved method, system, or technique that can address any or all of the above optimization issues, particularly during the design stage, and which can minimize energy and capital costs for waste heat recovery through application of a systematic process prior to the actual design, construction or modification of actual plant and equipment. Particularly, recognized is the need for a new method in grassroots applications that can render in all cases, a network design including a number of the exchanger units that is less than or an equal number of heat exchanger units for the networks synthesized using the pinch design method, even when combined with heat exchanger duty and branch optimization options currently implemented in commercial software, for all types of problems, i.e., to include pinched problems, problems with near pinch applications, as well as multiple pinches problems, that need both heating and cooling utilities, and problems that need only cooling or only heating utility (called threshold problems).

Still further, recognized by the inventor is that such goals can be realized by employing a method, system, and program product which solves each of such problems, for example, as a single problem, rather than decomposing the problem into multiple separate problems such as, for example, an above-the-pinch problem, a below-the-pinch pinch problem, and an at or near the pinch problem, as is performed by the above described pinch applications, especially for problems that exhibit multiple pinches, pinch problems with near pinch applications, and threshold problems. Where the pinch design method performs matching at the pinch point, e.g., at a medial point along the temperature scale extending between maximum and minimum target and supply temperatures, and moves up on the temperature scale to complete the sub-problem above the pinch point, and then starts again at the pinch point and moves down at the temperature scale to complete the sub-problem below the pinch point, which can result in unnecessary constraints solved by splitting of streams and which can correspondingly result in a network with an excessive number of units, the inventor has recognized that by performing matching between the hot streams and utilities with the cold streams beginning, for example, at the highest temperature or temperature interval on the temperature scale and then proceeding from that point, top to bottom, the streams can be matched at the same temperature interval (where the temperature approach between the hot and cold streams are minimum), which can allow the balance/difference between the supply of the heat and the demand of the cold to be compensated for by a utility or utilities with the lowest possible supply temperature. It is further recognized that such approach can minimize the energy "quality" loss or the "degradation" in energy quality.

Also recognized by the inventor is that, rather than merely employing streams splitting to satisfy problem feasibility for matching, which results from a decomposition of the problem, streams splitting can instead be employed upon user request to reduce energy quality degradation due to undesirable matching of a hot stream at a certain temperature interval at the process sink region with one or more cold streams at lower temperature intervals.

Further, recognized by the inventor is that it is not only unnecessarily, but imprudent, to treat threshold problems that do not have pinch constraints as a pinch problem merely to generalize the pinch design method for handling all types of problems, as is the case in the pinch design method, because doing so creates a constrained situation in a problem that does not have such constraints. Such unnecessary addition of constraints resultingly necessitates splitting of streams at the factious pinch point again to satisfy the matching criteria at the pinch according to the pinch design method rules, which correspondingly results in a network with an excessive number of heat exchanger units. Accordingly, recognized by the inventor is the need for methods, systems, and program product that solve the threshold problems without treating such threshold problems, which do not have a pinch/constraint, as a pinched problem, and thus, can resultingly reduce the number of required heat exchanger units to a number below that of networks synthesized using the pinch design method.

It is further recognized by the inventor that it would be beneficial if the heat exchanger network design, according to such methods, systems, and program product, were also such that the network was configured to be "easily-retrofitable" in future times to allow for growth and/or for contingencies, for example, due to dramatic changes in energy prices. Notably, it is not believed that the pinch design method could adopt retrofitability during the design stage as it does not have a systematic method to select an optimal set of stream specific minimum temperature, either in general, or based upon a trade-off between capital and energy costs, in particular, and because its pinch design philosophy starts the design of the network only after selecting an optimal network global minimum approach temperature using, for example, the "SUPERTARGET" method which targets for both energy consumption and the heat exchanger network area at the same time. Even by repeating such sequential philosophy using the global minimum temperature approach, the resulting new network structure would not be expected to consistently resemble the previous network structure, in class, and thus, would result in a requirement for an undue expenditure in network reconciliation efforts, to try to form a continuum of common-structure heat exchanger network designs which can be used to facilitate user selection of a physical heat exchanger network structure satisfying both current user-selected economic criteria and anticipated potential future retrofit requirements and corresponding physical heat exchanger network development and facility surface area of allotment based upon such selected design.

SUMMARY OF THE INVENTION

In view of the foregoing, various embodiments of the present invention advantageously provide improved methods, systems, and program product configured for theoretical, practical and economical synthesis of a grass-roots heat exchanger network for a plurality of hot process streams to be cooled and a plurality of cold process streams to be heated according to a plurality of utilities energy targets, to produce a result of having an optimal number of network heat exchangers (heat exchanger units) that is less than, or at least no more than, the number of network heat exchanger units synthesized using the pinch design method, even when combined with duty and branches optimization options currently implemented in commercial software, for all types of problems, i.e., problems that need both heating and cooling utilities (pinch problems, problems with near pinch applications, as well as problems with multiple pinches) and the problems that only need cooling or heating utility (called threshold problems), and to produce a network configured to be made "easily-retrofitable" in future times to allow for growth and/or contingencies, for example, due to, e.g., dramatic changes in energy prices.

Various embodiments of the present invention also advantageously provide improved methods, systems, and program product that can process/employ certain situations/constraints/opportunities that can render better economics from an energy point of view, capital point of view, or both energy and capital points of view, such as, for example: stream-specific minimum temperature approaches (values) $\Delta T_{min}^i$, e.g., considered as optimization parameters (where the superscript "i" represents the specific hot stream); situations in which a hot stream is matched with one or more hot streams and/or a cold stream is matched with one or more cold streams; or situations in which a hot stream is partially converted to a cold stream and/or a cold stream is partially converted to hot stream, to thereby render a heat exchanger network having an optimal number of the exchangers. Various embodiments of the present invention beneficially also provide an improved method, system and program product to synthesize a heat exchanger network, which can employ streams splitting to reduce energy quality degradation caused by matching a hot stream at a certain temperature interval at the process sink region with one or more cold streams at lower temperature intervals.

Various embodiments of the present invention also advantageously provide improved methods, systems, and program product to synthesize a heat exchanger network, that can solve the heat exchanger network synthesis problem, for example, as a single problem, rather than decomposing the problem into multiple separate problems, which can cause unnecessary constraints solved by splitting of streams, which in turn results in a network with an excessive number of units, especially for problems that exhibit multiple pinches, pinch problems with near pinch applications, and threshold problems.

Various embodiments of the present invention also advantageously provide improved methods, systems, and program product to synthesize a heat exchanger network, that can minimize the energy "quality" loss or "degradation" in energy quality, for example, by performing matching between the hot process streams and hot utilities with the cold process streams starting at the highest temperature/temperature interval on the temperature scale and then proceeding from the top to the bottom; and matching streams at the same temperature interval where the temperature approach between the hot and cold streams is minimum. Advantageously, this can allow the balance/difference between the supply of the hot process streams and the demand of the cold process streams to be compensated by a utility or utilities with the lowest possible supply temperature.

Various embodiments of the present invention also advantageously provide improved methods, systems and program product to synthesize a heat exchanger network, which can solve threshold problems (problems that only need cooling utility or only need heating utility) without treating such threshold problems (which do not have a pinch constraint or constraints) as a pinch problems to thereby resultingly reduce the number of required heat exchanger units over that of networks synthesized using the pinch design method.

Specifically, various embodiments of the present invention provide systems to synthesize a grass-roots heat exchanger network for a plurality of hot process streams to be cooled and a plurality of cold process streams to be heated according to a plurality of global utilities targets (e.g., utilities energy consumption targets). According to an embodiment of the present invention, such a system can include a heat exchange network synthesizing computer having a processor, and memory coupled to the processor to store software and database records therein, and a database stored in memory (volatile or nonvolatile, internal or external) assessable to the energy modeling computer. The database can include a plurality of operational attributes for each of a plurality of hot resource streams and for each of a plurality of cold resource streams. The operational attributes can include, for example, a discrete supply temperature (Ts) and/or a lower and an upper boundary value for the supply temperature interval (Ts[L:U]) of each of the hot process streams and each of the cold process streams, a discrete target temperature (Tt) and/or a lower and an upper boundary value for a target temperature interval (Tt[L:U]) for each of the hot process streams and each of the cold process streams, and a discrete heat capacity flow rate (FCp) and/or a lower and an upper boundary value for a heat capacity flow rate interval (FCp[L:U]) for each of the hot process streams and each of the cold process streams, and a corresponding enthalpy value or a minimum and maximum enthalpy value, e.g., if any range or set data was provided/received for one or more of the other operational attributes. According to an example of an embodiment of the system, for cold streams, supply temperature (Ts) and the target temperature (Tt) can be in the form of actual supply and target temperatures, while for hot streams, the supply temperature (Ts) and the target temperature (Tt) can be real values minus a user-selected minimum.

The data can also include discrete, interval, and/or dual stream specific minimum temperature approach values ($\Delta T_{min}^i$) for each the hot process streams provided individually, for example, as a plurality of individual sets of one or more stream specific minimum approach temperature values each associated with a different one of the plurality of hot process streams, and/or as a combined set of stream specific minimum temperature approach values. The data can further include a list of stream initial types for each of the plurality of hot process streams and each of the plurality of cold process streams. Still further, the data can include a list of one or more constrained process streams constrained from matching at least one other resource stream due to a non-thermodynamic constraint (e.g., a list forbidden matches).

The system can also include heat exchange network synthesizing program product either on a separate deliverable computer readable medium, e.g., DVD, etc., or stored in the memory of the heat exchange network synthesizing computer and adapted to employ various process matching schemes/techniques to provide close to optimal heat exchanger network designs to optimize energy recovery for the process and/or minimize energy utility requirements for the most important energy utility or of both heating and cooling energy utilities. The heat exchange network synthesizing program product can include instructions that when executed, for example, by the heat exchange network synthesizing computer, can cause the computer to perform various operations to include receiving a plurality of operational attributes for each of a plurality of hot and cold process streams, e.g., forming at least a substantial portion of all major process streams in a facility, receiving indicia of at least one minimum temperature approach value for each separate one of a plurality of process streams, receiving indicia of one or more non-thermodynamic streams matching constraints (i.e., a list of forbidden matches), and/or receiving indicia of the stream initial types.

The operational attributes can include a heat capacity flow rate, a supply temperature, a desired target temperature, and enthalpy for each of the plurality of the hot and cold process streams. The indicia of at least one minimum temperature approach value for each of the plurality of resource streams (e.g., hot and/or cold process streams) can include indicia of a plurality of discrete stream-specific minimum temperature approach values each separately assigned to a different one of the plurality of resource streams, with each discrete value typically being different between some hot process-to-cold process matches but the same for one or more others, but also capable of being different between all hot process-cold process stream matches, the same between all hot process-cold process stream matches, or the same between all hot process-hot process stream matches and/or cold process-cold process stream matches, but different from the hot process-cold process stream matches, etc. The indicia of at least one minimum temperature approach value can also or alternatively include indicia of a plurality of sets of at least two stream-specific minimum temperature approach values, e.g., defining a range of stream-specific minimum temperature approach values, with each set separately assigned to a different one of the plurality of process (e.g., hot) streams. The at least one minimum temperature approach value can further also or alternatively include indicia of a plurality of sets of dual stream minimum temperature approach values, e.g., each separately assigned to a different one of the plurality of process (e.g., hot) streams. Note, when discrete specific or discrete global minimum temperature approach values are employed, the values can be assigned directly through an assignment function or indirectly, at least initially, by entering supply and/or target temperature values pre-adjusted for the assigned minimum approach temperature values.

The operations can also include matching a plurality of hot process streams and a plurality of cold process streams to attain one or more global utilities targets (e.g., utilities energy consumption targets), and determining an initial heat exchanger network design responsive to matching the plurality of hot process streams and the plurality of cold process streams. The operations can also include removing any redundant process-to-process heat exchangers from the initial design, when existing, responsive to determining an initial heat exchanger network design, merging same-stream utility heat exchangers when two or more same-stream utility heat exchangers exist responsive to determining an initial heat exchanger network design, and providing a final heat exchanger network design responsive to one or more of the following: determining the initial heat exchanger network design, removing any existing redundant process to process heat exchangers from the initial design, and merging the two or more same-stream utility heat exchangers, when existing.

The matching, according to one or more embodiments of the program product, can include a matching scheme including one or more combinations of the following operations: matching each hot process stream having a higher starting temperature prior to matching each other hot process stream having a cooler starting temperature, matching each hot process stream with a cold process stream having a heating requirement substantially similar to the respective hot process stream, when existing (e.g., streams that cancel each other or one of them with a minimum quality degradation), matching each hot process stream with a cold process stream having a maximum overlap with the respective hot process stream, when existing, matching each hot process stream with a cold process stream having a heat capacity flow rate FCp substantially equal to that of the respective hot process stream, when existing, matching each hot (or cold) process stream having a high heat capacity flow rate FCp and high overall heat transfer coefficient Us with a cold (or hot) process stream having a low heat capacity flow rate FCp and low overall heat transfer coefficient Us, matching one of the plurality of cold process streams with one or more other of the plurality of cold process streams to achieve one or more utility optimization objectives, and matching one of the plurality of hot process streams with one or more other of the plurality of hot process streams to achieve one or more utility optimization objectives.

The operations, according to one or more embodiments of the program product, can also or alternatively include converting a pair of stream types from being "heterogeneous" with mono-matching capability to being homogeneous and having bi-matching capability, splitting one of the plurality of hot process streams into a plurality of hot process sub-streams for the respective hot process stream and matching one of the plurality of hot process sub-streams with a cold process stream or sub-stream to enhance heat transfer between streams to be matched, splitting one of the plurality of cold process streams into a plurality of cold process sub-streams for the respective cold process stream and matching one of the plurality of cold process sub-streams with a hot process stream or sub-stream to enhance heat transfer between streams to be matched, switching a stream target temperature from a desired target temperature value for a corresponding process stream to an alternate target temperature value to provide the stream an added heating or cooling capability for processing to achieve one or more utility optimization objectives directly affected by application of the alternative target temperature value that at least partially offsets an inefficiency resulting from one or more non-thermodynamic stream matching constraints and returning the temperature value to the desired target temperature value after utilizing the added heating or cooling capability, and/or switching a stream supply temperature from an actual supply temperature value for a corresponding process stream to an alternate supply temperature value to provide the stream an added heating or cooling capability for processing to achieve one or more utility optimization objectives directly affected by application of the alternative supply temperature value that at least partially offsets an inefficiency resulting from the one or more non-thermodynamic stream matching constraints and returning the temperature value to the actual supply temperature value after utilizing the added heating or cooling capability.

The operations, according to one or more embodiments of the program product, can also, or alternatively, include identifying one or more utility energy consumption targets, and identifying operational attributes of resource streams used within a process in the heat exchanger network which affect the number of heat exchangers units used in the process.

The operations, according to one or more embodiments of the program product, can also, or alternatively, include identifying a low-quality utility suitable to replace at least a portion of a load on a high-quality utility to thereby minimize overall utilities costs, and increasing the number of required heat exchangers responsive to identifying the low-quality utility.

Various embodiments of the present invention also include methods of synthesizing a grass-roots heat exchanger network for a plurality of hot process streams to be cooled and a plurality of cold process streams to be heated according to a plurality of utilities targets. A method, according to an embodiment of the present invention, can include the steps of receiving operational attributes for each of a plurality of hot and a plurality of cold process streams, a list of stream initial types, and a list of non-thermodynamic constraints when existing. The method also includes matching the plurality of hot process streams and the plurality of cold process streams to attain one or more utilities energy consumption targets, and determining an initial heat exchanger network design responsive to the step of matching the plurality of hot process streams and the plurality of cold process streams. The method can further include removing any redundant process-to-process heat exchangers from the initial design when existing responsive to the step of determining an initial heat exchanger network design, merging same-stream utility heat exchangers when two or more same-stream utility heat exchangers exist responsive to the step of determining an initial heat exchanger network design, and providing a final heat exchanger network design responsive to one or more of the steps of determining an initial heat exchanger network design, removing any redundant process to process heat exchangers from the initial design when existing, and merging two or more same-stream utility heat exchangers when existing.

The matching, according to one or more embodiments of a method, can include a matching scheme including at least one, but more typically, one or more combinations of following steps: matching each hot stream having a higher starting temperature prior to matching each other hot stream having a cooler starting temperature, matching each hot stream with a cold stream having a heating requirement substantially similar to the respective hot stream when existing (e.g., streams that cancel each other or one of them with a minimum quality degradation), matching each hot stream with a cold stream having a maximum overlap with the respective hot stream when existing, matching each hot stream with a cold stream having a heat capacity flow rate FCp that is substantially equal to that of the respective hot stream when existing, matching each hot stream with a high (or low) heat capacity flow rate FCp and high (or low) overall heat transfer coefficient Us with a cold stream having a low (or high) heat capacity flow rate FCp and low (or high) overall heat transfer coefficient Us, matching one of the plurality of cold streams with one or more other of the plurality of cold streams to achieve one or more utility optimization objectives, and matching one of the plurality of hot streams, with one or more other of the plurality of hot streams to achieve one or more utility optimization objectives.

The steps, according to one or more embodiments of the method, can also include converting a pair of stream types from being "heterogeneous" with mono-matching capability to being homogeneous and having bi-matching capability. Specifically, the steps can include converting a pair of stream types of a pair of the plurality of hot process streams from being heterogeneous with mono-matching capability to being homogeneous and having bi-matching capability, and/or converting a pair of stream types of a pair of the plurality of cold process streams from being heterogeneous with mono-matching capability to being homogeneous and having bi-matching capability.

The steps, according to one or more embodiments of the method, can also include splitting one of the plurality of hot process streams into a plurality of hot process sub-streams for the respective hot process stream and matching one of the plurality of hot process sub-streams with a cold process stream or sub-stream to enhance heat transfer between streams to be matched, and/or splitting one of the plurality of cold process streams into a plurality of cold process sub-streams for the respective cold process stream and matching one of the plurality of cold process sub-streams with a hot process stream or sub-stream to enhance heat transfer between streams to be matched.

The steps, according to one or more embodiments of the method, can also include switching a stream target temperature for a corresponding process stream from a desired target temperature value to an alternate target temperature value for processing to achieve one or more utility optimization objectives directly affected by application of the alternative target temperature value that at least partially offsets an inefficiency resulting from one or more non-thermodynamic stream matching constraints and returning the temperature value of the corresponding process stream to the desired target temperature value, and/or switching at least one stream supply temperature from an actual supply temperature value to an alternate supply temperature value for processing to achieve one or more utility optimization objectives directly affected by application of the alternative supply temperature value that at least partially offsets an inefficiency resulting from the one or more non-thermodynamic stream matching constraints and returning the temperature value of the corresponding process stream to the actual supply temperature value.

The steps, according to one or more embodiments of the method, can also or alternatively include the steps of identifying one or more utility energy consumption targets, and identifying operational attributes of resource streams used within a process which affect the number of heat exchangers units used in the process. Further, the steps, according to one or more embodiments of the method, can also or alternatively include identifying a low-quality utility suitable to replace at least a portion of a load on a high-quality utility to thereby minimize overall utilities costs, and increasing the number of required heat exchangers responsive to the step of identifying the low-quality utility.

According to another embodiment of the present invention, a method of synthesizing a grass-roots heat exchanger network for a plurality of hot process streams to be cooled and a plurality of cold process streams to be heated according to a plurality of utilities targets can include the steps of receiving a plurality of operational attributes including a heat capacity flow rate, a supply temperature, and a target temperature for each of a first plurality of hot process streams and for each of a first plurality of cold process streams, and at least one minimum temperature approach value for each of the first plurality of the hot process streams, matching the first plurality of hot streams and the first plurality of cold streams to attain one or more utilities energy consumption targets, and determining an initial heat exchanger network design responsive to the step of matching the plurality of hot process streams and the plurality of cold process streams.

According to an embodiment of the method, the at least one minimum temperature approach value for each of the first plurality of hot process streams can include one or more of the following: a plurality of discrete stream-specific minimum temperature approach values separately assigned to each separate one of the first plurality of hot process streams whereby at least one of the stream-specific minimum temperature approach values assigned to a corresponding at least one of the first plurality of hot process streams is different from at least one other of the plurality of stream-specific minimum temperature approach values assigned to a corresponding at least one other of the first plurality of hot process streams; a plurality of sets of at least two stream-specific minimum temperature approach values defining a range of stream-specific minimum temperature approach values assigned to each separate one of the first plurality of hot process streams; and a plurality of sets of dual stream minimum temperature approach values assigned to each separate one of the plurality of hot process streams. Note, when discrete specific or discrete global minimum temperature approach values are employed, the values can be assigned directly through an assignment function or indirectly by entering supply and/or target temperature values pre-adjusted for the assigned minimum approach temperature values.

Further, according to an embodiment of the method, the matching can be provided by a matching scheme including the steps of: specifically matching each hot process stream of the first plurality of hot process streams having a higher starting temperature prior to matching each other hot process stream of the first plurality of hot process streams having a cooler starting temperature, specifically matching each of a second plurality of the hot process streams with a corresponding one of a second plurality of the cold process streams having a heating requirement substantially equal to a cooling requirement for the respective hot process stream when so existing, specifically matching each of a third plurality of the hot process streams with a corresponding one of a third plurality of the cold process streams having a maximum overlap with the respective hot process stream when so existing, specifically matching each of a fourth plurality of the hot process streams with a corresponding one of a fourth plurality of the cold process streams having substantially equal heat capacity flow rates with the respective hot process stream when so existing, and specifically matching each of a fifth plurality of the hot process streams each having a high heat capacity flow rate and high overall heat transfer coefficient with a fifth plurality of the cold process stream each having a low heat capacity flow rate and low overall heat transfer coefficient.

According to another embodiment of the present invention, a method of synthesizing a grass-roots heat exchanger network for a plurality of hot process streams to be cooled and a plurality of cold process streams to be heated can include the steps of receiving a plurality of operational attributes for each of a plurality of hot and cold process streams, a list of one or more non-thermodynamic streams matching constraints, and optionally, a list of stream initial types. The method can also include the steps of matching at least a subset of the plurality of hot process streams and the plurality of cold process streams to attain the plurality of utilities energy consumption targets, and providing a heat exchanger network design responsive to the matching. The step of matching can include a matching scheme including one or more of the following steps: employing homogeneous matching to account for (overcome) one or more non-thermodynamic stream matching constraints to thereby reduce one or more utility consumption requirements, and employing streams designation switching to account for (overcome) one or more non-thermodynamic stream matching constraints. The matching scheme can also include analyzing a potential reduction in one or more utility consumption requirements related to employing one or more buffers between one or more pairs of process streams to account for the one or more non-thermodynamic stream matching constraints to thereby determine if employment of the one or more buffers would provide an improvement over employment of the homogeneous matching and/or the streams designation switching (advanced consumption reduction methods), and can correspondingly include employing one or more buffers between the one or more of the process streams responsive to determining that the employment of the one or more buffers provides one or more utility consumption reductions over that provided by the one or more advanced consumption reduction methods.

According to another embodiment of the present invention, a method of synthesizing a grass-roots heat exchanger network for a plurality of hot process streams to be cooled and a plurality of cold process streams to, be heated can include the steps of receiving a plurality of operational attributes for each of a plurality of hot and cold process streams, a list of one or more non-thermodynamic streams matching constraints, and a list of stream initial types. The method can also include the steps of converting a pair of stream types of a pair of the plurality of hot process streams from being heterogeneous with mono-matching capability to being homogeneous and having bi-matching capability, and/or converting a pair of stream types of a pair of the plurality of cold process streams from being heterogeneous with mono-matching capability to being homogeneous and having bi-matching capability.

The steps can also or alternatively include switching a stream target temperature for a corresponding process stream from a desired target temperature value to an alternate target temperature value for processing to achieve one or more utility optimization objectives directly affected by application of the alternative target temperature value that at least partially offsets an inefficiency resulting from one or more non-thermodynamic stream matching constraints and returning the temperature value of the corresponding process stream to the desired target temperature value, and/or switching at least one stream supply temperature from an actual supply temperature value to an alternate supply temperature value for processing to achieve one or more utility optimization objectives directly affected by application of the alternative supply temperature value that at least partially offsets an inefficiency resulting from the one or more non-thermodynamic stream matching constraints and returning the temperature value of the corresponding process stream to the actual supply temperature value.

Advantageously, various embodiments of the present invention include provisions for rendering, in all anticipated cases of heat exchanger network synthesis for near pinch or multiple pinches cases, a lesser number of heat exchange units than possible using state-of-the-art software employing the pinch design method. Various embodiments of the present invention can advantageously handle cases that can not be handled systematically using the pinch design method, such as, for example, heat exchangers network synthesis for configurations employing stream-specific approach temperatures. Also, according to various embodiments of the present invention, and in contrast to the transshipment model, the number of utilities, types, and supply temperatures are not needed in order to initiate the optimization process. Such topology can advantageously be selected during a matching task that defines, not only the process-to-process matches, but also the process-to-utilities matches using different utilities types and levels/supply temperatures with required quantities and the respective utility-to-process user-desired minimum approach temperatures (minimum temperature approach values).

Various embodiments of the present invention also introduce systematically advanced solutions for heat exchanger network constrained problems through the optimal manipulation/exploitation of stream types that can be in some range converted from being "heterogeneous" with mono-matching capability to being homogeneous and having bi-matching capability using a new stream switching algorithm for advanced waste heat recovery on constrained heat integration problems. According to various embodiment of the present invention, stream identity can be used as an optimization variable in non-thermodynamically constrained problems whereby a hot stream can be switched to a cold stream to be heated (to a cold stream identity), at a certain temperature level. The stream, according to its new identity as a cold stream, can be matched with one or more streams including those also having different identities, before it is returned back to its original identity as a hot stream. Such approach can be utilized for cold streams to be heated which can be assigned to act as a cold stream for a certain temperature range; and then switching its identity to become a hot stream to be cooled to be matched with one or more cold streams or branches of cold streams so that the stream can act as a hot stream for another certain temperature range before it is returned back to its original identity as a cold stream to thereby allow it to reach its originally desired target temperature.

Advantageously, various embodiments of the present invention introduce systematic methods for grassroots non-thermodynamically constrained and thermodynamically constrained heat exchangers network synthesis with easy-to-implement future retrofit in mind. Such embodiments of the present invention can advantageously provide for designer control of the synthesis of the network without forcing him/her to use assumptions that confine the synthesized network to specific inferior structures due to the use of inconclusive superstructure calculations as is currently employed in most of the mathematical programming-based software. Various embodiments of the present invention can advantageously provide the necessary tools to handle industrial-size problems normally faced in industrial applications, and tools to allow the designer to test his/her novel solutions for network synthesis that suffer constrained situations affecting energy consumption to thereby find advanced solutions for waste heat recovery, and in some cases, substantial capital cost reductions.

Advantageously, various embodiments of the present invention exhibit substantial improvements in capability over that of the pinch design method, while still keeping the process engineer in the loop of designing his/her heat exchanger network. Various embodiments of the present invention also render on the conceptual level, several improvements over the pinch design method. For example, while the pinch design method cannot account for or employ (1) stream-specific minimum approach temperatures, (2) situations in which a hot stream is matched with another hot stream and/or a cold stream is matched with another cold stream, and (3) situations in which a hot stream is partially converted to a cold stream and/or a cold stream is partially converted to a hot stream, various embodiments of the present invention can indeed manage such constraints/configuration profiles, systematically, to synthesize an improved heat exchanger network design over that possible using prior methodologies. Further, by solving the problem as a single problem, rather than decomposing the problem into an above-the-pinch problem, a below-the-pinch problem, and an at or near the pinch problem, as is done in the various pinch design methods, various embodiments of the present invention can render at least a lesser number of heat exchange units for the same energy targets compared with networks synthesized using the pinch design method, as well as render network configurations that facilitate easy-to-implement future retrofit. This is particularly the case for the problems that exhibit multiple pinches, for pinch problems with near pinch applications, and for threshold problems. Still further, such advanced systematic methods/techniques can advantageously benefit the heat exchangers network synthesis and waste heat recovery applications of non-constrained, thermodynamically constrained, and non-thermodynamically constrained new plant designs and its future retrofit in a dynamic world of significant changes in energy availability and prices.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 4A is a graph illustrating changes in enthalpy as a function of temperature according to an embodiment of the present invention;

FIG. 4B is a graph illustrating changes in enthalpy as a function of temperature according to an embodiment of the present invention;

FIG. 36 is a schematic diagram illustrating an application of cold-hot stream switching to enhance synthesis of the heat exchanger network for the industrial process shown in. FIG. 35 according to an embodiment of the present invention;

FIGS. 39-43 are schematic diagrams illustrating an application of successively lower minimum temperature approach values to the same industrial process to produce a series of heat exchanger networks each having a common process-to-process heat exchanger network structure according to an embodiment of the present invention.

DETAILED DESCRIPTION

Figure 1:
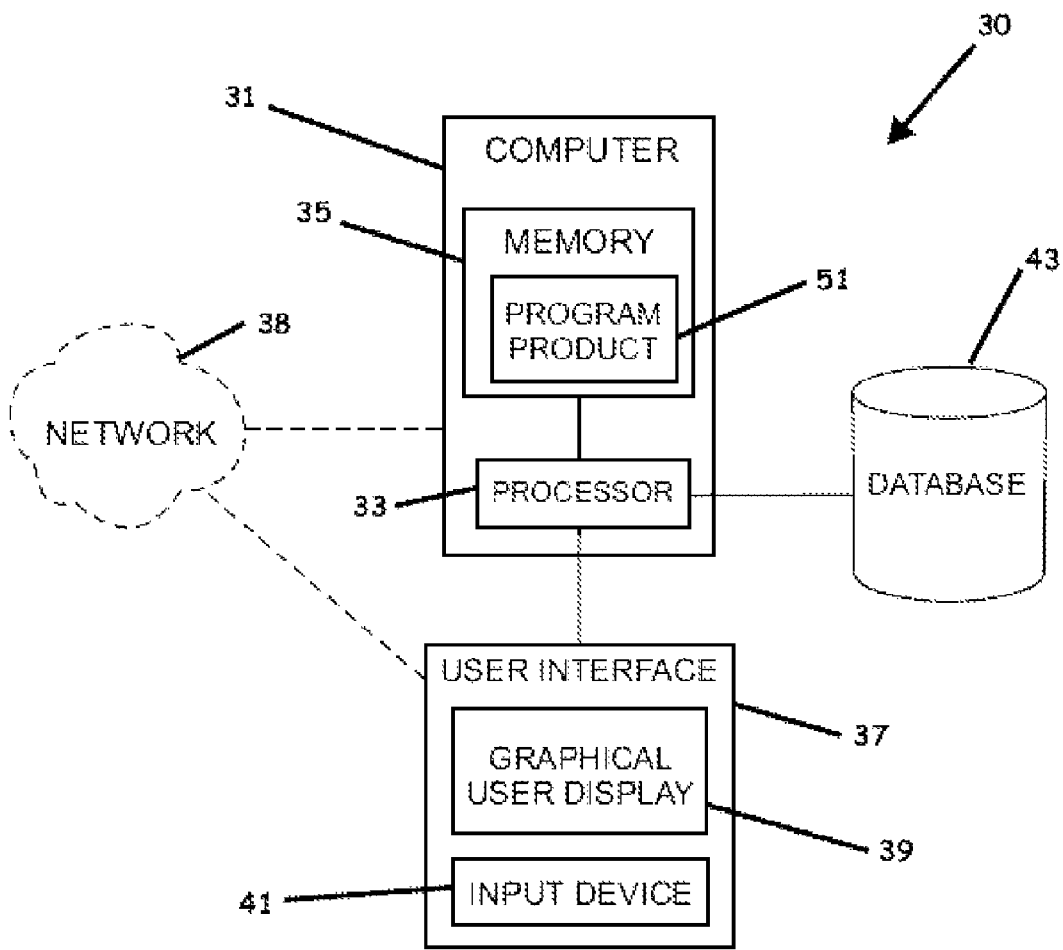
FIG. 1 is a schematic block diagram of a system to synthesize a grass-roots heat exchanger network for a plurality of hot process streams to be cooled and a plurality of cold process streams to be heated according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

As noted previously, the total energy employed or consumed by the processes of a superstructure can be optimized to a global minimal level, for example, through careful placement and configuration of specific material streams with respect to one another and through application of a heat exchangers network (HEN) to allow waste heat recovery. In grassroots plants design and in corresponding frequent future retrofit requirements, however, due to ongoing changes in the trade-off between capital cost and energy cost, heat exchangers network synthesis can be a major task. Streams having thermal energy already present that needs to be removed and streams that need to have heat added can be associated with one another to optimize the energy consumption of the process. In addition, careful selection of minimum temperature differences between hot streams and cold streams upon optimization can also result in huge savings in energy consumption.

These savings, however, are not fully realizable so long as there are some constraints that may prevent some of the streams from being matched with some others. Therefore, to maximize optimization, such constraints require consideration. That is, to maximize optimization, non-thermodynamic constraints, which can be related to corrosion, environmental reasons, scaling, leakage problems, streams being too far apart, or streams in different hazardous zones, and/or operability reasons, for example, should be taken into account during the energy targeting phase prior to design, or alternatively, during the reconfiguration or refitting of the plant or equipment. Also, it would be highly preferable to consider these optimization issues with a modeling system prior to the actual design, redesign, construction or modification of the actual plant and equipment.

As noted above, the state-of-art methods in commercial software and/or research papers describe two heat exchanger network design approaches: the pinch design method with its modifications, and the mathematical programming/optimization-based method that uses two main superstructure templates for automated synthesis or that employ optimization to only optimize an already given (initial) structure using the pinch design method directed to optimizing branching and heat exchanger duties. The most widely used software in industry produced through a process integration consortium, is known as "Sprint" which includes application of the pinch design method followed by an optimization capability that optimizes the initial design (created by the pinch design method), through working on branches and duties of heat exchangers to achieve an "optimal" total cost network. This method has been accepted in the industrial community due to its non-black box approach whereby the process engineer is "in the loop" of the initial design of the heat exchangers network—i.e., the processing engineer can make design decisions that can change with the progress of the design.

On the conceptual level, various embodiments of a method, system, and program product according to one or more embodiments of the present invention, however, beneficially exhibit advanced capabilities over that of the pinch design method, while still keeping the process engineer "in the loop" of designing his/her heat exchanger network. For example, where the pinch design method can not handle, systematically, various cases that can result in certain possible network structures which can render better economics from the energy or/and capital points of view, various embodiments of the method, system, and program product provide just such capability. Such cases can include certain combinations of stream matching to account for non-thermodynamic constraint application situations, stream-specific minimum approach temperatures situations in which a hot stream is matched with a hot stream and/or a cold stream is matched with a cold stream, and partial stream conversion situation in which a hot stream is partially converted to cold stream and/or a cold stream is partially converted to hot stream, etc.

Additionally, on the details level, various embodiments of a method, system, and program product can beneficially produce a heat exchanger network with a lesser number of heat exchanger units than the pinch design method for the threshold and near pinch problems due to a conceptual approach (limitation) of the pinch design method that results in a decomposition of the problem according to number of pinch and near pinch points. For all others, various embodiments of a method, system, and program product can produce heat exchanger networks with a lesser or equal number of heat exchanger units as compared with pinch design method for pinched problems due to the inefficiencies caused by the pinch philosophy of decomposition at each pinch point, and corresponding requirement, according to the pinch design methodology, to perform streams splitting at the pinch point to satisfy pinch design matching criteria, even in cases where such stream splitting would not otherwise be necessary.

Similarly, various embodiments of a method, system, and program product, according to one or more embodiments of the present invention, exhibit advanced capabilities over that of the mathematical programming/optimization-based method while still keeping the process engineer "in the loop" of designing his/her heat exchanger network. As noted previously, the mathematical programming/optimization-based method has been in academia since the late eighties, but is still not generally employed on large-scale industrial applications for several reasons. For example, the computational requirements of such method, especially for large problems, can be excessive, and the solution, in general, can not consistently provide globality and frequently renders only a local mediocre solution due to, for example: the black box nature of the method, the assumptions regarding problem economics, the types of heat exchangers used in the network, the utilities types and temperatures that need to be known beforehand, the non-inclusive nature of the transshipment model for streams matching, and the superstructures that produce each heat exchanger network.

Further, various embodiments of a method, system, and program product can produce heat exchanger network designs having a cheaper life-cycle cost over those produced using state-of-the-art software due to the consideration of network retrofitability, systematically, during the design stage, which would not be available using the pinch design method or the mathematical programming/optimization-based method. Regarding the pinch design method, as such method does not, for example, have a systematic process to select an optimal set of stream specific minimum temperature and because its pinch design philosophy starts the design of the network after selecting an optimal network global minimum approach temperature, even by repeating a current sequential philosophy using the global minimum temperature approach, the resulting new network structure would not be expected to consistently resemble the previous network structure, in class. Thus, such employment would result in a requirement for a substantial expenditure in network reconciliation effort as compared to that provided by various embodiments of the present invention. Regarding the mathematical programming/optimization-based method, as such method does not, for example, include a model for addressing the "retrofitability" of the design produced using any existing superstructure for the future changes in energy cost, like the pinch design method, the mathematical programming/optimization-based method also lacks the notion of designing systems that exhibit minimum life-cycle cost, such would need to be developed to address the heat exchanger network "retrofitability" notion.

Grass-Roots Design Improvement.

FIG. 1 illustrates an exemplary system 30 to synthesize a grass-roots heat exchanger network for at least one, but more typically, a substantial number of hot process streams to be cooled and at least one, but more typically, a substantial number of cold process streams to be heated according to one or more utilities targets. The system 30 can include a heat exchanger network synthesizing computer 31 having a processor 33, memory 35 coupled to the processor 33 to store software and database records therein, and a user interface 37 that can include a graphical display 39 for displaying graphical images, and a user input device 41 as known to those skilled in the art, to provide a user access to manipulate the software and database records. Note, the computer 31 can be in the form of a personal computer or in the form of a server or multiple servers serving multiple user interfaces 37. Accordingly, the user interface 37 can be either directly connected to the computer 31 or through a network 38 as known to those skilled in the art.

The system 30 can also include one or more tables and/or databases 43 stored in memory (internal or external) that is operably coupled to the heat exchanger network synthesizing computer 31, as would be understood by those skilled in the art. The one or more databases 43 can include one or more discrete values or sets/ranges of values for various operational attributes for each of the hot process streams and one or more discrete values or sets/ranges of values for various operational attributes for each of the cold process streams. Such operational attributes can include, for example, a discrete supply temperature (Ts) and/or a lower and an upper boundary value for the supply temperature of each of the hot process streams and each of the cold process streams, a discrete target temperature (Tt) and/or a lower and an upper boundary value for the target temperature of each of the hot process streams and each of the cold process streams, and a discrete heat capacity flow rate (FCp) and/or a lower and an upper boundary value for the heat capacity flow rate of each of the hot process streams and each of the cold process streams, and a corresponding discrete enthalpy value or a corresponding minimum and maximum enthalpy value if any range or set data was provided/received for one or more of the other operational attributes.

The one or more tables and/or databases 43 can also include a constrained stream list or table as would be understood by one of ordinary skill in the art, including an identification of any non-thermodynamically constrained process streams constrained from matching at least one other process stream due to a non-thermodynamic constraint, such as, for example, an indication that hot stream #1 of a particular process is forbidden from matching with cold stream #2, etc.

The one or more tables and/or databases 43 can also include a determined or assigned stream-specific minimum temperature approach value ($\Delta T_{min}^i$) for each separate one of the plurality of hot process streams and/or cold streams, a determined or assigned dual stream-specific minimum temperature approach value ($\Delta T_{min}^i$) for each separate one of the hot process streams, and/or a determined or assigned set of range of stream-specific minimum temperature approach values ($\{\Delta T_{min}^i\}$), e.g., a minimum or maximum or range interval, for each separate one of the hot process streams.

Note, the dual-stream stream-specific minimum temperature approach concept, according to an embodiment of the present invention, is the case where a hot stream can have two stream-specific minimum temperature approach values provided for the sake of allowing a trade off between the quantity of total energy saved and the quality of stream-specific energy preserved, without regard to heat exchanger area or fixed cost, which is unavailable to a user according to the pinch design method. The dual-stream stream-specific minimum temperature approach concept should not be confused with the dual temperature approach design method described in the literature which describes two approach temperatures: a global minimum temperature approach value for network heat recovery and another for a specific heat exchanger used to violate the global minimum temperature approach under certain circumstances for the sake of saving capital, and not for preserving stream quality (temperature).

The system 30 can also include heat exchanger network synthesizing program product 51 stored in memory 35 of the heat exchanger network synthesizing computer 31 and adapted to synthesize a heat exchanger network that in certain situations sharply satisfies, or at least substantially satisfies, the utilities desired consumption within its defined bounds with at least the same, but more typically, a lesser number of heat exchanger units as compared with that produced using the pinch design method, using advanced matching solutions, systematically; and that in other situations will achieve both a lesser number of units and less utilities consumption, as well as producing a network that is easily retrofitable in the future to accommodate changes in energy prices for a given list of process streams to be either cooled or heated according to their respective heat capacity flow rates, supply and target temperatures, stream-specific minimum temperature approaches and/or dual stream-specific minimum temperature approaches and according to any utilities targets that need to be satisfied or substantially satisfied through bounded targets, and for a given list of streams matching constraints.

Particularly, the program product 51, according to one or more embodiments of the present invention, can be employed to synthesize a heat exchanger network (preferably one that has a topology that is easily retrofitable-in-future) for a process or cluster of processes that achieves: at least one utility objective which exactly satisfies certain heating and cooling utilities loads; at least one objective using a fewer number of heat exchanger units; at least one objective which satisfies, in bounded range, certain heating and cooling utilities; at least one objective using either a heating or a cooling utility; at least one objective using less hot utility consumption; at least one objective using less cold utility consumption; at least one objective using a lesser number of hot utilities types; at least one objective using a lesser number of cold utilities types; at least one objective with less degradation in the process source region; and/or at least one objective with better utilization of the process sink region, responsive to receiving set of process and/or utility systems attribute values for the major resource stream used by the process or cluster of processes, receiving at least one set of stream-specific minimum approach temperature between the process streams, receiving a list or table of streams initial type, receiving list or table of streams matching constraints, and receiving one or more utility consumption values determined from the stream conditions.

Further, the program product 51, according to one or more embodiments of the present invention, can provide a systematic technique adapted to execute the additional preliminary steps of: identifying operational attributes of process streams used within the process in a heat exchanger network which affect the multiple utility consumption of the process or the number of heat exchangers units used in the process or both and/or any other objective of the ones described above, indicating the specific attribute value or values from the range or ranges supplied by the user (in the beginning or even decided during the implementation of the procedures) that result in the new utility consumption value or values calculated, and can provide for synthesizing the heat exchanger network responsive thereto to achieve one or more of the associated objectives identified above.

Note, the heat exchanger network synthesizing program product 51 can be in the form of microcode, programs, routines, and symbolic languages that provide a specific set or sets of ordered operations that control the functioning of the hardware and direct its operation, as known and understood by those skilled in the art. Note also, the heat exchanger network synthesizing program product 51, according to one or more of the embodiments of the present invention, need not reside in its entirety in volatile memory, but can be selectively loaded, as necessary, according to various methodologies as known and understood by those skilled in the art.

The table below provides a high-level summary of a heat exchanger network synthesis algorithm according to an example of an embodiment of the present invention:

| | |
|---|---|
| Step # 0: | Treat the problem as one problem without decomposition. |
| Step # 1: | Receive attribute data for hot and cold streams of the process or processes. |
| Step # 2: | Generate temperature intervals and apply specific minimum temperature approach values. |
| Step # 3: | Match streams at each temperature interval for all types of problems moving from top-to-bottom (highest to lowest). Match streams that can cancel each other or one of them with minimum quality degradation to the other. Match streams with maximum overlap or with equal or close to equal heat capacity flow rates (FCps). Match streams having high FCps and high overall heat transfer coefficients (Us) with streams having low FCps with low Us. Employ stream switching/partial conversion, homogeneous matching, or buffers (if feasible) to overcome non-thermodynamic constraints. |
| Step # 4: | Target for utilities as guidance and balance loads using utilities during step down through the temperature intervals. |
| Step # 5: | Split streams as necessary to reach the desired utilities loads and/or qualities. |
| Step # 6: | Determine an initial heat exchanger network design. |
| Step # 7: | Remove redundant process-to-process heat exchanger units. |
| Step # 8: | Merge same stream utility heat exchanger units. |
| Step # 9: | Determine the final heat exchanger network design. |

Step 1: Step 1 includes receiving input data, for example, entered by a user or stored in the database 43. The data can include, for example, a discrete supply temperature (Ts) and/or a lower and an upper boundary value for a supply temperature interval (Ts[L:U]) of each of the hot process streams and each of the cold process streams, a discrete target temperature (Tt) and/or a lower and an upper boundary value for a target temperature interval (Tt[L:U]) for each of the hot process streams and each of the cold process streams, and a discrete heat capacity flow rate (FCp) and/or a lower and an upper boundary value for the heat capacity flow rate interval (FCp [L:U]) for each of the hot process streams and each of the cold process streams, and a corresponding discrete enthalpy value or a corresponding minimum and maximum enthalpy value if any range or set data was provided for one or more of the other operational attributes. According to an example of an embodiment of the present invention, for cold streams, supply temperature (Ts) and the target temperature (Tt) can be in the form of actual supply and target temperatures, while for hot streams, the supply temperature (Ts) and the target temperature (Tt) can be real values minus a user-selected minimum. The data can also include a discrete and/or dual stream specific minimum temperature approach values ($\Delta T_{min}^i$) for each the hot process streams, and a list of one or more constrained process streams constrained from matching at least one other resource stream due to a non-thermodynamic constraint (e.g., a list forbidden matches).

Figure 2:
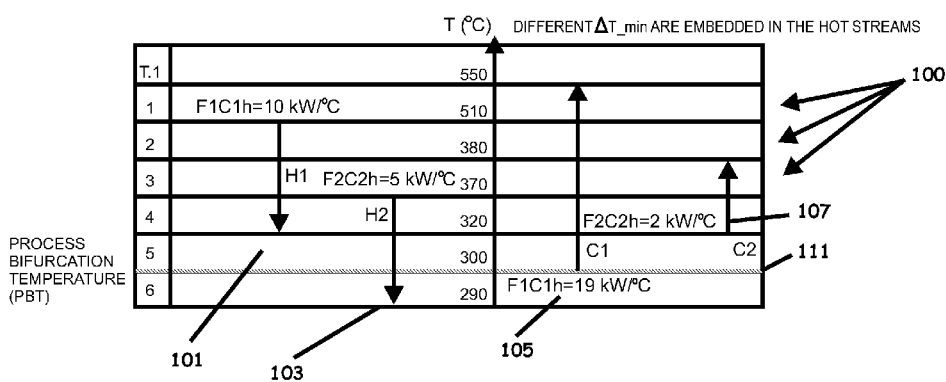
FIG. 2 is a diagram illustrating generation of temperature step intervals used in targeting and utility selection according to an embodiment of the present invention.

Step 2: Step 2 includes generating temperature intervals 100 (see e.g., FIG. 2) and applying specific minimum temperature approach values ($\Delta T_{min}^i$) to each of the hot streams. FIG. 2 provides an example of a graph illustrating a simple example of an industrial process overlaid upon successive temperature intervals 100 generated therefor according to an embodiment of the present invention, that includes four separate and distinct process streams H1, H2, C1, C2. Process streams H1 and H2 are hot streams, whereas streams C1 and C2 are cold streams. In this example, separate operational attributes for each process stream are modeled. These include the supply temperature (Ts) of each stream shown at the tail of each process stream arrow 101, 103, 105, 107, its target temperature (Tt) shown at the head of each process stream arrow 101, 103, 105, 107, and a heat capacity flow rate (FCp) for each process stream. Note, for simplicity, in the exemplary illustration shown in FIG. 2, only discrete values for the supply temperature, target temperature, and heat capacity flow rate, were used, and the different stream-specific minimum temperature approach values ($\Delta T_{min}^i$) are embedded in the hot streams H1 and H2.

In this illustration, to generate the temperature step intervals 100, the cold streams C1 and C2 are first drawn or otherwise formulated, at least conceptually, from their start temperatures to their target temperatures using their actual data, and each hot stream H1 and H2 is then shifted down by its respective stream-specific minimum temperature approach values ($\Delta T_{min}^i$) (e.g., individual stream-specific minimum approach temperature or dual stream-specific minimum approach temperatures) to embed the separate $\Delta T_{min}^i$ values in the hot streams H1 and H2. Lines are drawn or otherwise formulated, at least conceptually, on the start and end of each stream to define the process stream arrow 101, 103, 105, 107. The temperature intervals 100 are defined as shown in FIG. 2, and as described in more detailed below, energy targets Qh, Qc, are calculated along with the process bifurcation temperature(s) to facilitate the heat exchanger network synthesis task. The process bifurcation temperature (PBT) shown at 111, for example, is the point at which the process is transformed from being a heat sink to becoming a heat source. Note, the term "conceptually" has been used in this paragraph to denote that when the step(s) are performed on a computer, the parameters for each stream are calculated, but not necessarily graphically displayed.

Figure 3:
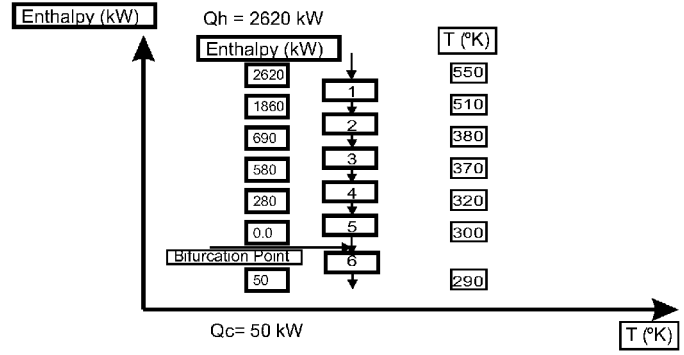
FIG. 3 is a graph illustrating changes in enthalpy at each temperature step interval of FIG. 2 according to an embodiment of the present invention.
Figure 5:
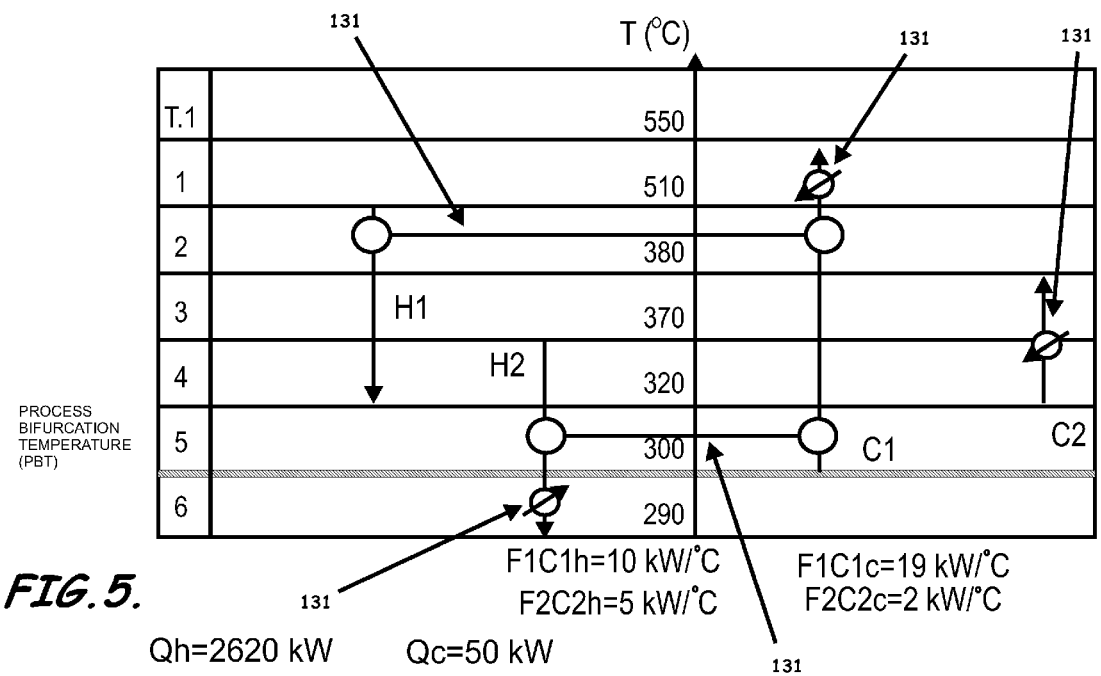
FIG. 5 is a schematic diagram of a result of a heat exchanger network synthesis implementation for a simple problem according to an embodiment of the present invention.

Steps 3 and 4: Step 3 includes matching streams at each temperature interval 101 for all types of problems moving from top-to-bottom (highest to lowest), and Step 4 includes targeting for utilities as guidance, and balancing loads using utilities during step down through the temperature intervals. FIGS. 3-4B provide a background framework for performing the utilities consumption calculations. Particularly, FIG. 3 illustrates changes in enthalpy at each of the temperature step intervals. FIGS. 4A-4B illustrate modified grand composite curves modified to provide various visual enhancements. That is, FIG. 4A, for example, uses a real temperature scale and not a shifted temperature scale as described in literature. FIG. 4B illustrates the curve shown in FIG. 4A, but with each heating duty (Qh) shifted by a "user-selected/desired" hot utility-process minimum temperature approach value (Thu) for each of the temperature step intervals. The figures also beneficially depict temperature on the horizontal scale and enthalpy at the vertical scale. Having temperature on the horizontal "X" axis, rather than on the vertical axis as described in literature, enables a graphical estimation of the increase or decrease in the "area under the curve" due to the selection of utilities and/or changing process conditions which is directly proportional to amount of work needed by the process and amount of work that can be extracted from the process, as well as amount of work that might be lost by the process under the given conditions. As shown in FIG. 4A, theoretical work lost (W_lost) can be calculated according to the following: W_lost=Q(1−T0/T), where Q is the heating or cooling duty, T0 is the ambient temperature, and T is the ending temperature. FIG. 5 shows a schematic of a result of a heat exchanger network synthesis implementation for the simple problem.

Although the above example is directed to a simple industrial process "problem," various embodiments of the present invention are equally applicable to both problems that need both heating and cooling utilities (pinched problem or problems with pinch and near pinch, as well as multiple pinches), and problems that only need cooling utility or only need heating utility (known as threshold problems).

Performing matching top-to-bottom (highest to lowest) whereby a hot stream, for example, can be matched with cold streams, cold utilities, and/or another hot stream, which can be according to various hot stream connections including, for example, parallel, series, parallel-series, series-parallel, and by-pass (of one or more units of any match) connections, was introduced in Step 3. According to various embodiments and present invention, matching is performed between hot streams and utilities with cold streams starting at the highest temperature interval 100 on the temperature scale and proceeds from that top to the bottom. This top-to-bottom matching methodology is in complete contrast to the conventional pinch design method whereby the matching is carried out at the pinch point (typically located at a medial location on the temperature scale) and then moves up on the temperature scale above the pinch point to complete an above-pinch sub-problem and then starts again at the pinch point and moves down the temperature scale below the pinch point to complete a below-pinch sub-problem. The top-to-bottom approach beneficially facilitates matching streams at the same temperature interval where the temperature approach between the hot and cold streams are at a minimum, and where the balance/difference between the supply of the hot and the demand of the cold can be compensated by a utility with the lowest possible supply temperature. Such approach can substantially minimize the energy "quality" loss or degradation in energy quality in the hot process streams and/or hot utilities.

The step of matching can also include matching streams that can either cancel each other or that provides one of them with minimum quality degradation when matched to the other; matching streams with maximum overlap or with equal or close to equal heat capacity flow rates (FCps); matching streams having high FCps and high overall heat transfer coefficients (Us) with streams having low FCps with low heat transfer coefficients; and/or employing stream switching/partial conversion, homogeneous matching, or the inclusion of buffers (if feasible) to overcome non-thermodynamic constraints. FIGS. 6 through 27 provide six simple comparative examples illustrating how using advanced matching solutions can yield a lesser number of heat exchanger units 131 as compared with that produced using, for example, the pinch design method followed by the optimization option, in cases that may be expected to be encountered in industry.

Figure 6:
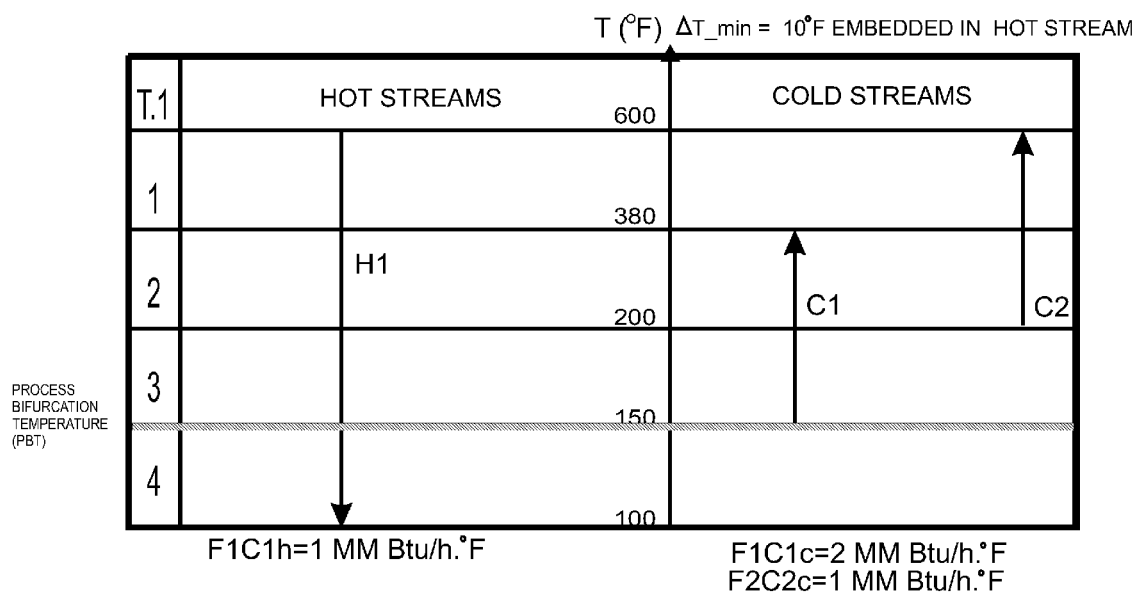
FIG. 6 is a diagram illustrating an industrial process including process streams shown with respect to temperature step intervals used in targeting and utility selection according to an embodiment of the present invention.
Figure 7:
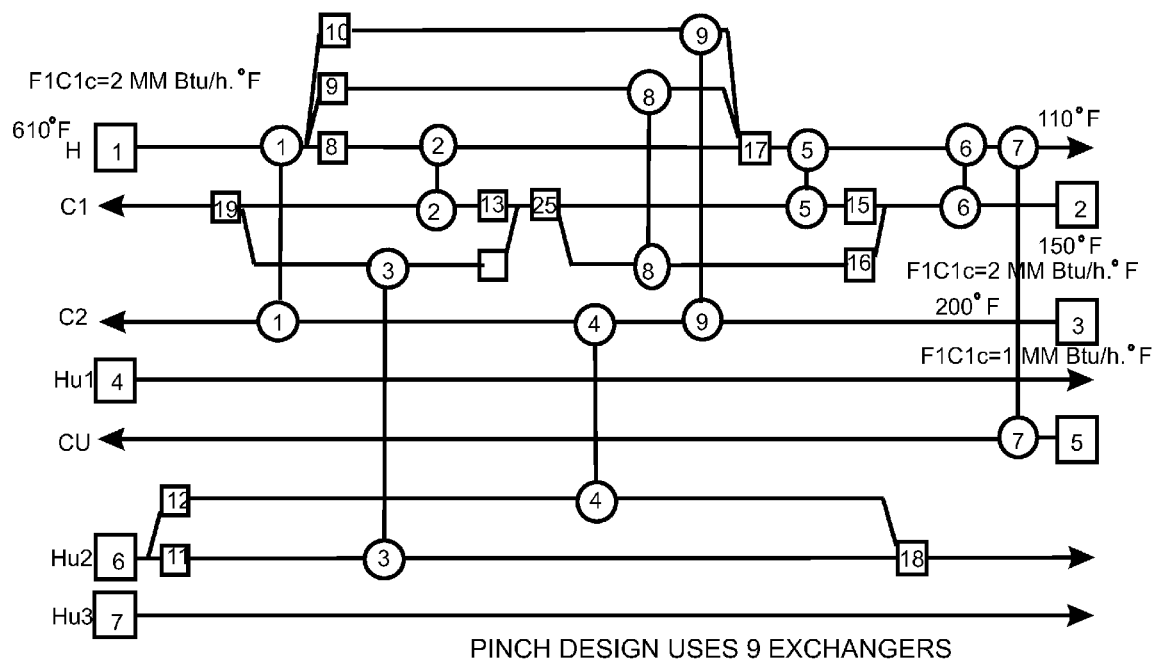
FIGS. 7-9 are schematic diagrams of a result of a heat exchanger network synthesis implementation for the industrial process shown in FIG. 6 according to pinch design methods.
Figure 8:
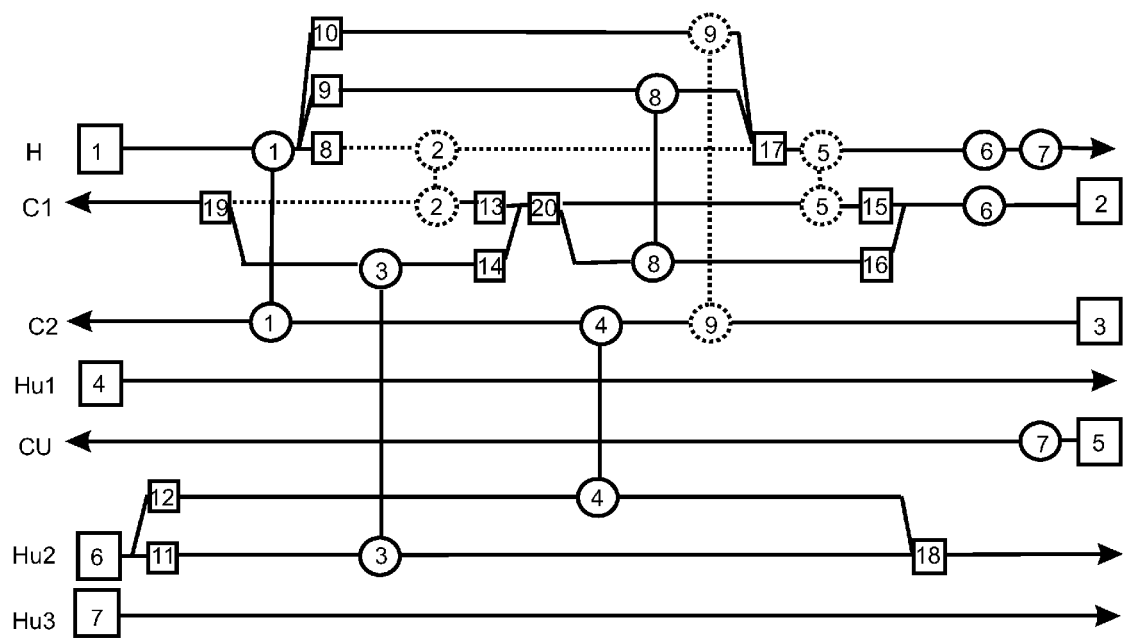
Figure 9:
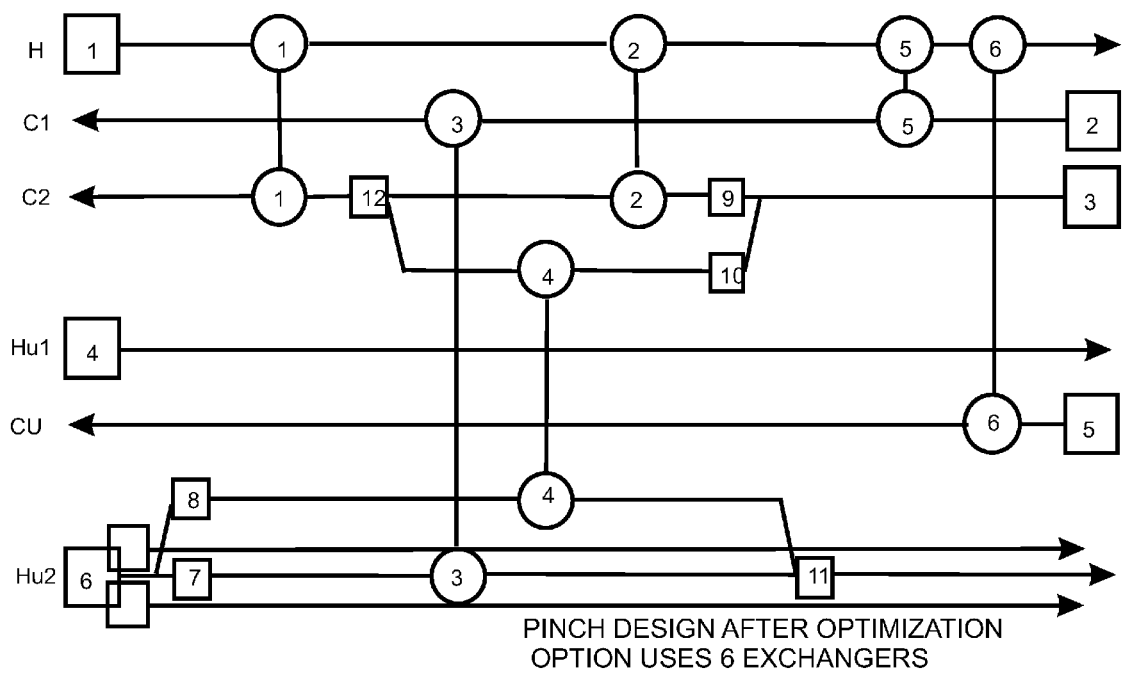

FIG. 6 provides a graph illustrating a simple example of an industrial process to be used in a comparative analysis, over-laid upon successive temperature intervals 100 generated therefor. The illustrated industrial process incorporates three separate and distinct process streams H1, C1, C2, having only discrete values for the supply temperature, the target temperature, and the heat capacity flow rate, and with a minimum temperature approach value ($\Delta T_{min}^i$) of 10° F. embedded in the hot stream H1, to facilitate comparison between: the results of application of the pinch design method yielding a network design having nine heat exchangers (see FIG. 7); the results of application of the pinch design method followed by a software optimization option yielding a network design having six heat exchangers with heat exchangers #2, #5, and #9 shown in FIG. 8 being removed from the initial design shown in FIG. 7 (obtained using the pinch design method) to form the software optimized final design (see FIG. 9); and that produced according to an embodiment of the present invention yielding a network design having only four heat exchangers (see FIG. 10).

As noted in Step 0, various embodiments of the present invention can treat the problem as a single problem, without decomposition, which can result in a lesser number of heat exchanger units 131 than possible using the pinch design method, which decomposes the problem into two problems, or sometimes more than two problems in the case of multiple process pinches or a near pinch situation as in FIG. 6 where we have a near pinch situation. To solve the problem using the pinch design method, the pinch design method calls for dividing the problem to three sub-problems: one between the pinch and near pinch temperatures (150-200 degrees), one above 200 degrees, and one below 150 degrees. For defining the minimum number of heat exchanger units 131 in a sub-problem, the pinch design method with software optimization states that the minimum number (or U_min.) equals the sum of the total number of streams (including utility streams) minus one. Accordingly, the sub-problem between the pinch and near pinch points (150-200 degrees), which contains two process streams and one utility stream, requires at least two heat exchanger units 131. The sub-problem above 200 degrees, which contains three process streams and one utility stream, requires at least three heat exchanger units 131. The sub-problem below 200 degrees, which contains one process stream and one utility stream, requires at least one heat exchanger unit 131. That is, total minimum number of heat exchanger units 131 needed will be at least six heat exchanger units 131 using pinch design method rules.

As such, the best design capable of resulting from this type of network design methodology applied to a problem such as, for example, that shown in FIG. 6, will always render a larger number of heat exchanger units 131 than that provided according to the exemplary embodiment of the present invention (see, e.g., FIG. 9), even in situations where the between pinch and near pinch area does not require use of a utility stream. As noted previously, decomposing the problem at the pinch and beginning the matching process at the pinch leads to streams split with no reason other than to satisfy the criteria of matching at the pinch, resulting in an artificial constraint solved by unnecessarily splitting streams, and thus, producing a network with a greater number of heat exchanger units 131 than would otherwise be necessary.

Further, as noted previously, the pinch design method treats threshold problems (problems that only need cooling utility or only need heating utility), which do not have a pinch/constraint, as a pinched problem in order to generalize the pinch design method for handling all types of problems. Doing so, however, disadvantageously creates an artificially constrained situation, which necessitates the splitting of streams at the factious pinch to satisfy the matching criteria at the pinch according to the pinch design method rules. Beneficially, various embodiments in the present invention do not have such limitation, and thus, in such cases should always render a smaller number of heat exchanger units 131 than that provided according to the pinch design method.

Figure 10:
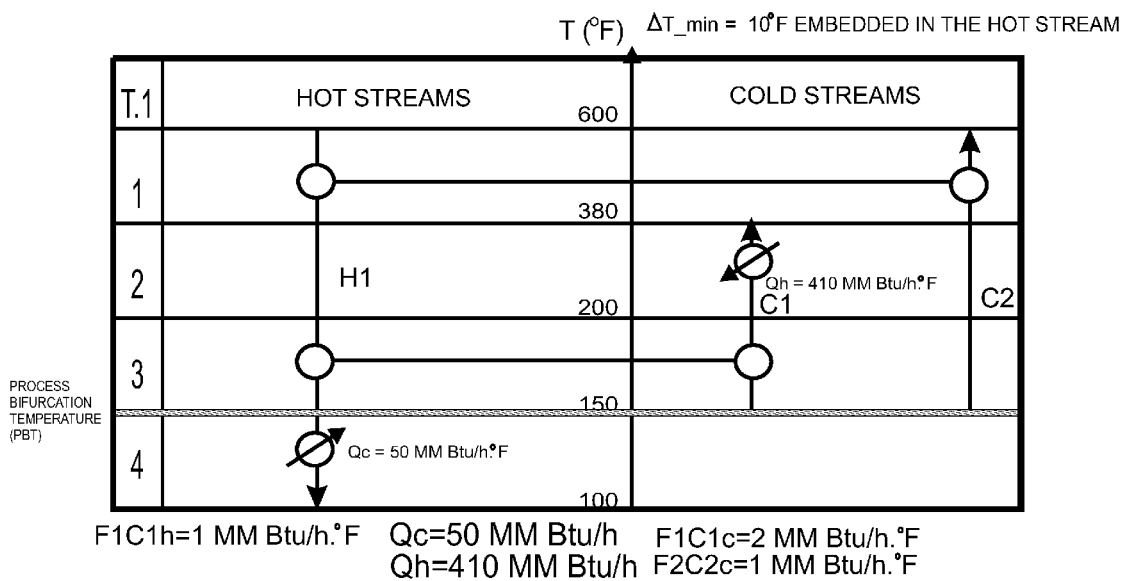
FIG. 10 is a schematic diagram of a result of a heat exchanger network synthesis implementation for the industrial process shown in FIG. 6 according to an embodiment of the present invention.

As shown in FIG. 10, as part of the network synthesis according to this exemplary embodiment of the present invention, hot stream H1 having a heat capacity flow rate FCp of 1 mmBTU/h/° F. is matched at the highest temperature interval with C2 also having a heat capacity flow rate FCp of 1 mmBTU/h/° F., which provides a maximum overlap, and which resultantly completely cancels C2.

Figure 11:
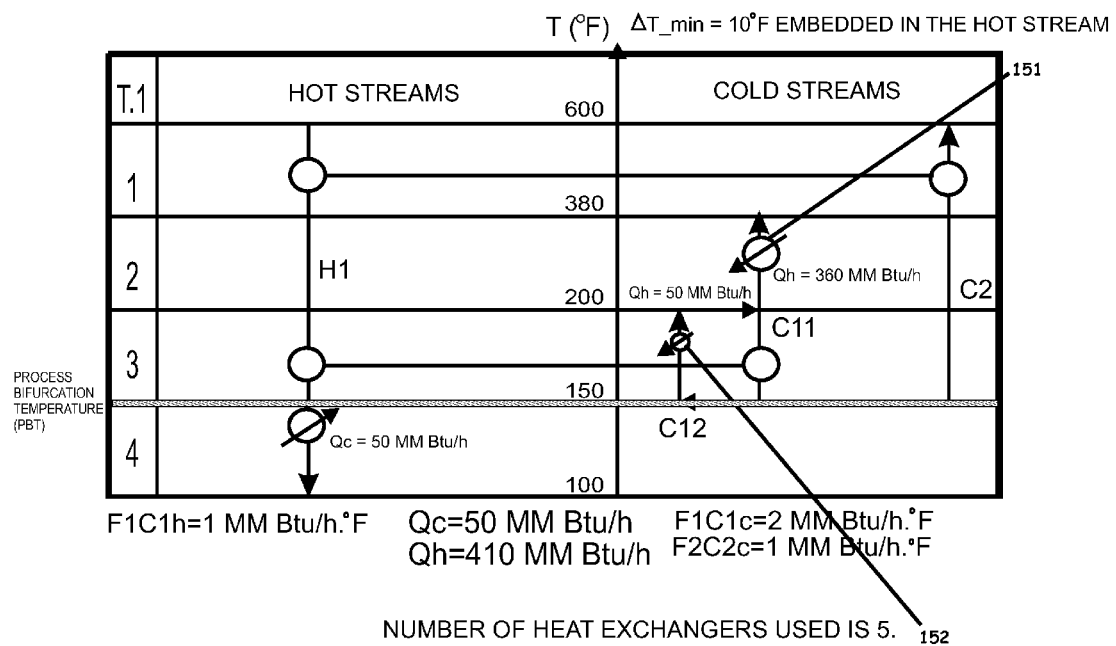
FIG. 11 is a schematic diagram of the result shown in FIG. 10 to include application of a low-quality utility according to an embodiment of the present invention.

FIG. 11 provides a modification of the design shown in FIG. 10, according to an embodiment of the present invention. As shown in the figure, cold stream C1 is virtually split to form C11 and C12 and a low quality utility is utilized at 152 in conjunction with a high quality utility utilized at 151 to heat cold stream C12, to thereby minimize overall utilities cost, but at the expense of one more heat exchanger. Nevertheless, the total number of heat exchangers (five) is still less than the pinch design method network followed by software optimization option (six), by one heat exchanger.

Figure 12:
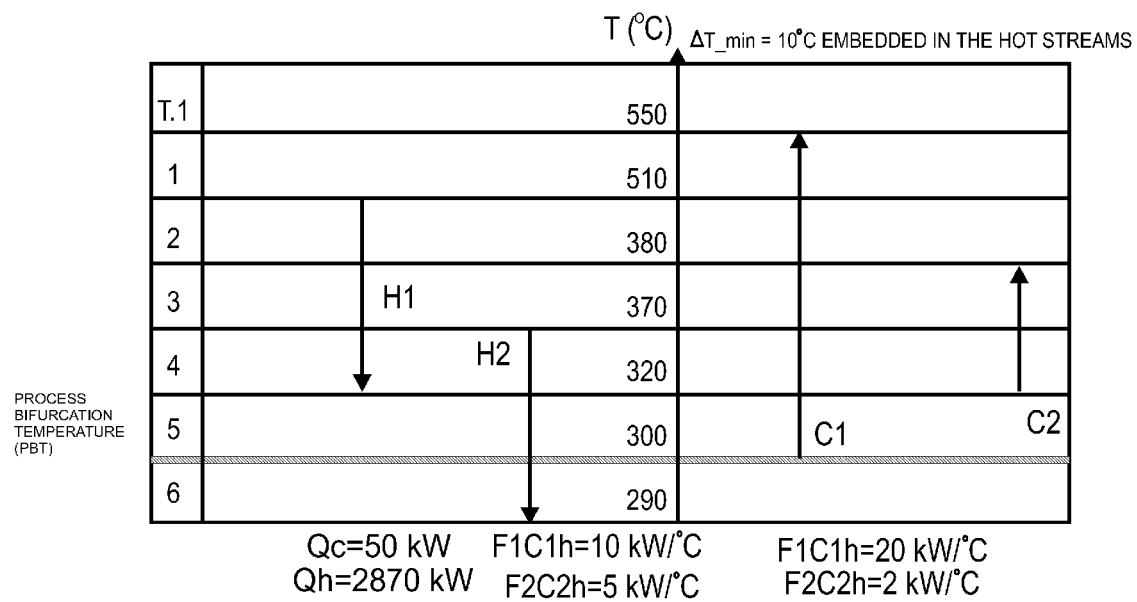
FIG. 12 is a diagram illustrating an industrial process including process streams shown with respect to temperature step intervals used in targeting and utility selection according to an embodiment of the present invention.
Figure 13:
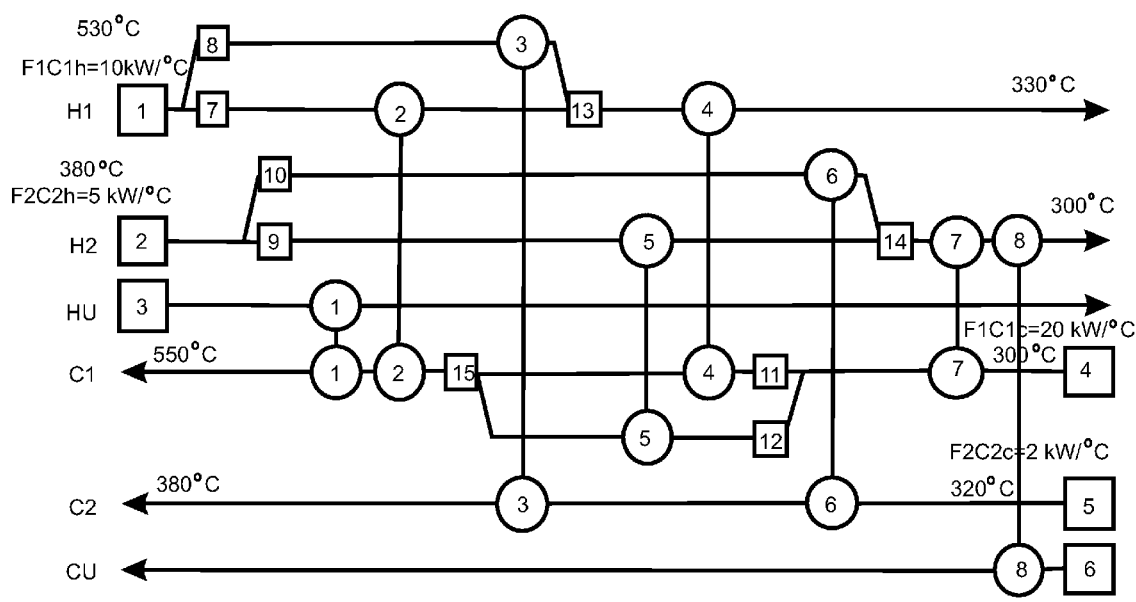
FIG. 13 is a schematic diagram of a result of a heat exchanger network synthesis implementation for the industrial process shown in FIG. 12 according to a pinch design method.
Figure 14:
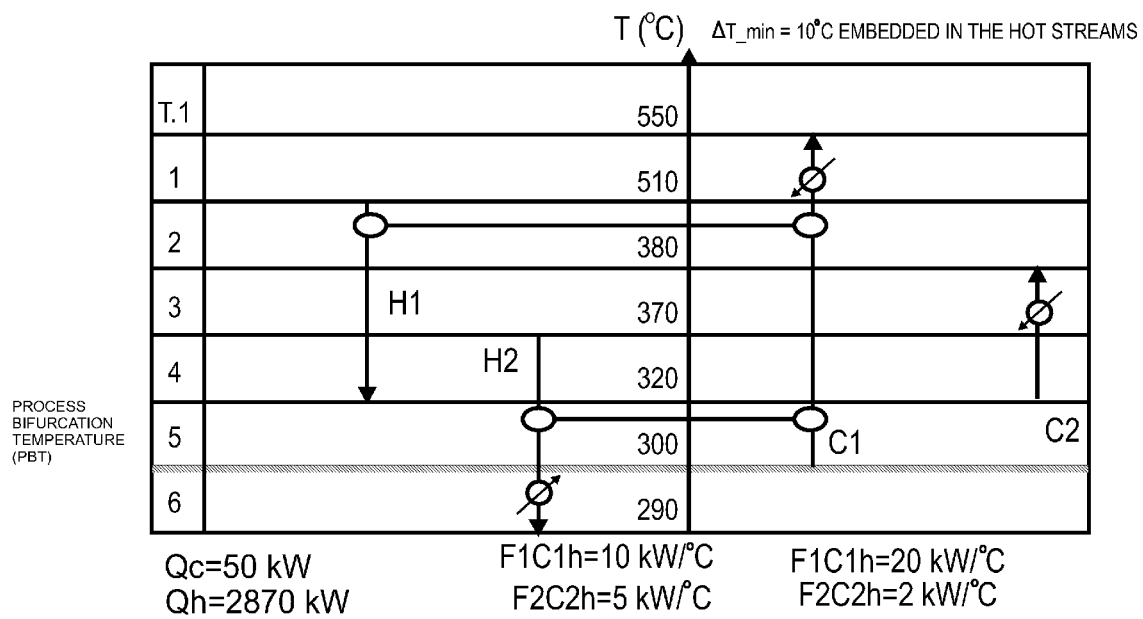
FIG. 14 is a schematic diagram of a result of a heat exchanger network synthesis implementation for the industrial process shown in FIG. 12 according to an embodiment of the present invention.

FIG. 12 illustrates another simple example of an industrial process to be used in a comparative analysis, overlaid upon successive temperature intervals 100 generated therefor. The illustrated industrial process incorporates four separate and distinct process streams H1, H2, C1, C2, having only discrete values for the supply temperature, target temperature, and heat capacity flow rate, and with a minimum temperature approach value ($\Delta T_{min}^i$) of 10° C. embedded in each of the hot streams H1, H2, to facilitate a comparison between: the results of application of the pinch design method followed by the software optimization option yielding a network design having eight heat exchangers (see FIG. 13); and that produced according to an embodiment of the present invention yielding a network design having only five heat exchangers (FIG. 14). As shown in FIG. 14, as part of the network synthesis according to this exemplary embodiment of the present invention, hot stream H1 is matched at the highest temperature interval with C1 and both H1 and H2 are matched to provide a maximum overlap with C1, which collectively results in a lesser number of required heat exchanger units for the same total heating and cooling duty.

Figure 15:
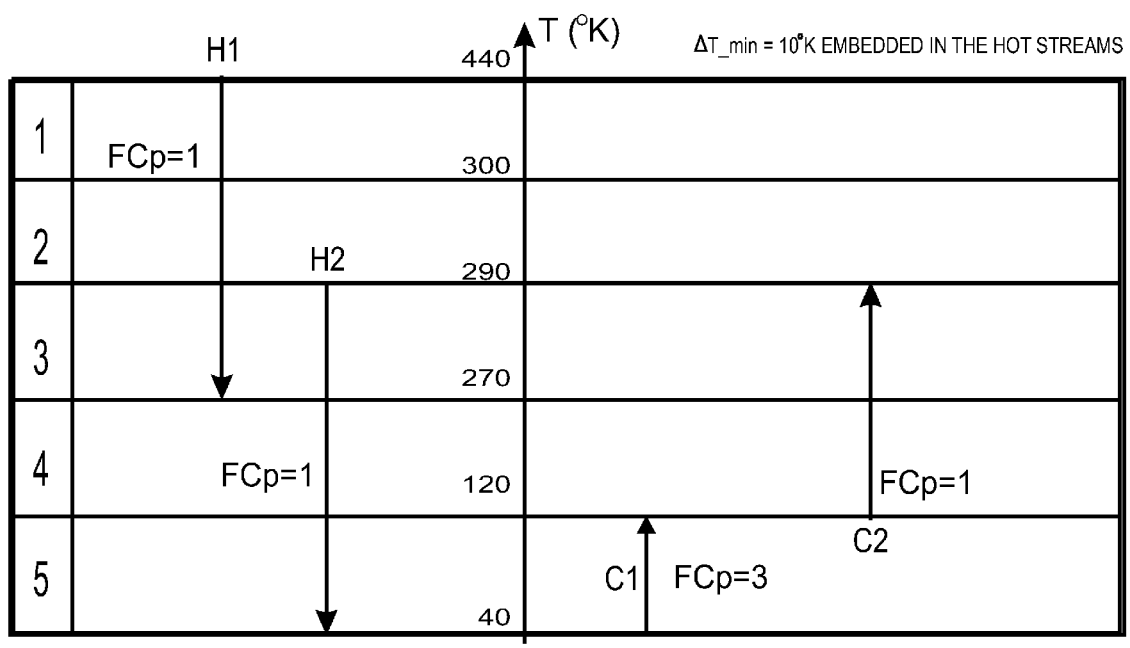
FIG. 15 is a diagram illustrating an industrial process including process streams shown with respect to temperature step intervals used in targeting and utility selection according to an embodiment of the present invention.
Figure 16:
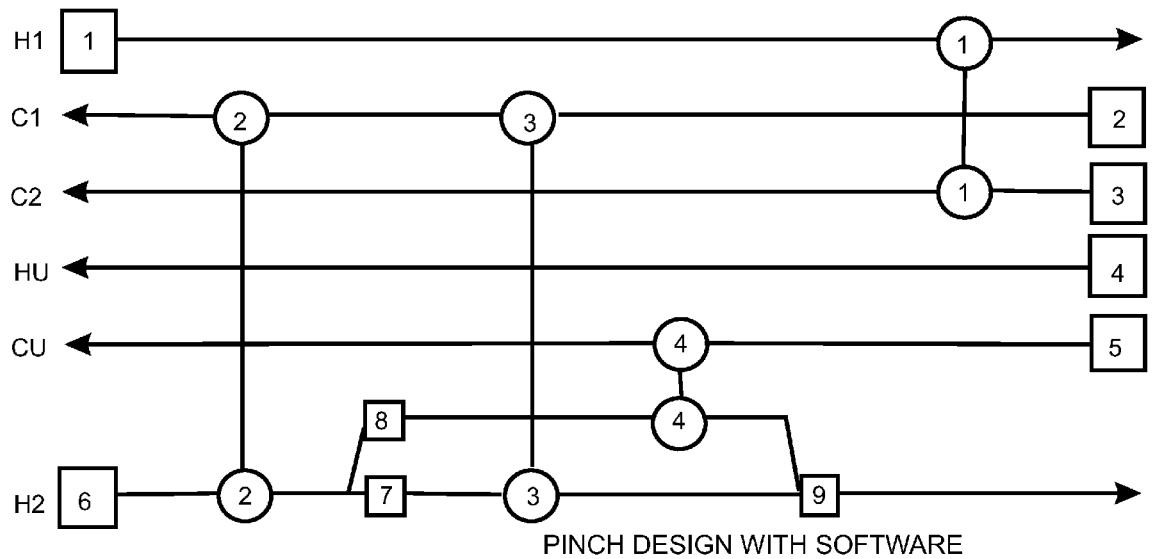
FIG. 16 is a schematic diagram of a result of a heat exchanger network synthesis implementation for the industrial process shown in FIG. 15 according to a pinch design method.
Figure 17:
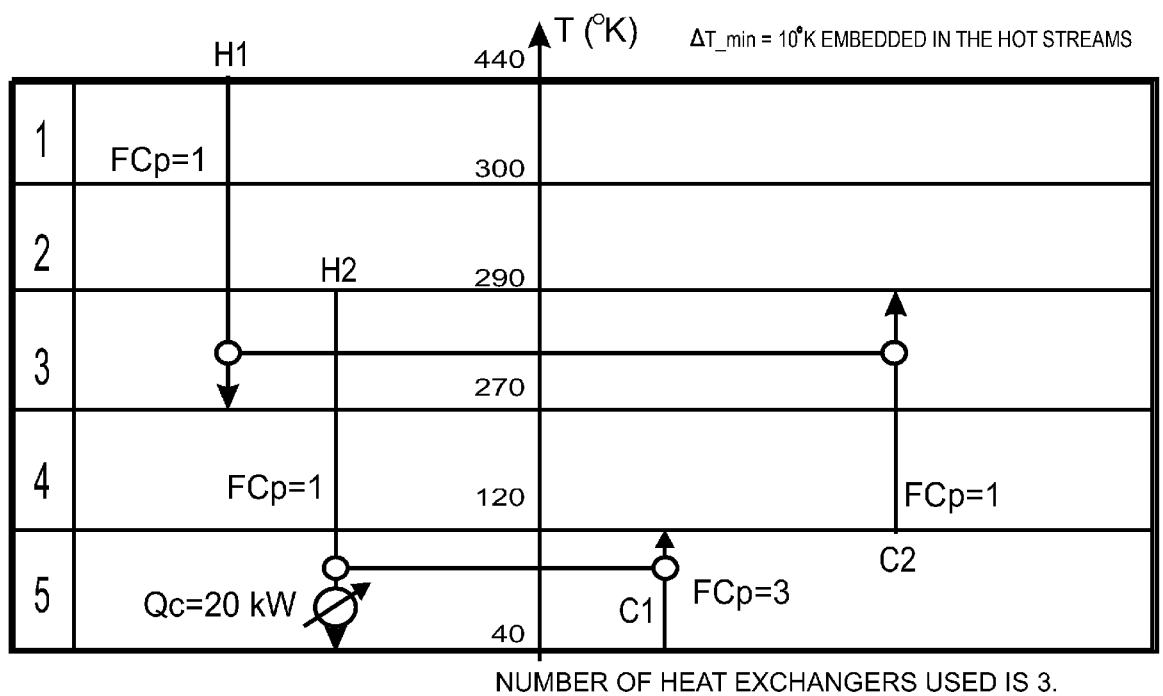
FIG. 17 is a schematic diagram of a result of a heat exchanger network synthesis implementation for the industrial process shown in FIG. 15 according to an embodiment of the present invention.

FIG. 15 illustrates another simple example of an industrial process overlaid upon successive temperature intervals 100 generated therefor, which provides an example of a threshold problem (cooling only). The illustrated industrial process incorporates four separate and distinct process streams H1, H2, C1, C2, having only discrete values for the supply temperature, target temperature, and heat capacity flow rate, and with a minimum temperature approach value ($\Delta T_{min}^i$) of 10° K embedded in each of the hot streams H1, H2, to facilitate a comparison between: the results of application of the pinch design method followed by the software optimization option yielding a network design having four heat exchangers (see FIG. 16); and that produced according to an embodiment of the present invention yielding a network design having only three heat exchangers (FIG. 17). As shown in FIG. 17, as part of the network synthesis according to this exemplary embodiment of the present invention, hot stream H1 is matched at the highest temperature interval with C2 having a same heat capacity flow rate and completely canceling C2, and H2 is matched at the highest temperature interval with C1 to provide a maximum overlap with C1 and to completely cancel C1, which results in a lesser number of required heat exchanger units for the same total cooling duty.

Figure 18:
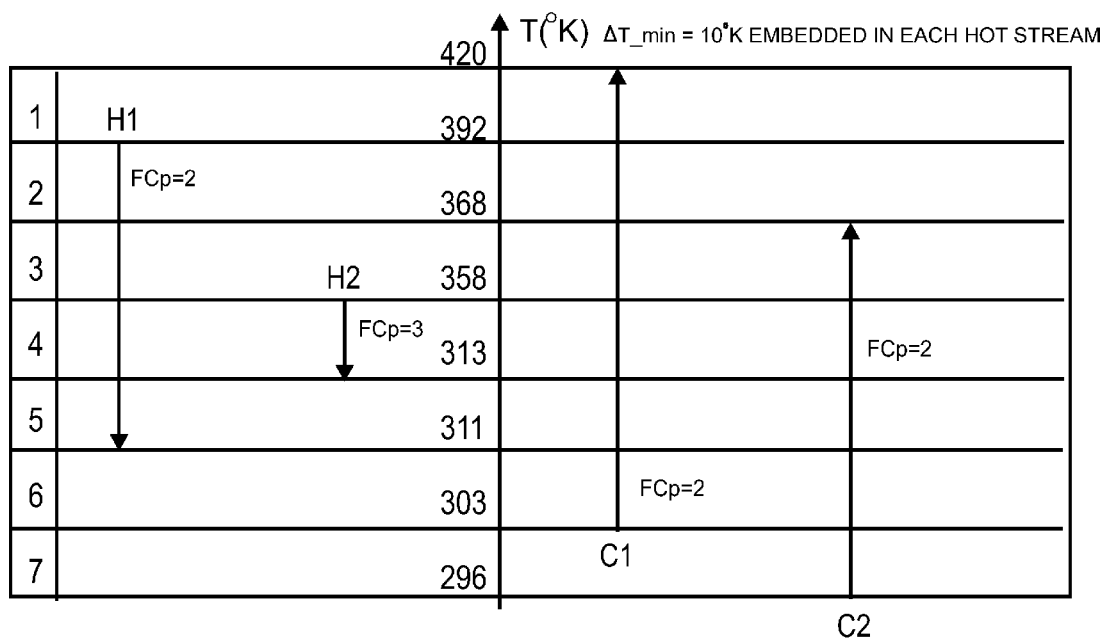
FIG. 18 is a diagram illustrating an industrial process including process streams shown with respect to temperature step intervals used in targeting and utility selection according to an embodiment of the present invention.
Figure 19:
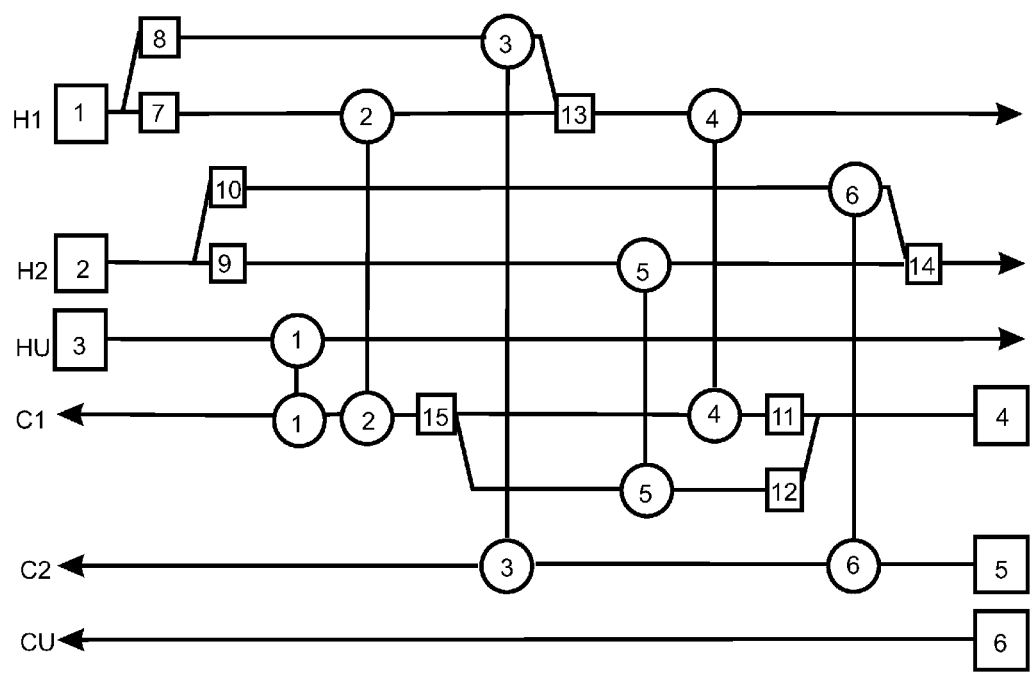
FIG. 19 is a schematic diagram of a result of a heat exchanger network synthesis implementation for the industrial process shown in FIG. 18 according to a pinch design method.
Figure 20:
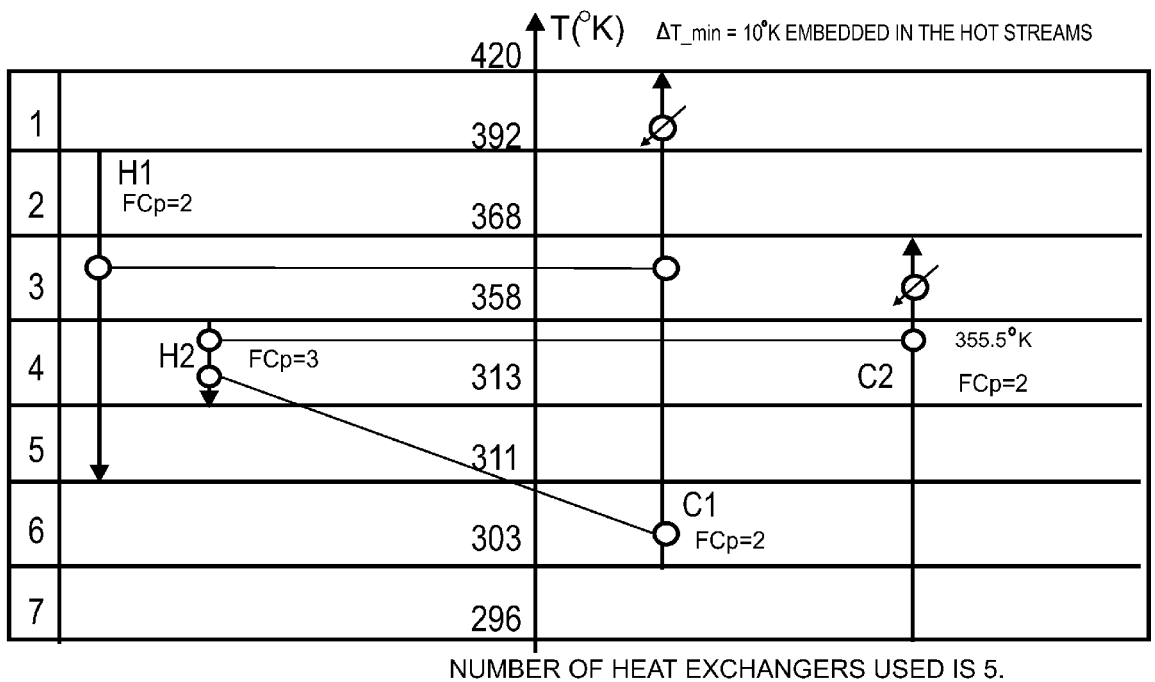
FIG. 20 is a schematic diagram of a result of a heat exchanger network synthesis implementation for the industrial process shown in FIG. 18 according to an embodiment of the present invention.

FIG. 18 illustrates another simple example of an industrial process overlaid upon successive temperature intervals 100 generated therefor, which provides an example of a threshold problem (heating only). The illustrated industrial process incorporates four separate and distinct process streams H1, H2, C1, C2, having only discrete values for the supply temperature, target temperature, and heat capacity flow rate, and with a minimum temperature approach value ($\Delta T_{min}^i$) of 10° K embedded in each of the hot streams H1, H2, to facilitate a comparison between: the results of application of the pinch design method followed by the software optimization option yielding a network design having six heat exchangers (see FIG. 19); and that produced according to an embodiment of the present invention yielding a network design having only five heat exchangers (FIG. 20). As shown in FIG. 20, as part of the network synthesis according to this exemplary embodiment of the present invention, hot stream H1 is matched with C1 having a same heat capacity flow rate and complete overlap resulting in a complete cancellation of H1, and H2 is matched at the highest temperature interval with C2 to provide a maximum overlap with C2 and at the lowest temperature interval with C1 to maximize heat exchange (enhance utilization), which results in a lesser number of required heat exchanger units for the same total heating load/duty.

Step 5: Step 5 includes splitting streams as necessary to reach the desired utilities loads and/or qualities. Stream splitting can be conducted, for example, upon user request/selection, e.g., to reduce energy quality degradation due to matching a hot stream at a certain temperature interval at the process sink region with cold streams at lower temperature intervals. This technique is in contrast to the pinch design method, whereby splitting is conducted at the pinch point merely to satisfy problem feasibility issues, i.e., matching criteria at the pinch, or above and below the pinch regions, which is a major cause in producing network designs with an excessive number of heat exchangers. FIGS. 21-24 and 25-27 provide two separate problems and comparative network synthesis to include illustrations of streams splitting according to an embodiment of the present invention.

Figure 21:
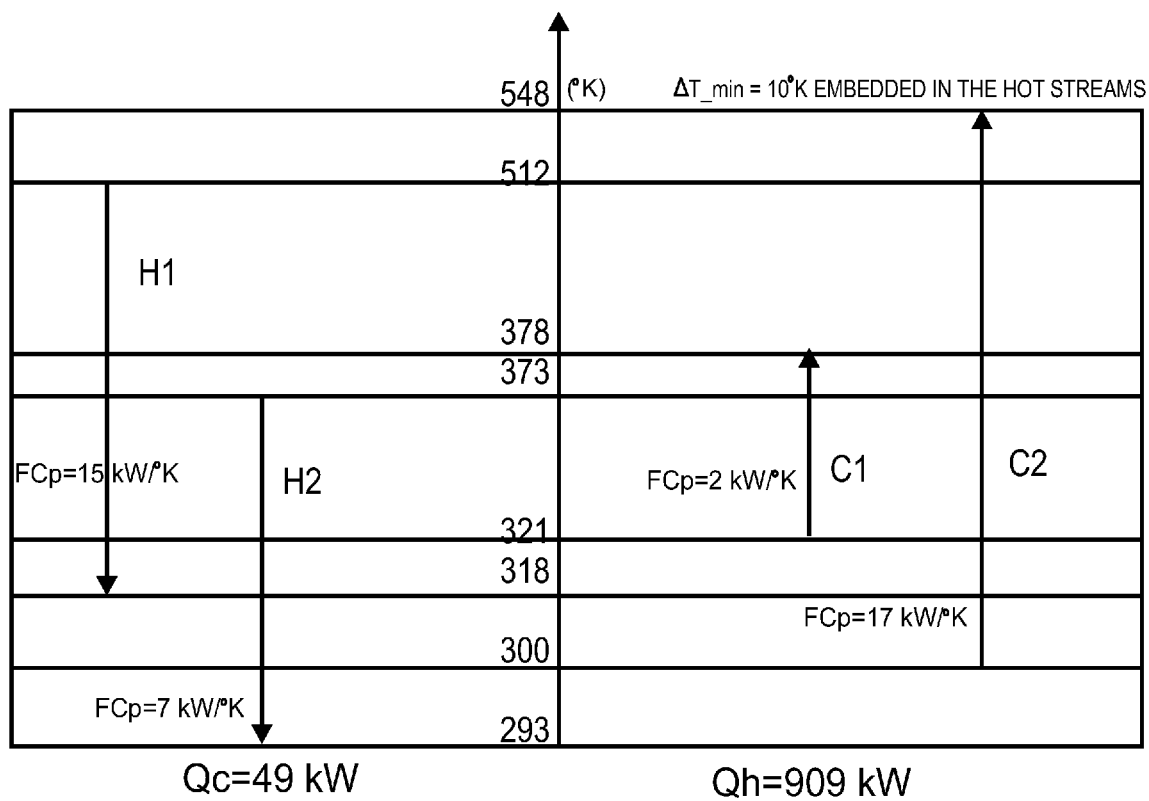
FIG. 21 is a diagram illustrating an industrial process including process streams shown with respect to temperature step intervals used in targeting and utility selection according to an embodiment of the present invention.
Figure 22:
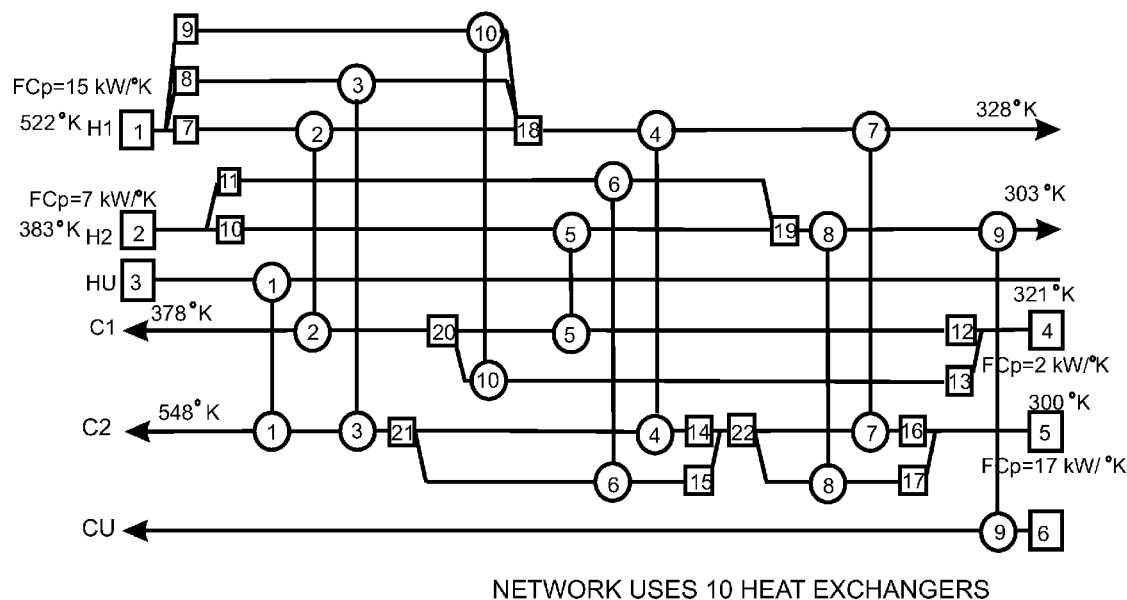
FIG. 22 is a schematic diagram of a result of a heat exchanger network synthesis implementation for the industrial process shown in FIG. 21 according to a pinch design method.
Figure 23:
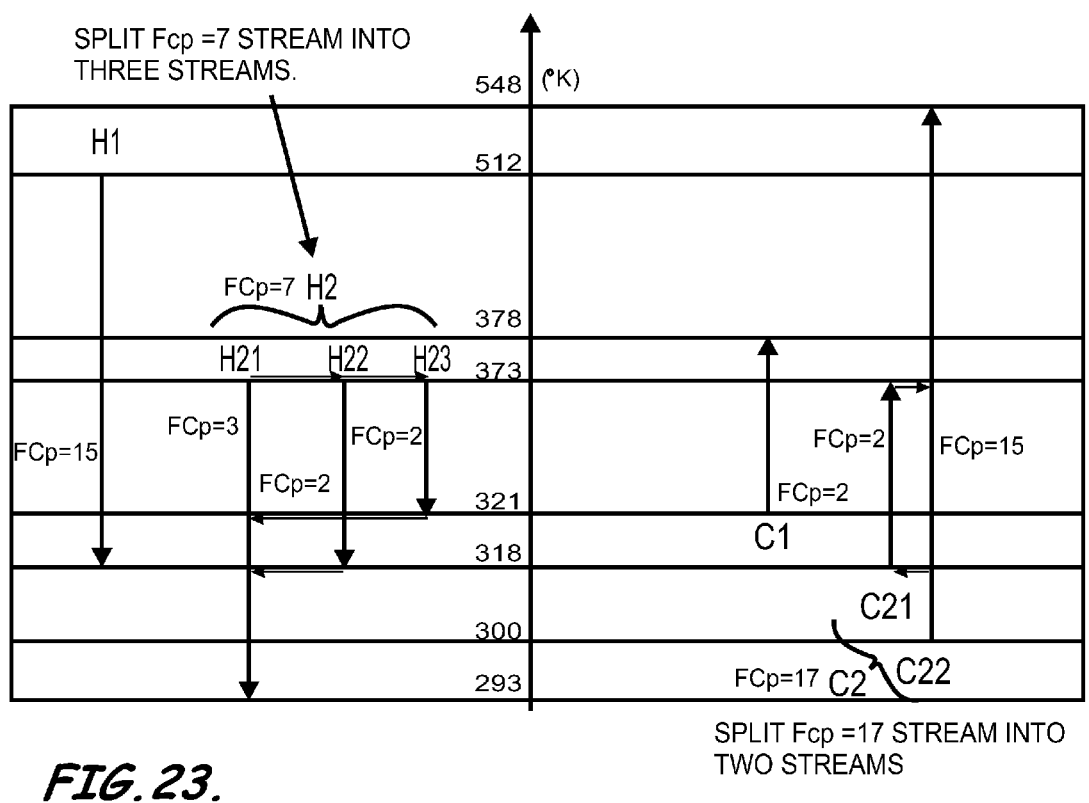
FIGS. 23-24 are schematic diagrams illustrating an application of streams splitting to synthesize a heat exchanger network for the industrial process shown in FIG. 21 according to an embodiment of the present invention.
Figure 24:
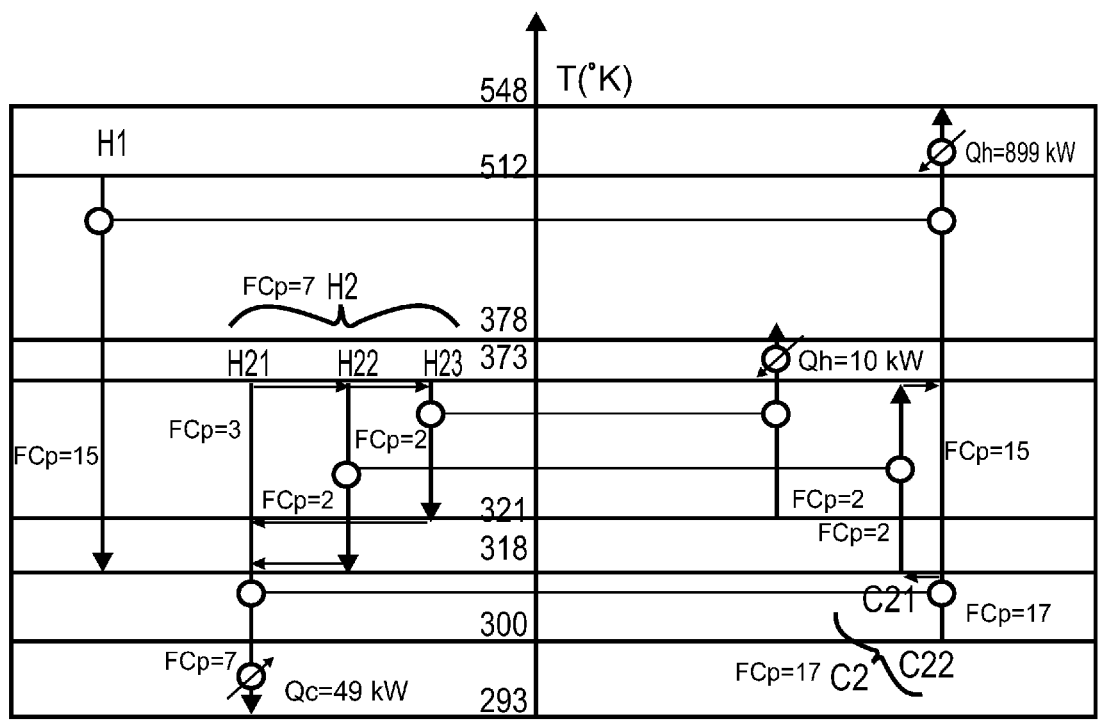

The first stream splitting example, as shown in FIG. 21, provides a simple industrial process overlaid upon successive temperature intervals 100 generated therefor, that includes four separate and distinct process streams H1, H2, C1, C2, having only discrete values for the supply temperature, target temperature, and heat capacity flow rate, and with a minimum temperature approach value ($\Delta T_{min}^i$) of 10° K embedded in each of the hot streams H1, H2, to facilitate a comparison between: the results of application of the, pinch design method followed by the software optimization option yielding a network design having ten heat exchangers (see FIG. 22); and that produced according to an embodiment of the present invention yielding a network design having only seven heat exchangers (FIGS. 23-24).

As part of the network synthesis according to the exemplary embodiment of the present invention, and as perhaps best shown in FIG. 23, hot stream H2 having a heat capacity flow rate FCp of 7 kW/° K (FIG. 22) is split into three separate hot streams H21, H22, H23, having heat capacity flow rates of 3 kW/° K, 2 kW/° K, and 2 kW/° K, and cold stream C2 having a heat capacity flow rate FCp of 17 kW/° K (FIG. 22) is split into two separate cold streams C21, C22, having heat capacity flow rates of 2 kW/° K and 15 kW/° K. Beneficially, the stream splitting allows: matching H1 with a stream C22 having an equal heat capacity flow rate, a complete canceling out between H22 and C21, and a maximum overlap with the equal heat capacity flow rate between H23 and C1 (see FIG. 24).

Figure 25:
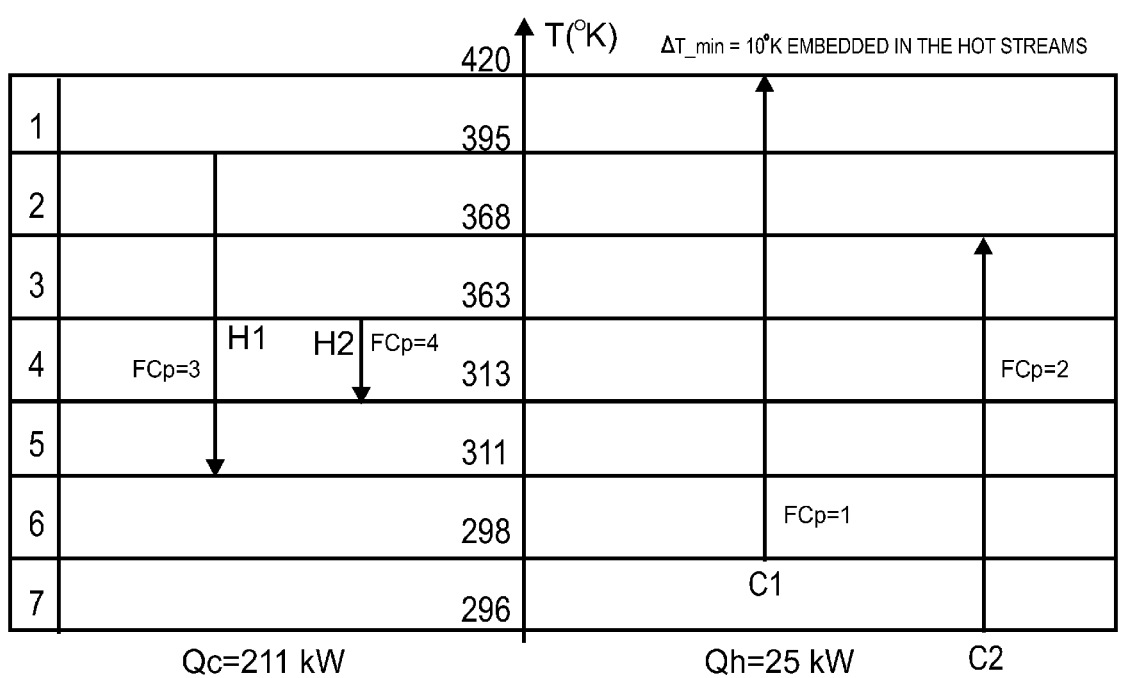
FIG. 25 is a diagram illustrating an industrial process including process streams shown with respect to temperature step intervals used in targeting and utility selection according to an embodiment of the present invention.
Figure 26:
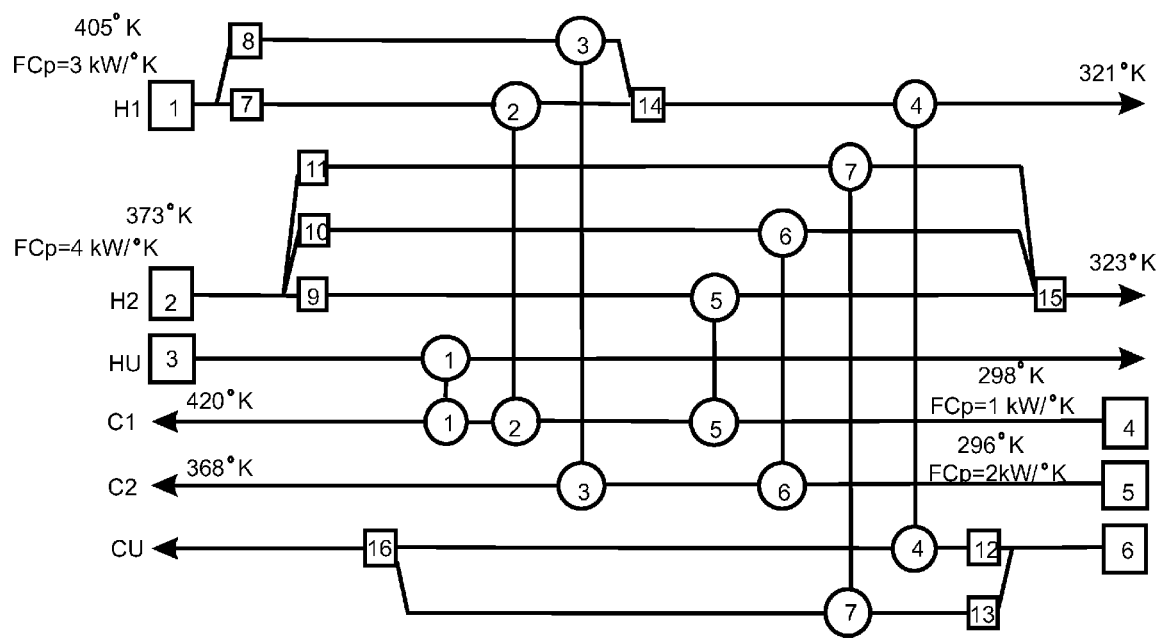
FIG. 26 is a schematic diagram of a result of a heat exchanger network synthesis implementation for the industrial process shown in FIG. 25 according to a pinch design method.
Figure 27:
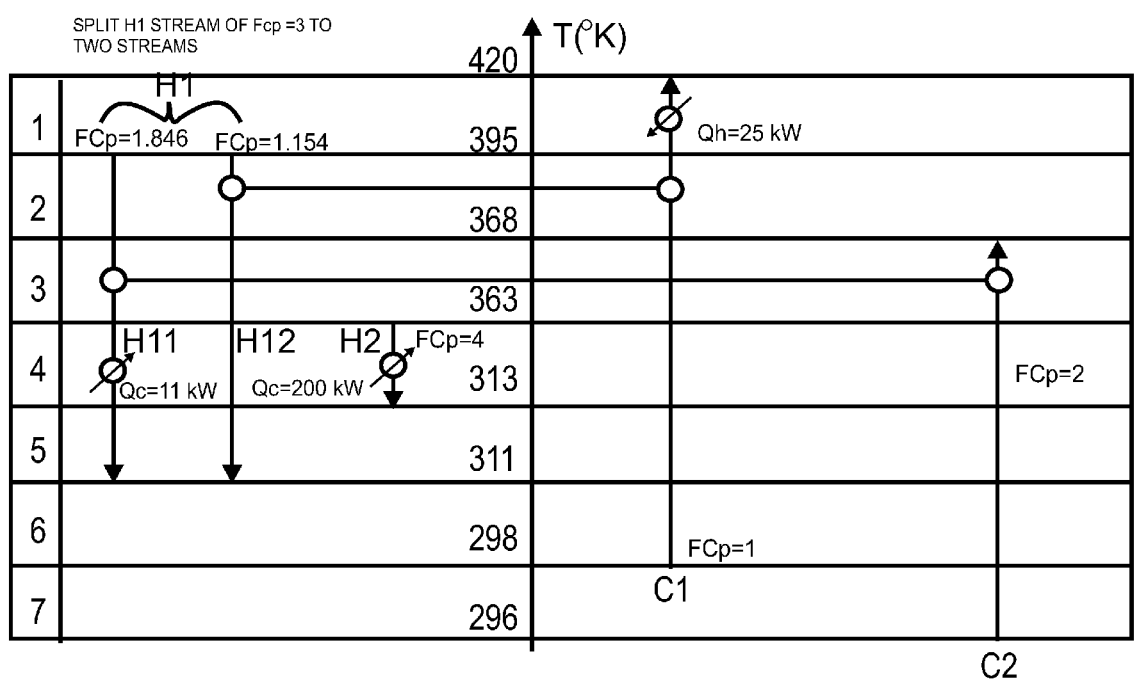
FIG. 27 is a schematic diagrams illustrating an application of streams splitting to synthesize a heat exchanger network for the industrial process shown in FIG. 25 according to an embodiment of the present invention.

The second stream splitting example, as shown in FIG. 25, provides another simple industrial process overlaid upon successive temperature intervals 100 generated therefor, that includes four separate and distinct process streams H1, H2, C1, C2, having only discrete values for the supply temperature, target temperature, and heat capacity flow rate, and with a minimum temperature approach value ($\neq T_{min}^i$) of 10° K embedded in each of the hot streams H1, H2, to facilitate a comparison between: the results of application of the pinch design method followed by the software optimization option yielding a network design having seven heat exchangers (see FIG. 26); and that produced according to an embodiment of the present invention yielding a network design having only five heat exchangers (FIG. 27).

As part of the network synthesis according to the exemplary embodiment of the present invention, and as perhaps best shown in FIG. 27, hot stream H1 having a heat capacity flow rate FCp of 3 kW/° K (FIG. 25) is split into two separate hot streams H11, H12, having heat capacity flow rates of 1.846 kW/° K and 1.154 kW/° K. Beneficially, the stream splitting allows matching C2 with a stream H11 at the highest temperature interval which can completely cancel C2, and matching C1 with a stream H12 at the highest temperature interval which has a close to equal heat capacity flow rate and can substantially cancel C1.

Industrial Constrained Problems.

In industrial applications, there can be many physical non-thermodynamic constraints in streams matching due to corrosion, safety, environmental, far apart, maintenance, controllability, start-up, fouling and so on. Further, there can be various preference-related non-thermodynamic constraints such as, for example, no desire for stream(s) splits or a requirement for a fewer number of heat exchangers. Such situations normally result in more utilities consumption and increased capital costs. As noted previously, optimal exploitation of streams conditions and the manipulation of its types in matching can be very beneficial for the heat exchanger network synthesis from both utilities consumption and number of heat exchanger units' points of view, especially when encountering non-thermodynamic constraints. Various embodiments of the program product 51 include, for example, instructions to convert a stream from having a mono-matching capability to that having a bi-matching capability according to the following procedures, which can be triggered upon having a forbidden match case.

FIGS. 28-38 provide two illustrative examples employing homogeneous (hot-to-hot, cold-to-cold) matching and two illustrative examples employing stream designation switching (e.g., changing or otherwise designating a certain stream attribute(s) of a hot/cold process stream to be changed or otherwise reassigned from a certain desired value to another one, changing or otherwise assigning the designation of a portion of the hot/cold process stream to that of a cold/hot stream, and changing the stream attribute value back to the initially desired value to achieve one of the target values, for example), to overcome certain process constraints.

Figure 28:
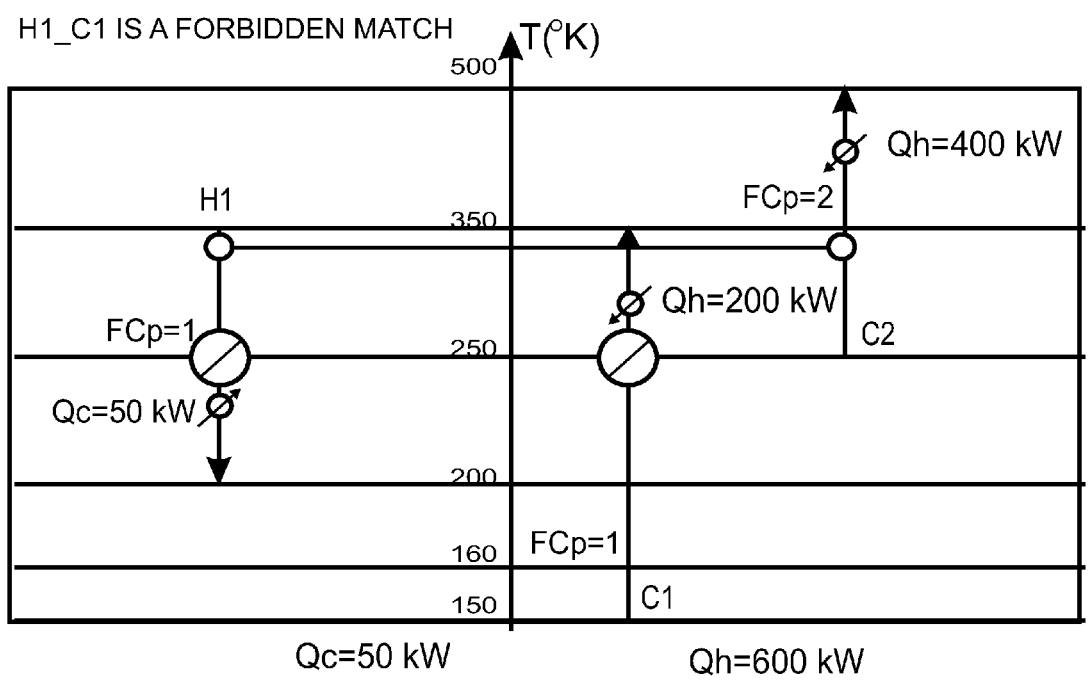
FIG. 28 is a diagram illustrating a non-thermodynamically constrained industrial process including process streams shown with respect to temperature step intervals used in targeting and utility selection according to an embodiment of the present invention.
Figure 29:
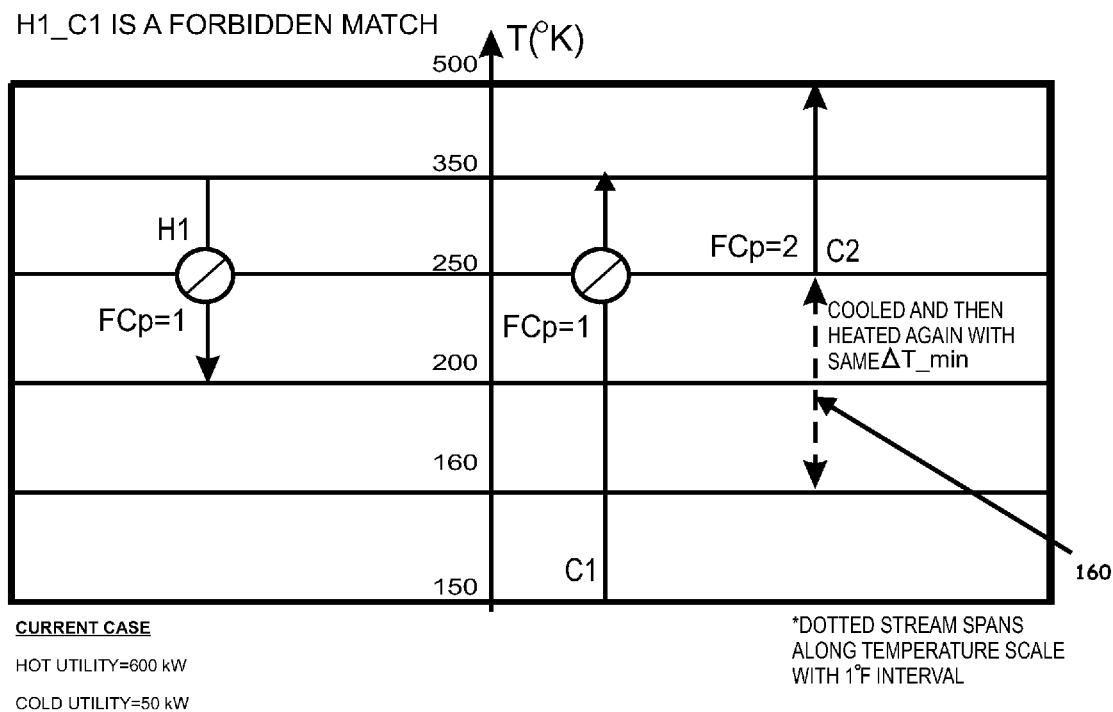
FIGS. 29-30 are schematic diagrams illustrating an application of homogeneous cold-cold stream matching to enhance synthesis of the heat exchanger network for the industrial process shown in FIG. 28 according to an embodiment of the present invention.
Figure 30:
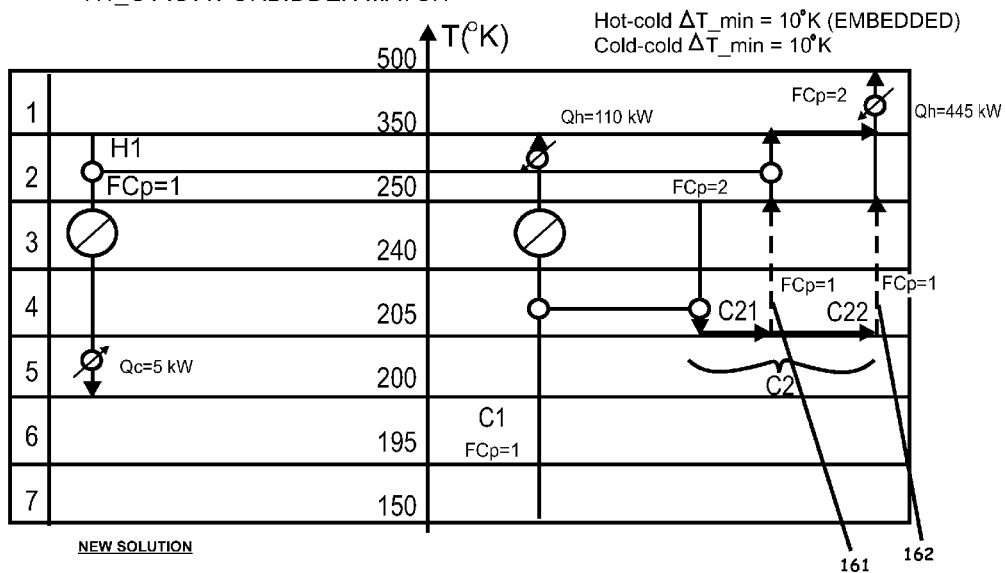

FIGS. 28-30, for example, introduce a scenario providing an opportunity for a first cold stream C1 to be heated up by a second cold stream C2 to recover hot utility, as C1 is constrained from matching with H1. FIG. 28, in particular, illustrates a simple non-thermodynamically constrained industrial process overlaid upon successive temperature intervals 100 generated therefor. The illustrated industrial process incorporates three separate and distinct process streams H1, C1, C2, having only discrete values for the supply temperature, target temperature, and heat capacity flow rate, and with a minimum temperature approach value ($\Delta T_{min}$) of 10° K embedded in hot stream H1. The industrial process has a non-thermodynamic constraint whereby H1 is forbidden from being matched with C1. Without application of a homogeneous "cold-to-cold" matching solution according to an embodiment of the present invention, the hot utility duty would be 600 kW and the cold utility duty would be 50 kW, as hot stream H1 would only be matched with cold stream C2.

As perhaps best shown in FIG. 29 at 160, as part of the network synthesis according to this exemplary embodiment of the present invention, cold stream C2, having a higher supply temperature than that of C1, can first be cooled to a medial point therebetween and then later heated to the desired target temperature. Specifically, as perhaps best shown in FIG. 30, upon employing the homogeneous match between cold stream C1 and cold stream C2, cold stream C2 is cooled below the 250° K supply temperature to the maximum extent possible by C1, which in this example would be 205° K using a cold-cold minimum temperature approach value ($\Delta T_{min}$) of 10° K. This results in a requirement whereby cold stream C2 will require more heating utilities to reach its target temperature than would have been necessary according to its original situation. To reduce such requirement, the excessively cooled cold stream, here cold stream C2, can then be heterogeneously matched with hot stream H1. Note, the $\Delta T_{min}$ used during the homogeneous and heterogeneous matching steps will have an effect on the outcome. That is, in the homogeneous matching step, cold stream C2 is cooled to a temperature of 205° K, which is a $\Delta T_{min}$ desired value above the C1 supply temperature, creating a new C2 supply temperature that is lower than the original. In the heterogeneous match step, such new supply temperature will be the one used in matching C2 with H1 to reduce the hot utility needs.

As further illustrated, multiple advanced matching solutions can be employed. For example, in this particular case, C2 can be split to form C21 and C22, each having a starting temperature of 205° K, and each having heat capacity flow rates of 1 kW/° K. Beneficially, the stream splitting allows matching C21 with a stream H1 at the highest temperature interval which has an equal heat capacity flow rate and can substantially cancel H1 (i.e., only the portion below the 205° K line still needs be cooled by a utility). This configuration reduces hot utility requirements from 600 kW to 555 kW and cold utility requirements from 50 kW to 5 kW.

Figure 31:
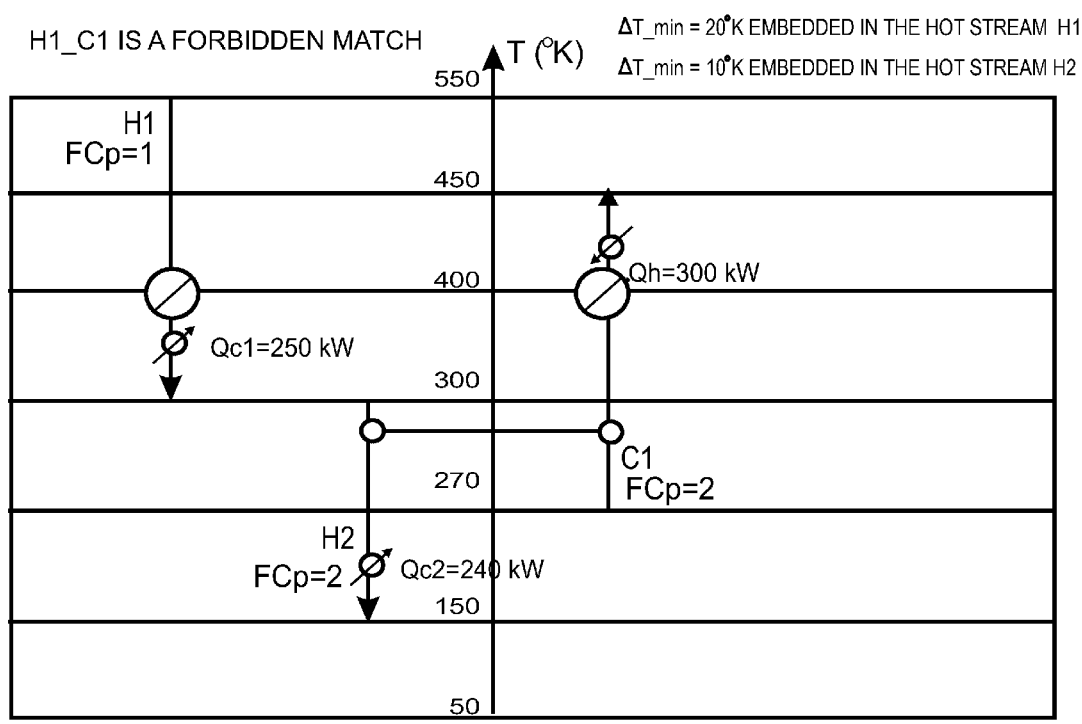
FIG. 31 is a diagram illustrating a non-thermodynamically constrained industrial process including process streams shown with respect to temperature step intervals used in targeting and utility selection according to an embodiment of the present invention.

FIG. 31 illustrates another simple non-thermodynamically constrained industrial process overlaid upon successive temperature intervals 100 generated therefor. The illustrated industrial process incorporates three separate and distinct process streams H1, H2, C1, each having only discrete values for the supply temperature, target temperature, and heat capacity flow rate, and with different minimum temperature approach values ($\Delta T_{min}^i$) of 20° K and 10° K embedded in hot streams H1, H2, respectively. The industrial process has a non-thermodynamic constraint whereby H1 is forbidden from being matched with C1. Without application of a homogeneous "hot-to-hot" matching solution according to an embodiment of the present invention, the hot utility duty would be 300 kW and the cold utility duty would be 490 kW, as only hot stream H2, having a minimal overlap, would be matched with cold stream C1.

Figure 32:
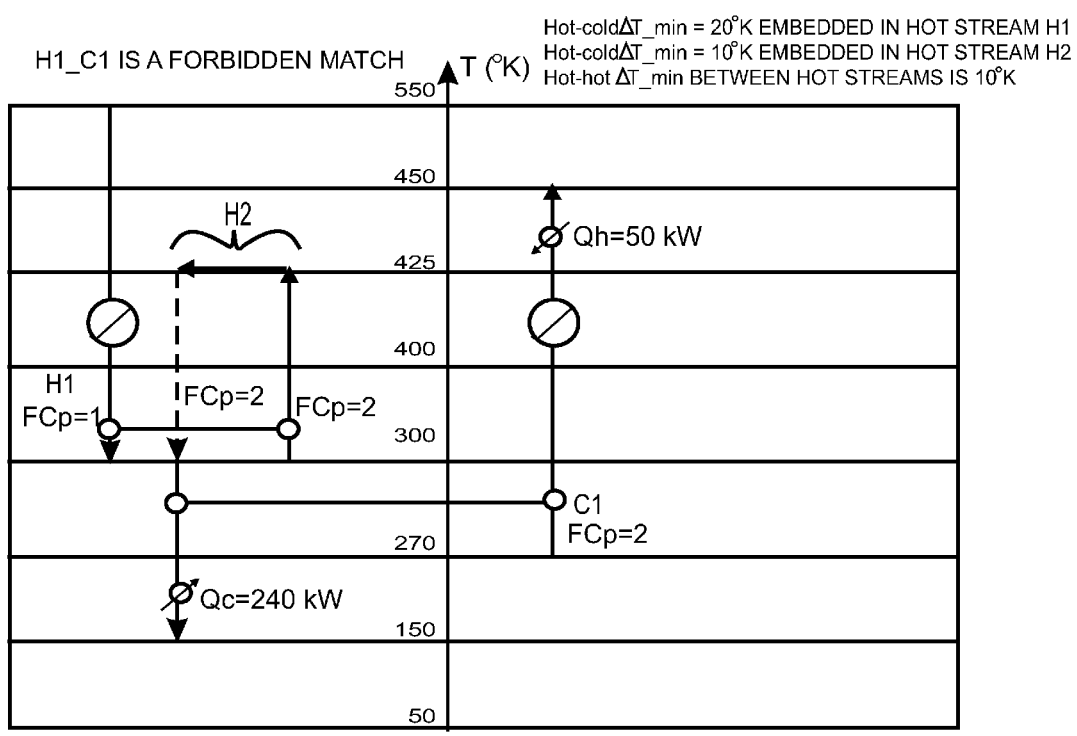
FIG. 32 is a schematic diagram illustrating an application of homogeneous hot-hot stream matching to enhance synthesis of the heat exchanger network for the industrial process shown in FIG. 31 according to an embodiment of the present invention.

As shown in FIG. 32, as part of the network synthesis according to this exemplary embodiment of the present invention, hot stream H2, having a lower supply temperature than that of H1, can first be heated to a medial point therebetween and then later cooled to the desired target temperature. Specifically, hot stream H2 is heated above the 300° K supply temperature to the maximum extent possible by H1, which, in this example, would be 425° K using a hot-hot $\Delta T_{min}$ of 10° K (equal to the difference between $\Delta T_{min}^{H1}$ and $\Delta T_{min}^{H2}$). As further illustrated, H2, having a heat capacity flow rate of 2 kW/° K, and now having a starting temperature of 425° K, is matched with C1 also having a heat capacity flow rate of 2 kW/° K, and now having a substantial overlap with H2. This configuration reduces hot utility requirements from 300 kW to 50 kW and cold utility requirements from 490 kW to 240 kW, using the same total number of heat exchangers.

Figure 33:
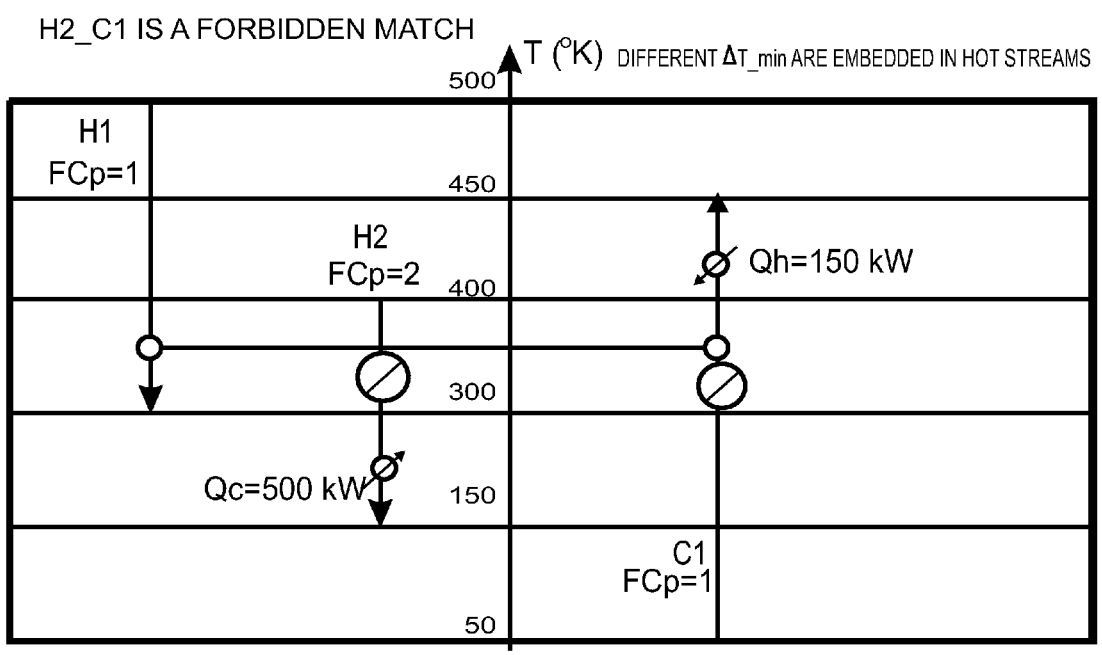
FIG. 33 is a diagram illustrating a non-thermodynamically constrained industrial process including process streams shown with respect to temperature step intervals used in targeting and utility selection according to an embodiment of the present invention.

FIG. 33 illustrates another simple non-thermodynamically constrained industrial process overlaid upon successive temperature intervals 100 generated therefor. The illustrated industrial process incorporates three separate and distinct process streams H1, H2, C1, each having only discrete values for the supply temperature, target temperature, and heat capacity flow rate, and with different minimum temperature approach values ($\Delta T_{min}^i$) embedded in hot streams H1, H2, respectively. The industrial process has a non-thermodynamic constraint whereby H2 is forbidden from being matched with C1. Without application of a "hot-to-cold" stream switching matching solution according to an embodiment of the present invention, the hot utility duty would be 150 kW and the cold utility duty would be 500 kW, as only hot stream H1 would be matched with cold stream C1.

Figure 34:
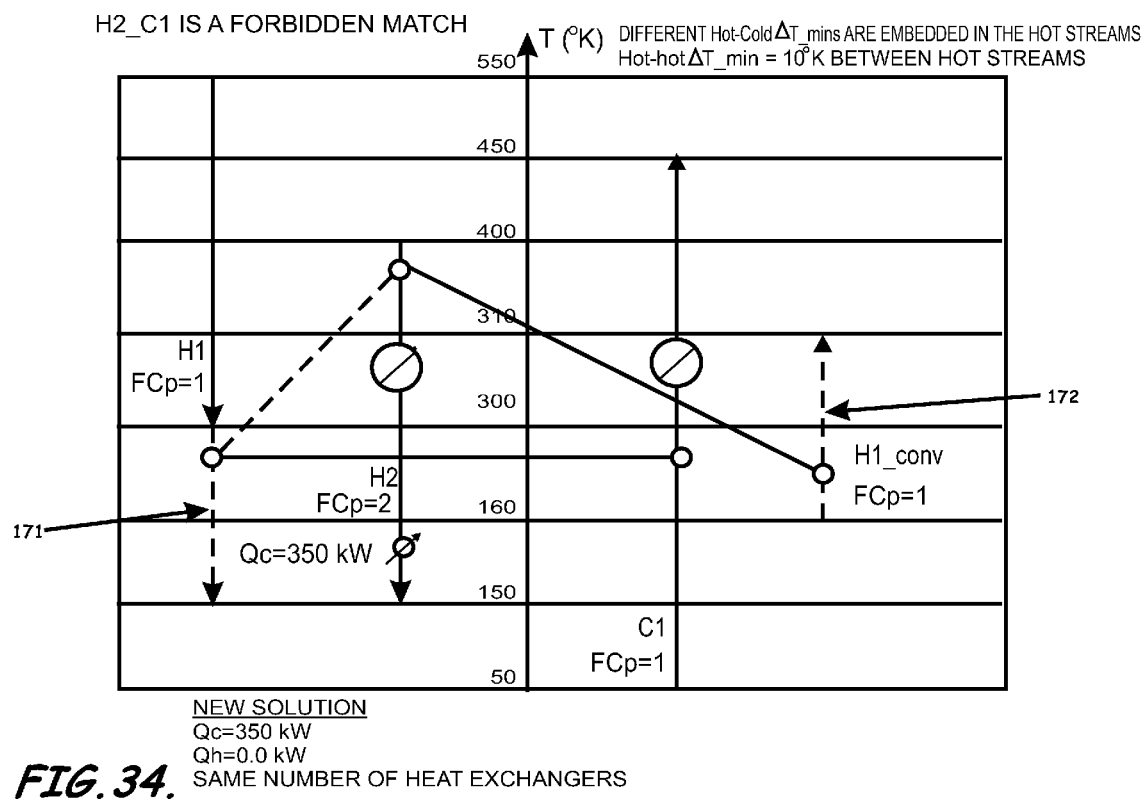
FIG. 34 is a schematic diagram illustrating an application of hot-cold stream switching to enhance synthesis of the heat exchanger network for the industrial process shown in FIG. 33 according to an embodiment of the present invention.

As shown in FIG. 34, as part of the network synthesis according to this exemplary embodiment of the present invention, hot stream H1, having a higher target temperature than that of H2, can first be cooled to a point below its target temperature and then later heated to the desired target temperature. Specifically, as shown at 171, hot stream H1 is cooled below the 300° K target temperature to the maximum extent possible by C1, which in this example would be 150° K. As further illustrated, the below-target portion of H1 (H1_conv) taking the role of a cold stream having a starting temperature of 160° K (using a hot-hot $\Delta T_{min}$ of 10° K) shown at 172 is matched with H2. This configuration uses an extra 150 kW of energy to completely cancel out C1 and then regains the energy from H2, thus reducing the hot utility requirements from 150 kW to 0 kW and cold utility requirements from 500 kW to 350 kW, using the same number of heat exchangers.

Figure 35:
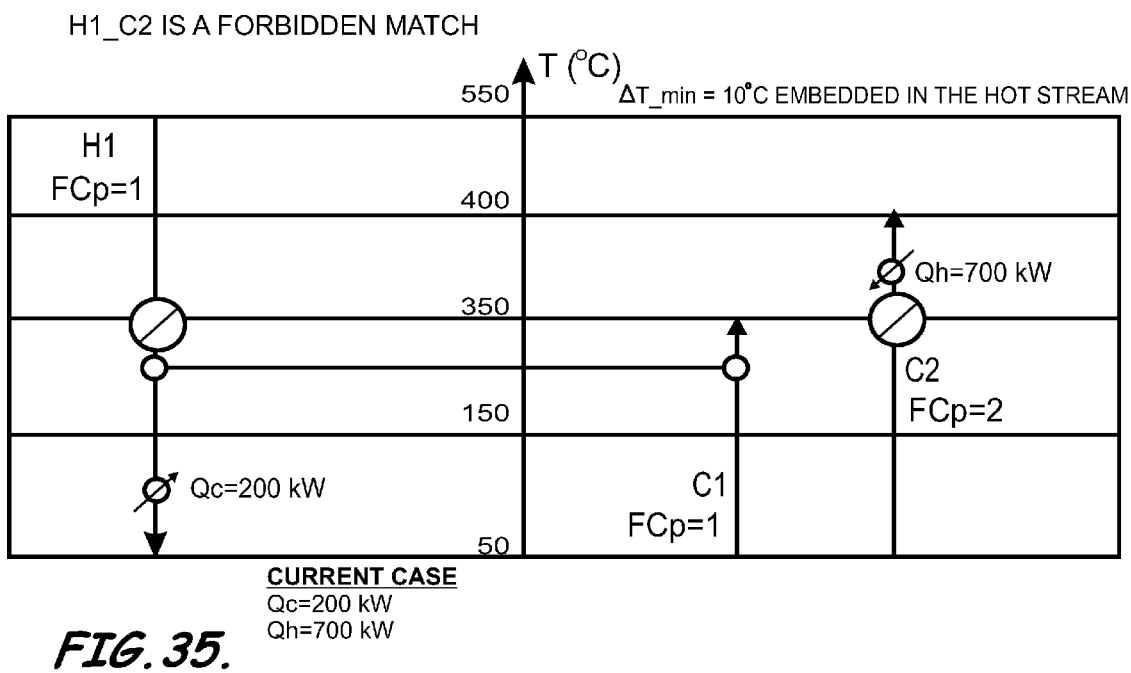
FIG. 35 is a diagram illustrating a non-thermodynamically constrained industrial process including process streams shown with respect to temperature step intervals used in targeting and utility selection according to an embodiment of the present invention.
Figure 37:
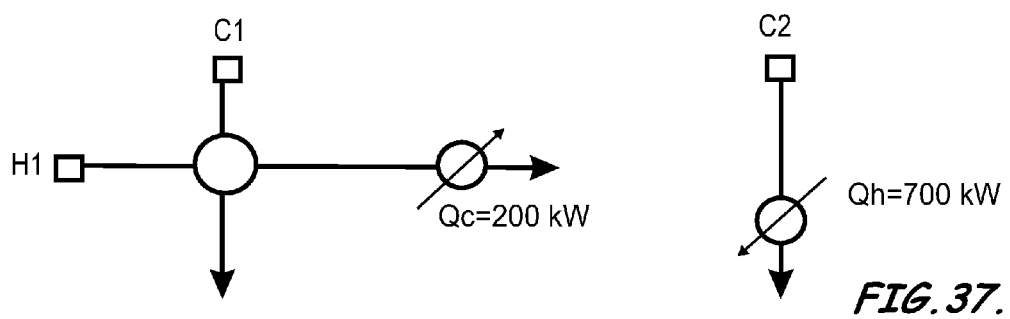
FIG. 37 is a schematic diagram of the heat exchanger network resulting from the industrial process shown in FIG. 35 prior to application of cold-hot stream switching according to an embodiment of the present invention.

FIG. 35 illustrates another simple non-thermodynamically constrained industrial process overlaid upon successive temperature intervals 100 generated therefor. The illustrated industrial process incorporates three separate and distinct process streams H1, C1, C2, each having only discrete values for the supply temperature, target temperature, and heat capacity flow rate, and with a minimum temperature approach value ($\Delta T_{min}$) of 10° C. embedded in hot stream H1. The industrial process has a non-thermodynamic constraint whereby H1 is forbidden from being matched with C2. Without application of a "cold-to-hot" stream switching matching solution according to an embodiment of the present invention, the hot utility duty would be 700 kW and the cold utility duty would be 200 kW, as hot stream H1 would be matched with only cold stream C1. FIG. 37 provides a depiction illustrating a simple heat exchanger network resulting from the configuration shown in FIG. 35 prior to application of the "cold-to-hot" stream switching matching solution.

Figure 36:
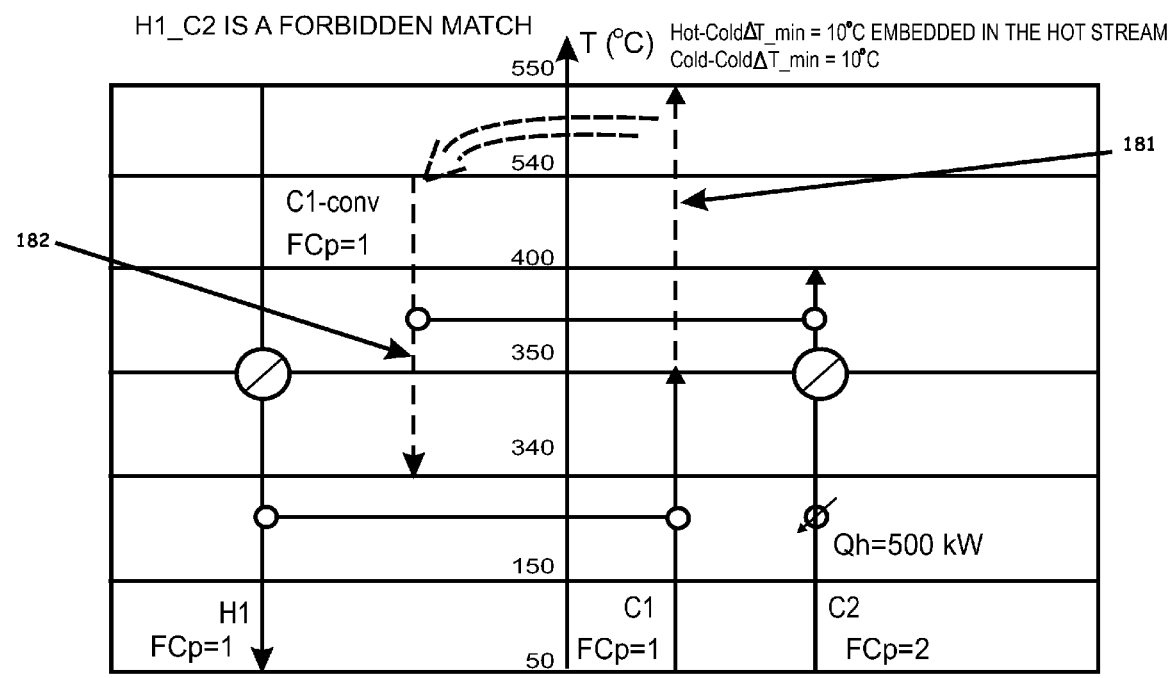
Figure 38:
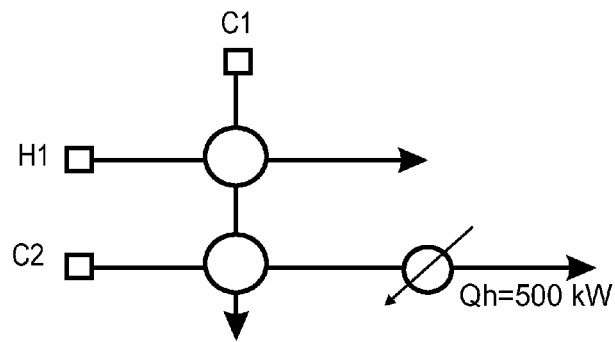
FIG. 38 is a schematic diagram of the heat exchanger network resulting from industrial process shown in FIG. 35 after application of cold-hot stream switching shown in FIG. 36 according to an embodiment of the present invention.

As perhaps best shown in FIG. 36, as part of the network synthesis according to this exemplary embodiment of the present invention, cold stream C1, having a lower target temperature than that of C2, can first be heated to a point above its target temperature and then later cooled to the desired target temperature. Specifically, cold stream C1 is heated above the 350° C. target temperature to the maximum extent possible by H1 as shown at 181, which in this example would be 550° C. As further illustrated, the above-target portion of C1 (C1_conv) taking the role of a hot stream as shown at 182 having a starting temperature of 540° C. (using a cold-cold $\Delta T_{min}$ of 10° C.) is matched with C2. This configuration uses an extra 200 kW of energy to completely cancel out H1 and then transfers this excess energy to C2, thus reducing the hot utility requirements from 700 kW to 500 kW and cold utility requirements from 200 kW to 0 kW, using the same total number of heat exchangers. FIG. 38 provides a depiction illustrating a simple heat exchanger network resulting from the configuration shown in FIG. 36.

According to various embodiments of the present invention, a subroutine (not shown) in the form of a feasibility test is run to determine whether homogeneous matching, stream switching, or a combination thereof, will yield better results. For example, it can be seen that a hot-to-hot homogeneous match between hot streams H1 and H2 of the simple non-thermodynamically constrained industrial process shown in FIG. 33 would not be the desired solution as the hot stream H2 having the non-thermodynamic constraint with the sole cold stream C1 has a lower supply temperature than that of hot stream H1. Similarly, it can be seen that a cold-to-cold homogeneous match between cold streams C1 and C2 of the simple non-thermodynamically constrained industrial process shown in FIG. 35 would not be the desired solution as the cold stream C2 having the non-thermodynamic constraint with the sole hot stream H1 has the same supply temperature as that of cold stream C1.

Note, according to various embodiments of the present invention, multiple advanced matching solutions can be employed separately or simultaneously. Note, U.S. patent application Ser. No. 12/575,743, filed Oct. 8, 2009, titled "System, Method, and Program Product for Targeting and Identification of Optimal Process Variables in Constrained Energy Recovery Systems," incorporated by reference in its entirety, provides further discussion regarding modeling the energy consumption of a non-thermodynamically constrained waste heat recovery processes to maximize process and utility utilization efficiency.

Note also, homogeneous matching and stream switching, according to various embodiments of the present invention, are provided as an improvement over the use of buffer streams as understood by the skilled in the art, positioned between constrained process streams. Inclusion of buffer streams, if feasible, to overcome non-thermodynamic constraints, however, is still within the scope of various embodiments of the present invention, depending upon its availability and the capital cost impact of its associated components. Accordingly, various embodiments of the present invention can also include the step of analyzing the feasibility of and capital cost related to employing buffer streams to thereby determine the overall effectiveness of the various methodologies of overcoming the non-thermodynamic constraints. Application of homogeneous matching and stream type switching, however, in most cases, provides the most cost-effective methodology along a continuum of a trade-off between resource preservation and capital investment.

Employment of buffer streams, however, is not as mechanically simple or inexpensive as is the case in homogenous matching and/or switching the type of stream in a certain range according to various embodiments of the present invention, which generally only requires adding new heat exchangers. Rather, employment of buffer streams entails building and maintaining the new system infrastructure (water, hot oil, steam and so on). Beneficially, using the above described homogeneous matching and/or stream type switching technique provides substantial capital cost savings if application thereof renders sufficient heat recovery. Notably, even if the decision is made to employ a buffer stream rather than homogeneous matching or stream type switching, employment of only one buffer system may not be sufficient to accomplish the required goals. Often, multiple buffer systems may be needed. For example, in a scenario whereby a very hot stream and a very cold stream forbidden match exists, the network designer may need to build both a steam generation system (waste heat boiler and its associated components) and a chilled water system. Thus, unless the amount of additional waste heat recovery that can be extracted for heating capacity and/or cooling capacity using one or more buffer systems to overcome the situation of forbidden matches are sufficient to justify the systems capital cost; or unless the required materials to build the buffer streams are already in place, the above described homogeneous matching and/or stream type switching techniques according to various embodiments of the present invention, will generally provide more cost effective solutions to such types of situations of stream forbidden matches.

Step 6: Step 6 includes completing or continued processing and/or graphically displaying to a decision maker, for example, an initial heat exchanger network design provided as a result of the stream matching and stream splitting steps. According to an embodiment of the present invention, the initial heat exchanger network and/or other statistics can be displayed on a graphical user interface such as graphical user interface 39 or on a separate remote computer/computer display (not shown) in communication with network 38 (see FIG. 1).

Step 7: Step 7 includes removing (merging) any redundant process-to-process heat exchanger units. That is, any heat exchanger units extending between the same two process streams can be consolidated into a single heat exchanger, if feasible, to reduce the heat exchanger requirements.

Step 8: Similar to Step 7, Step 8 includes merging any heat exchanger units extending between the same process and utility streams into a single heat exchanger, if feasible, to reduce the heat exchanger requirements.

Step 9: Finally, Step 9 includes determining the final heat exchanger network design based upon the initial design and based upon the consolidating/merging process.

Grass-roots Design of Optimal Topology for Future Retrofit

Various embodiments of the present invention provide systems, program product, and methods of synthesizing an, e.g., grass-roots, heat exchanger network for an industrial process including multiple hot process streams to be cooled and multiple cold process streams to be heated, and various hot and/or cold utilities to supplement the waste heat recovery system.

The table below provides a high-level summary of a heat exchanger network synthesis algorithm which produces heat exchanger network structures specifically configured for future retrofit according to an embodiment of the present invention:

| Step # 1: | Start heat exchanger network (HEN) synthesis using high minimum temperature approach value or set of values. |
|---|---|
| Step # 2: | Synthesize several HENs at sequentially lower minimum temperature approach values using a systematic method. |
| Step # 3: | Produce HENs that are all exhibiting the same structure/topology and differ only in load allocation (heat exchanger duty or heat transfer between streams) and the possibility of adding additional heat exchanger units and/or bypassing excess heat exchanger units partially and/or completely. |
| Step # 4: | Select network that satisfies current economic criteria and keep other designs for future retrofit upon the change in the trade-off between energy cost and capital cost. |
| Step # 5: | Reserve in the plant layout sufficient free space for the specific heat exchangers that will require extra surface area in the future due to anticipated possible increased load. |

Steps 1-3: The steps of synthesizing a grassroots heat exchanger network for future retrofit by synthesizing several grass-roots heat exchanger network designs at sequentially lower minimum temperature approach values $\Delta T_{min}^{i}$ beginning at a high ("maximum") minimum temperature approach value (or set of values) using a systematic method, in accordance with steps 1-3, are shown, for example, in FIGS. 39-43, according to an example of an embodiment of the present invention. That is, the exemplary implementation shown in FIGS. 39-43 illustrates an example of a step-by-step synthesis of a grassroots-design-for-future-retrofit to include an illustration of how application of sets of successively different (e.g., lower) stream-specific minimum temperature approach values $\Delta T_{min}^{i}$ for each hot process stream, beginning, for example, at the highest minimum temperature approach values, followed by successively lower minimum temperature approach values, can yield a series of heat exchanger network configurations having common network structures, but with the possibility of having successively fewer numbers of heat exchanger units, which can be used to facilitate construction on a heat exchanger network that has a topology that is easily retrofittable based on possible future differing load requirements. Note, although the exemplary configuration features beginning at a maximum temperature approach value or set of values, embodiments where a minimum temperature approach value or values are used to begin the analysis are within the scope of the present invention.

Figure 39:
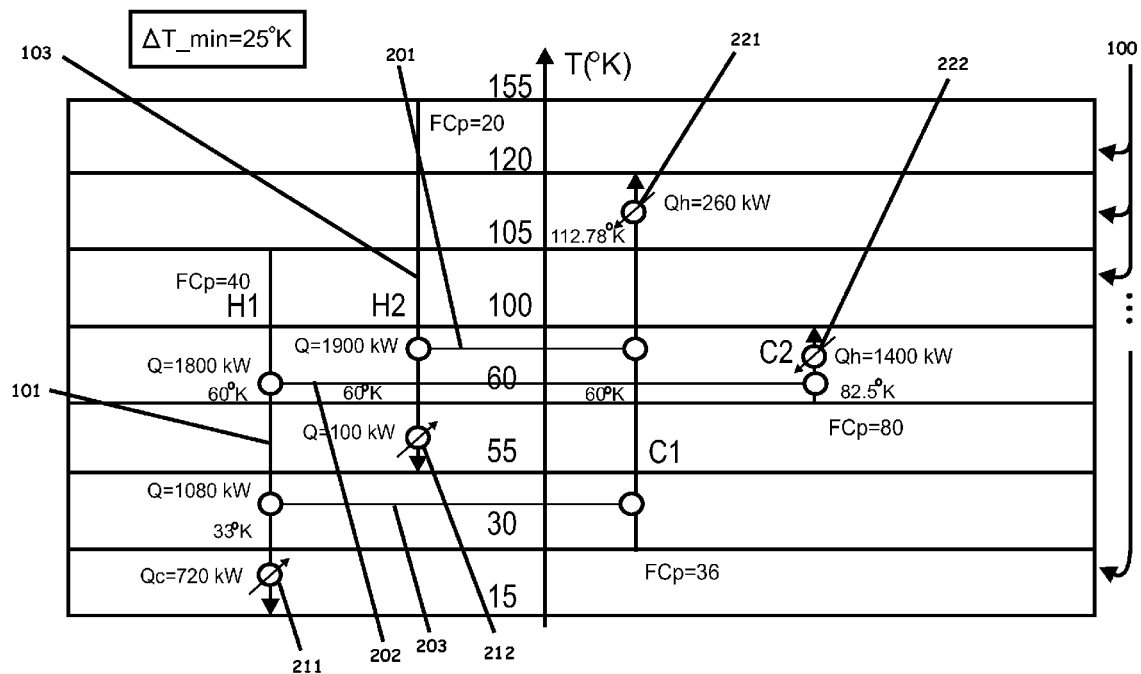

Specifically, FIG. 39 provides another simple example of an industrial process overlaid upon successive temperature intervals 100 generated therefor, that includes four separate and distinct process streams H1, H2, C1, C2, with hot stream H1 having an actual supply temperature of 130° K (shown as 105° K due to embedding of the $\Delta T_{min}^{i}$), a target temperature of 40° K, and a heat capacity flow rate (FCp) of 40 kW/° K; with hot stream H2 having a supply temperature of 180° K, a target temperature of 80° K, and a heat capacity flow rate (FCp) of 20 kW/° K; with cold stream C1 having a supply temperature of 30° K, a target temperature of 120° K, and a heat capacity flow rate (FCp) of 36 kW/° K; and with cold stream C2 having a supply temperature of 60° K, a target temperature of 100° K, and a heat capacity flow rate (FCp) of 80 kW/° K. Further, both hot streams H1, H2, are initially assigned a same minimum temperature approach value ($\Delta T_{min}^{i}$) of 25° K, for simplicity, which are embedded in each of the hot streams' temperature intervals 100—i.e., the supply and target temperatures for hot streams H1 and H2 are each shifted down by an amount equal to their individual minimum temperature approach values ($\Delta T_{min}^{i}$), which in FIG. 39 is 25° K for both.

That is, in order to produce the successive temperature intervals 100 shown, for example, in FIG. 39, the $\Delta T_{min}^{H1}$ value of 25° K is deducted from the hot stream supply temperature of 130° K for H1 and the target temperature of 40° K for H1 and the $\Delta T_{min}^{H2}$ value 25° K is deducted from hot stream supply temperature of 180° K for H2 and the target temperature of 80° K for H2 to produce the values at the tale and head of the respective hot stream arrows 101, 103, of 105° K, 15° K, for H1, and 155° K, 55° K for H2, respectively. The resulting heat exchanger network illustrated in the figure includes three process-to-process heat exchangers 201, 202, 203, two cooling utility heat exchangers (or coolers) 211, 212, and two heating utility heat exchangers (or heaters) 221, 222.

FIGS. 40-43 illustrate the industrial process identified with respect to FIG. 39 overlaid upon separately generated successive temperature intervals 100 individually generated to account for the respective successively lower assigned minimum temperature approach values for the hot streams H1, H2, which include the same process structure (e.g., the same number of process-to-process heat exchangers), but with differing load values, i.e., a different amount of heat exchanged by one or more of the process-to-process heat exchanger and a corresponding different cooling and/or heating utility requirement.

Figure 40:
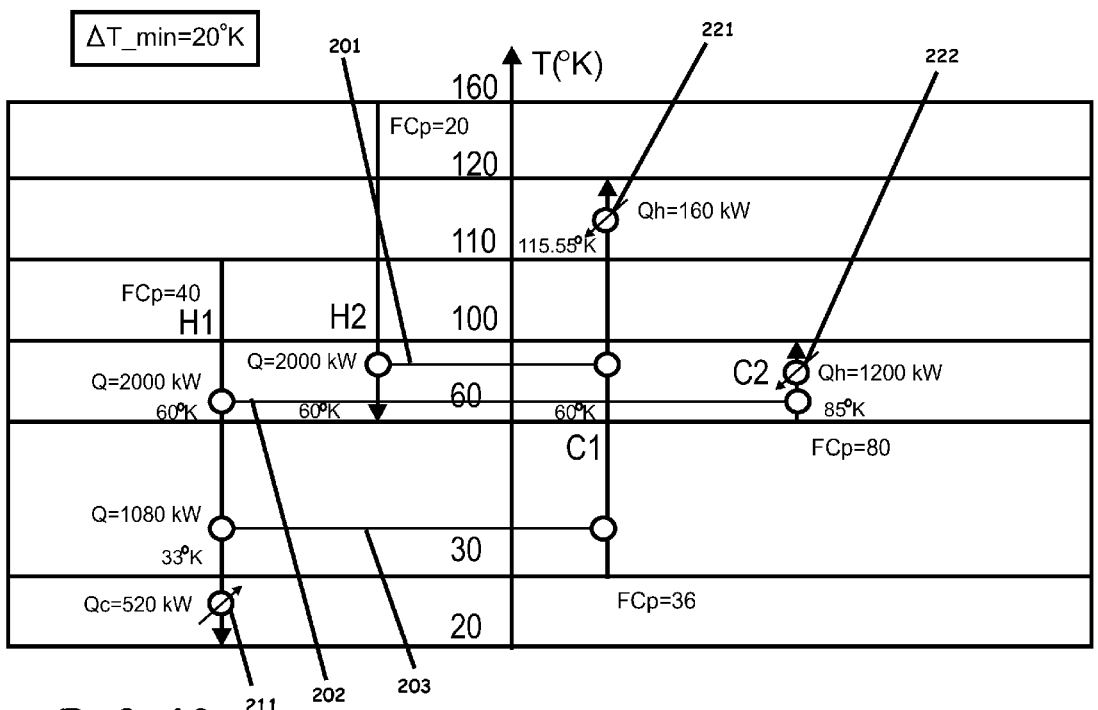

Specifically, FIG. 40 illustrates the heat exchanger network shown in FIG. 39 for the exemplary industrial process, but with the network load allocation values calculated using 20° K instead of 25° K for $\Delta T_{min}^{H1}$ and $\Delta T_{min}^{H2}$. The lower minimum temperature approach values result in an increase in the load/duty requirement for heat exchangers 201 and 202, a reduction in the heating energy required by heaters 221, 222, a reduction in the cooling energy required by cooler 211, and a reduction in the cooling energy required by cooler 212 to "zero" (negating the need for the H2 cooler 212), which results in a heat exchanger network requiring only the three process-to-process heat exchangers 201, 202, 203, one cooler 211, and two heaters 221, 222.

In practice, the negation of cooler 212 (existing in FIG. 39), if in physical existence, means that if a decision maker decides to utilize a lower set of $\Delta T_{min}^{H1}$ and $\Delta T_{min}^{H2}$ values such as, for example, due to a substantial increase in utility costs that are sufficiently high enough to offset any required capital costs, as part of the retrofit process, cooler 212 would be by-passed or retired and the hot stream heat exchangers 201, 202, would be retrofitted, if necessary, to carry the additional load/duty over that required according to the network design shown in FIG. 39.

Figure 41:
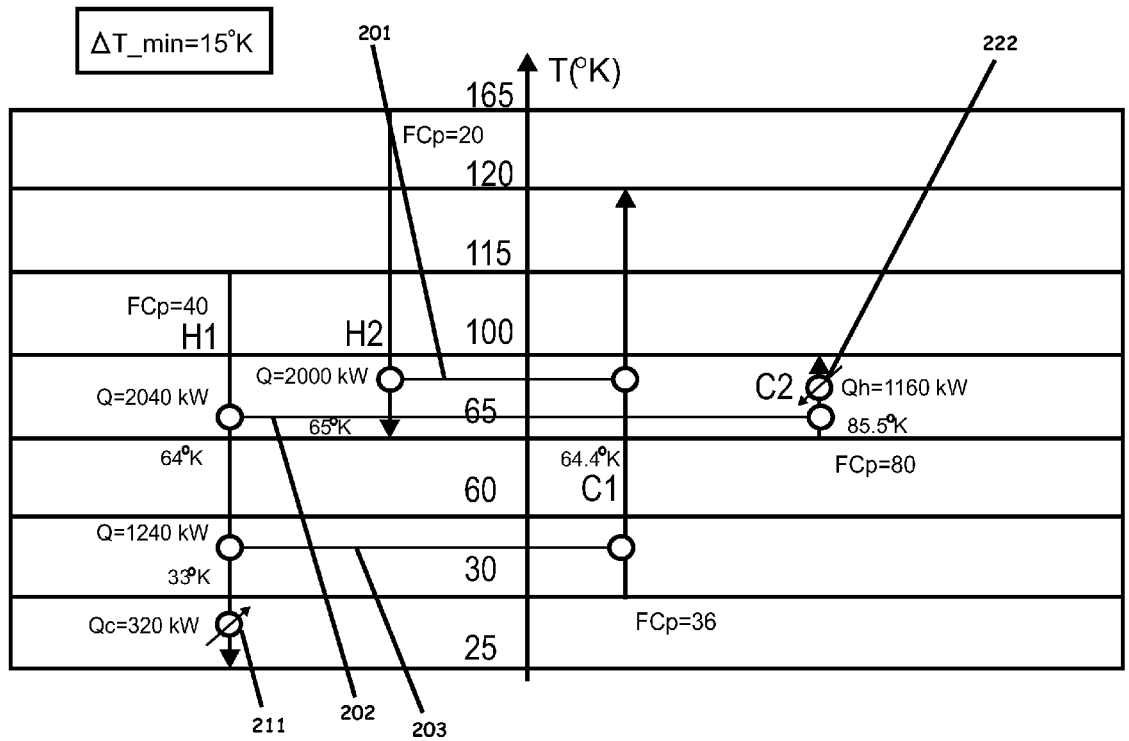

FIG. 41 illustrates the heat exchanger network shown in FIGS. 39 and 40 for the exemplary the industrial process, but with the network load allocation values calculated using 15° K for $\Delta T_{min}^{H1}$ and $\Delta T_{min}^{H2}$. The lower minimum temperature approach values result in a further increase in the load/duty requirement for heat exchangers 202 and 203, a further reduction in the cooling energy required by cooler 211, a further reduction in the heating energy required by heater 222, and a further reduction in the heating energy required by heater 221 to "zero" (negating the need for the C1 heater 221), which results in a heat exchanger network requiring only the three process-to-process heat exchangers 201, 202, 203, the one cooler 211, and the one heater 222.

Figure 42:
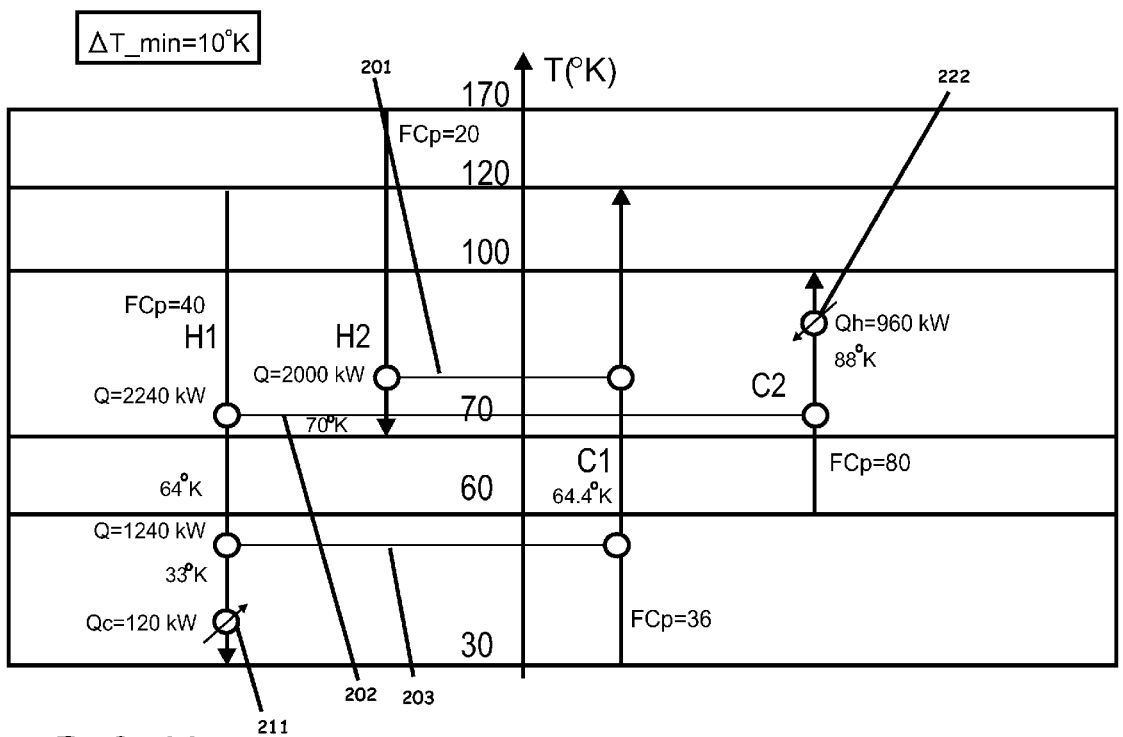

FIG. 42 illustrates the heat exchanger network shown in FIGS. 39-41 for the exemplary industrial process, but with the network load allocation values calculated using 10° K for $\Delta T_{min}^{H1}$ and $\Delta T_{min}^{H2}$. The lower minimum temperature approach values result in still a further increase in the load/duty requirement for heat exchanger 202, a further reduction in the cooling energy required by cooler 211, and a further reduction in the heating energy required by heater 222, which results in the same heat exchanger network configuration shown in FIG. 41, i.e., the three process-to-process heat exchangers 201, 202, 203, the one cooler 211, and the one heater 222, but with the different load allocation values.

FIG. 43 illustrates the heat exchanger network shown in FIGS. 39-42 for the exemplary industrial process, but with the network load allocation values calculated using 5° K for $\Delta T_{min}^{H1}$ and $\Delta T_{min}^{H2}$. The lower minimum temperature approach values result in yet a further increase in the load/duty requirement for heat exchanger 203, a further reduction in the heating energy required by heater 222, and a further reduction in the cooling energy required by cooler 211 to "zero" (negating the need for the H1 cooler 211), which results in a heat exchanger network requiring only the three process-to-process heat exchangers 201, 202, 203, and the one heater 222.

Note, although shown as successively being lowered in increments of 5° K, it should be understood that the individual minimum temperature approach values can be lowered at some other interval, e.g., 1° K; at intervals that are different for the hot stream H1 and that of the hot stream H2, e.g., 1° K for H1 and 2° K for H2; at intervals that change at least once during the successively lower design iterations, e.g., 5° K, 2° K, 1° K, etc., for H1; or at various combinations thereof. Note also, it should be understood that each of the successive heat exchanger network designs can be produced according to the various matching criteria for thermodynamically constrained, non-thermodynamically constrained, and non-constrained process systems, described previously.

Beneficially, the results of steps 2 and 3 provides a continuum of user selectable heat exchanger network designs extending, for example, between (1) a heat exchanger network design having hot streams assigned a set of minimum temperature approach values $\{\Delta T_{min}^{i}\}$ established at a corresponding set of expected maximum values, generally resulting in a most heat exchanger populated heat exchanger network design due to the need for utilities (heaters and coolers), and (2) a heat exchanger network design having hot streams assigned a set of minimum temperature approach values $\{\Delta T_{min}^{i}\}$ established at a corresponding set of expected minimum values, generally resulting in a least heat exchanger populated heat exchanger network design due to a lesser requirement for utilities (heaters and/or coolers), but with heat exchanger units that generally require more surface area and other capital investment.

Further beneficially, the most heat exchanger populated heat exchanger network design can be used to identify the maximum amount of real estate necessary for providing necessary hot and cold utilities streams and hot and cold utilities heat exchangers; and the least heat exchanger populated heat exchanger network design can be used to identify the maximum amount of real estate necessary for retrofitting or otherwise providing heat exchangers for delivering a maximum design required load or heat transfer requirement. For example, FIG. 39, assigned a set of minimum temperature approach values $\{\Delta T_{min}^{i}\}$ having expected maximum values of 25° K for all hot streams, illustrates the heat exchanger network design for this example with the maximum number of required heat exchangers. In contrast, FIG. 43, assigned a set of minimum temperature approach values $\{\Delta T_{min}^{i}\}$ having expected minimum values of 5° K for all hot streams, illustrates the least heat exchanger populated heat exchanger network design for this example having process-to-process heat exchangers at their maximum required heat transfer requirement. I.e., process-to-process heat exchangers 201, 202, 203, for the least heat exchanger populated network design (FIG. 43) have loads equaling 2000 kW, 2360 kW, and 1240 kW, respectively, thereby requiring the largest heat exchanger surface area, whereas the most heat exchanger populated heat exchanger network design (FIG. 39) in this example have loads equaling 1900 kW, 1800 kW, and 1080 kW, respectively, thereby requiring the least process-to-process heat exchanger surface area, but the most amount of utilities and utility heat exchangers (heaters and coolers).

Step 4: Step 4 includes selection of a network from within the continuum of user selectable heat exchanger network designs that satisfies current economic criteria such as, for example, the trade-off between capital costs/investment and the current and forecast cost of heating or cooling utilities. The step can also include maintaining the heat exchanger network designs within the continuum that were not selected to provide the blueprint for a future retrofit upon the change in the trade-off between energy cost and capital cost.

Step 5: Step 5 applies to an initial build/development of the industrial process facility or a current retrofit. Specifically, step 5 includes reserving in the plant layout sufficient free space for the specific heat exchangers that will require extra surface area in the future due to anticipated possible increased load, for example, due to a sufficient increase in the cost of heating, cooling, or heating and cooling utilities, depending upon that utilized and/or required according to the current network design and according to that which would be required according to the higher-load, reduced-utility retrofit design.

Optionally and/or alternatively, step 5 can also include reserving in the plant layout sufficient free space for the addition of additional utilities such as, for example, due to a sufficient decrease in the cost of heating, cooling, or heating and cooling utilities, in conjunction with a requirement to replace one or more heat exchanger units, such as, for example, due to damage or age, again, depending upon that utilized and/or required according to the current network design and according to that which would be required according to the lower-load, increased-utility retrofit design.

For illustrative purposes, assume that during plant design, the heat exchanger network shown in FIG. 40 having three process-to-process heat exchangers 201, 202, 203, one cooling utility exchanger 211, and two heating utility exchangers 221, 222, was chosen due to the trade-off between capital costs and energy costs. In this illustration, assume that "down-the-road," the cost of both heating and cooling energy suffers a substantial increase, and the capital cost of heat exchangers having a larger surface area have remained flat, decreased, or only minimally increased. Because, during the design of the plant layout, sufficient free space was left available to accommodate the surface area needed to upgrade the process-to-process heat exchangers 201, 202, and 203, to that required by the heat exchanger network shown in FIG. 43, a retrofit to convert to the heat exchanger network to that shown in either of FIG. 41, 42, or 43, can be readily made in response to a cost benefit analysis between the different (e.g., progressively higher) capital costs of each of the respective three heat exchanger networks and different (e.g., progressively higher) energy utility savings.

In this illustration, assume that the network shown in FIG. 40 is to be retrofitted to form the network shown in FIG. 42. To perform the retrofit, having the necessary real estate already reserved, decision-makers can readily access the previously determined topology to provide the requirements and parameters. In this illustration, the heat exchangers 202 and 203 are upgraded to carry more load/duty and the heating utility heat exchanger 221 can be either bypassed or retired.

It is important to note that while the foregoing embodiments of the present invention have been described in the context of a fully functional system and process, those skilled in the art will appreciate that the mechanism of at least portions of the present invention and/or aspects thereof are capable of being distributed in the form of a computer readable medium storing a set of instructions in a variety of forms for execution on a processor, processors, or the like, and that embodiments of the present invention apply equally regardless of the particular type of signal bearing media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, certain digital and analog communication links capable of storing the set of instructions. Such media can contain, for example, both operating instructions and the operations instructions described previously with respect to the program product 51, and the computer executable portions of the method steps according to the various embodiments of a method of synthesizing a heat exchanger network, described above.

For example, a computer readable medium that is readable, for example, by heat exchanger network synthesizing computer 31 to synthesize a grass-roots heat exchanger network can include instructions that when executed by the computer 31 cause the computer 31 to perform the operations of receiving operational attribute data for each hot and cold stream in a process, a list or other table of stream initial types, and a list or other table of non-thermodynamic constraints, matching at least a subset of the hot process streams and the cold process streams to attain one or more global utilities targets (e.g., utilities energy consumption targets), and determining an initial heat exchanger network design responsive to matching at least a subset of the plurality of hot process streams and the plurality of cold process streams.

The operations can also include removing any redundant process-to-process heat exchangers from the initial design, when existing, responsive to determining an initial heat exchanger network design, merging same-stream utility heat exchangers when two or more same-stream utility heat exchangers exist responsive to determining an initial heat exchanger network design, and providing a final heat exchanger network design responsive to one or more of the following: determining an initial heat exchanger network design, removing any redundant process to process heat exchangers from the initial design, when existing, and merging two or more same-stream utility heat exchangers, when existing.

The operations, according to another embodiment of the computer readable medium, can include receiving a plurality of operational attributes for each of a plurality of hot and cold process streams, a list of one or more non-thermodynamic streams matching constraints, and optionally a list of stream initial types, matching at least a subset of the plurality of hot process streams and (to) the plurality of cold process streams to attain the plurality of utilities energy consumption targets, and providing a heat exchanger network design responsive to the matching.

The operations, according to another embodiment of the computer readable medium, can include determining an initial heat exchanger network design using a set of initial minimum temperature approach values $\{\Delta T_{min}^i\}$, determining a plurality of additional heat exchanger network designs responsive to a corresponding plurality of sets of successively lower minimum temperatures approach values $\{\Delta T_{min}^i\}$; and identifying a set of a plurality of common-structure heat exchanger network designs having a network structure formed of a common process-to-process heat exchanger structure (or common heat exchanger network structure) that is substantially the same as that of each other of the plurality of common-structure heat exchanger designs but collectively different in load allocation therebetween.

The operations can also include selecting one of the plurality of common-structure heat exchanger network designs satisfying current user-selected economic criteria to thereby construct a selected physical heat exchanger network satisfying the current user-selected economic criteria and having a topology that can be readily retrofitted to match at least one other of the plurality of common-structure heat exchanger network designs located in a continuum between the selected one of the plurality of common-structure heat exchanger network designs and either the "least" heat exchanger populated one of the, plurality of common-structure heat exchanger designs or the "most" heat exchanger populated one of the plurality of common-structure heat exchanger designs.

Various embodiments of the present invention beneficially have several significant capabilities. For example, an embodiment of a method (and system and program product), introduces a systematic process for grassroots heat exchangers network synthesis with easy-to-implement future retrofit in mind to account for changes in load demands due to the on going changes in the trade-off between capital cost and energy cost. The method provides for keeping the designer in control for the synthesis of the network, without forcing the designer to use assumptions that confine the synthesized network to specific inferior structures due to the use of inconclusive superstructure as currently used in the mathematical programming-based software. Beneficially, the method can be applied to industrial-size problems, can allow the designer to test his/her novel solutions for network synthesis that suffer constrained situations that affect energy consumption which are normally faced in industrial applications, and can render a lesser number of units for the same energy targets compared with the pinch design method for the problems that exhibit multiple pinches and pinch with near pinch applications. According to another embodiment of the present invention, the method is automated in program product to facilitate designing an optimal energy recovery system in industrial facilities. Application of various aspects of embodiments of the present invention can beneficially provide user companies with an advantage over other non-using companies from energy efficiency consumption and pollution minimization points of view in designing and operating their facilities. It is expected that one or more embodiments of the present invention can provide the user an estimated 5% improvement in energy efficiency optimization beyond that currently obtained using the state-of-art tools and technology, which can translate to a saving of tens of millions of dollars per year to a large industrial company in energy consumption and a substantial saving in projects capital.

This application is a non-provisional of U.S. Provisional Patent Application No. 61/256,754, filed Oct. 30, 2009, titled "System, Method, and Program Product for Synthesizing Non-Constrained and Constrained Heat Exchanger Networks and Identifying Optimal Topology for Future Retrofit"; and is related to U.S. patent application Ser. No. 12/575,743, filed Oct. 8, 2009, titled "System, Method, and Program Product for Targeting and Identification of Optimal Process Variables in Constrained Energy Recovery Systems"; U.S. patent application Ser. No. 12/767,275, filed Apr. 26, 2010, titled "System, Method, and Program Product for Synthesizing Non-Thermodynamically Constrained Heat Exchanger Networks," U.S. patent application Ser. No. 12/767,315, filed Apr. 26, 2010, titled "System, Method, and Program Product for Synthesizing Heat Exchanger Networks and Identifying Optimal Topology for Future Retrofit," U.S. patent application Ser. No. 12/715,255 filed Mar. 1, 2010, titled "System, Method and Program Product For Targeting and Optimal Driving Force Distribution in Energy Recovery Systems," U.S. patent application Ser. No. 11/768,084, filed Jun. 25, 2007, now U.S. Pat. No. 7,698,022, titled "System, Method, and Program Product for Targeting an Optimal Driving Force Distribution in Energy Recovery Systems," and U.S. Patent Application No. 60/816,234, filed Jun. 23, 2006, titled "Method and Program Product for Targeting and Optimal Driving Force Distribution in Energy Recovery Systems," each incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. This invention is not to be construed as limited to the particular forms or embodiments disclosed, since these are regarded as illustrative rather than restrictive. It will be apparent, however, that various modifications and changes can be made within the spirit and scope of the invention as described in the foregoing specification. For example, various embodiments of the present invention were described as providing process-to-utility stream matching to define or select utility types and temperatures and to foam or select a design whereby the cold water from a utility that has been heated during a process of cooling a hot stream changes identity to become a newly generated hot stream that needs to be cooled. It should be understood that the same philosophy can be readily applied, for example, to steam condensate produced at different pressures/temperature levels.

That claimed is:

1. A system to synthesize a grass-roots heat exchanger network for a plurality of hot process streams to be cooled and a plurality of cold process streams to be heated according to a plurality of utilities targets, the system comprising:
   a heat exchange network synthesizing computer having a processor and memory in communication with the processor to store software and database records therein;
   at least one database stored in memory accessible to the energy modeling computer, comprising:
      a plurality of sets of values each separately defining a potential range of values for a corresponding plurality of operational attributes for each of a plurality of hot resource streams,
      a plurality of sets of values each separately defining a potential range of values for a corresponding plurality of operational attributes for each of a plurality of cold resource streams,
      indicia of stream initial types for each of the plurality of hot process streams and each of a plurality of cold process streams, and
      indicia of one or more non-thermodynamically constrained hot process streams of the plurality of hot process streams each constrained from matching at least one of the plurality of cold process streams to define one or more forbidden matches;
   heat exchange network synthesizing program product stored in the memory of the exchange network synthesizing computer to synthesize a grass-roots heat exchanger network for the plurality of hot process streams to be cooled and the plurality of cold process streams to be heated, the program product including instructions that when executed by the heat exchange network synthesizing computer cause the computer to perform the operations of:
      receiving a plurality of operational attributes including a heat capacity flow rate, a supply temperature, and a target temperature for each of the plurality of hot process streams and for each of the plurality of cold process streams,
      receiving indicia of at least one minimum temperature approach value for each of the plurality of the hot process streams, the at least one minimum temperature approach value for each of the plurality of hot process streams comprising indicia of one or more of the following:
- a plurality of discrete stream-specific minimum temperature approach values each separately assigned to a different one of the plurality of hot process streams, at least one of the stream-specific minimum temperature approach values assigned to a corresponding at least one of the plurality of hot process streams being different from at least one other of the plurality of stream-specific minimum temperature approach values assigned to a corresponding at least one other of the plurality of hot process streams,
- a plurality of sets of at least two stream-specific minimum temperature approach values defining a range of stream-specific minimum temperature approach values, each of the plurality of sets of at least two stream-specific minimum temperature approach values separately assigned to a different one of the plurality of hot process streams, and
- a plurality of sets of dual stream minimum temperature approach values each separately assigned to a different one of the plurality of hot process streams;

matching the plurality of hot process streams and the plurality of cold process streams to attain one or more utilities energy consumption targets, the matching including a matching scheme comprising the operation of:
  matching each hot process stream of the plurality of hot process streams having a higher starting temperature to a cooler stream prior to matching each other hot process stream of the plurality of hot process streams having a cooler starting temperature;
determining an initial heat exchanger network design responsive to the operation of matching the plurality of hot process streams and the plurality of cold process streams;
removing any redundant process-to-process heat exchangers from the initial design when so existing responsive to the operation of determining an initial heat exchanger network design;
merging same-stream utility heat exchangers, when two or more same-stream utility heat exchangers exist responsive to the operation of determining an initial heat exchanger network design; and
providing a final heat exchanger network design responsive to one or more of the operations of: determining an initial heat exchanger network design, removing any redundant process to process heat exchangers from the initial design when so existing, and merging two or more same-stream utility heat exchangers when so existing.

2. A system as defined in claim 1, wherein the plurality of hot process streams is a first plurality of hot process streams, wherein the plurality of cold process streams is a first plurality of cold process streams, and wherein the matching scheme further comprises the operation of:
  specifically matching each of a second plurality of the hot process streams with a corresponding separate one of a second plurality of the cold process streams having a heating requirement substantially equal to a cooling requirement for the respective hot process stream when so existing.

3. A system as defined in claim 1, wherein the plurality of hot process streams is a first plurality of hot process streams, wherein the plurality of cold process streams is a first plurality of cold process streams, and wherein the matching scheme further comprises the operation of:
  specifically matching each of a second plurality of hot process streams with a corresponding separate one of a second plurality of the cold process streams having a maximum overlap with the respective hot process stream when so existing.

4. A system as defined in claim 1, wherein the plurality of hot process streams is a first plurality of hot process streams, wherein the plurality of cold process streams is a first plurality of cold process streams, and wherein the matching scheme further comprises the operation of:
  specifically matching each of a second plurality of the hot process streams with a corresponding separate one of a second plurality of the cold process streams having substantially equal heat capacity flow rates with the respective hot process stream when so existing.

5. A system as defined in claim 1, wherein the plurality of hot process streams is a first plurality of hot process streams, wherein the plurality of the cold process streams is a first plurality of cold process streams, and wherein the matching scheme further comprises one or more of the following operations:
  specifically matching each of a second plurality of the hot process streams each having a high heat capacity flow rate and high overall heat transfer coefficient with a corresponding separate one of a second plurality of the cold process streams each having a low heat capacity flow rate and low overall heat transfer coefficient; and
  specifically matching each of the second plurality of the hot process streams each having a low heat capacity flow rate and low overall heat transfer coefficient with a corresponding separate one of the second plurality of the cold process streams each having a high heat capacity flow rate and high overall heat transfer coefficient.

6. A system as defined in claim 1, wherein the matching scheme further comprises one or more of the following operations:
  specifically matching one of the plurality of cold process streams with one or more other of the plurality of cold process streams to achieve one or more utility optimization objectives; and
  specifically matching one of the plurality of hot process streams with one or more other of the plurality of hot process streams to achieve one or more utility optimization objectives.

7. A system as defined in claim 1, wherein the matching scheme further comprises performing one or more of the following operations:
  converting a pair of stream types of a pair of the plurality of hot process streams from being heterogeneous with mono-matching capability to being homogeneous and having bi-matching capability; and
  converting a pair of stream types of a pair of the plurality of cold process streams from being heterogeneous with mono-matching capability to being homogeneous and having bi-matching capability.

8. A system as defined in claim 1, wherein the matching scheme further comprises performing one or more of the following operations:
  splitting one of the plurality of hot process streams into a plurality of hot process sub-streams for the respective hot process stream, and matching one of the plurality of hot process sub-streams with a cold process stream or sub-stream to enhance heat transfer between streams to be matched; and splitting one of the plurality of cold process streams into a plurality of cold process sub-streams for the respective cold process stream, and matching one of the plurality of cold process sub-streams with a hot process stream or sub-stream to enhance heat transfer between streams to be matched.

9. A system as defined in claim 1, wherein the matching scheme further comprises performing one or more of the following operations:

switching a stream target temperature for a corresponding process stream from a desired target temperature value to an alternate target temperature value to provide the process stream an added heating, or cooling capability respectively for processing to achieve one or more utility optimization objectives directly affected by application of the alternative target temperature value that at least partially offsets an inefficiency resulting from one or more non-thermodynamic stream matching constraints and returning the temperature value of the corresponding process stream to the desired target temperature value; and switching a stream supply temperature for a corresponding process stream from an actual supply temperature value to an alternate supply temperature value to provide the process stream an added heating or cooling capability respectively for processing to achieve one or more utility optimization objectives directly affected by application of the alternative supply temperature value that at least partially offsets an inefficiency resulting from the one or more non-thermodynamic stream matching constraints and returning the temperature value of the corresponding process stream to the actual supply temperature value.

10. A system as defined in claim 1, wherein the program product further includes instructions that when executed by the heat exchange network synthesizing computer cause the computer to further perform the operations of:

identifying one or more utility energy consumption targets;

identifying operational attributes of resource streams used within an industrial process in which affect the number of heat exchangers units used in the process;

identifying a low-quality utility suitable to replace at least a portion of a load on a high-quality utility to thereby minimize overall utilities costs; and increasing the number of required heat exchangers responsive to the operation of identifying the low-quality utility.

11. Heat exchange network synthesizing program product to synthesize a grass-roots heat exchanger network for a plurality of hot process streams to be cooled and a plurality of cold process streams to be heated, the program product comprising a set of instructions, stored on a tangible computer readable medium, that when executed by a computer, cause the computer to perform the operations of:

matching a plurality of hot process streams and a plurality of cold process streams to attain one or more utilities energy consumption targets, the matching including a matching scheme comprising the operations of:

matching each hot process stream of the plurality of hot process streams having a higher starting temperature to a cooler stream prior to matching each other hot process stream of the plurality of hot process streams having a cooler starting temperature to thereby facilitate matching steam pairs at a same temperature interval where a temperature approach between the respective hot process stream to be matched and corresponding cold process stream is at a minimum, and specifically matching each of a plurality of the hot process streams with a corresponding one of a plurality of the cold process streams having substantially equal heat capacity flow rates with the respective hot process stream when so existing as an alternative to matching said plurality of the hot process streams with said plurality of the cold process streams having a maximum temperature range overlap therebetween, the matched hot process and cold process streams being matched at the same temperature interval; and determining a heat exchanger network design responsive to the operation of matching a plurality of hot process streams and a plurality of cold process streams.

12. Program product as defined in claim 11, wherein the heat exchanger network design is an initial each heat exchanger network design, and wherein the operations further comprise:

removing any redundant process-to-process heat exchangers from the initial design when so existing responsive to the operation of determining an initial heat exchanger network design;

merging same-stream utility heat exchangers when two or more same-stream utility heat exchangers exist responsive to the operation of determining an initial heat exchanger network design; and providing a final heat exchanger network design responsive to one or more of the operations of: determining an initial heat exchanger network design, removing any redundant process to process heat exchangers from the initial design when so existing, and merging two or more same-stream utility heat exchangers when so existing.

13. Program product as defined in claim 11, wherein the matching scheme further comprises one or more of the following operations:

specifically matching each of a plurality of the hot process streams with a corresponding separate one of a plurality of the cold process streams having a heating requirement substantially equal to a cooling requirement for the respective hot process stream when so existing; and specifically matching each of a plurality of hot process streams with a corresponding separate one of a plurality of the cold process streams having a maximum temperature range overlap with the respective hot process stream when so existing.

14. Program product as defined in claim 11, wherein the matching scheme further comprises one or more of the following operations:

specifically matching one of the plurality of cold process streams with one or more other of the plurality of cold process streams to achieve one or more utility optimization objectives; and specifically matching one of the plurality of hot process streams with one or more other of the plurality of hot process streams to achieve one or more utility optimization objectives.

15. Heat exchange network synthesizing program product to synthesize a grass-roots heat exchange network for a plurality of hot process streams to be cooled and a plurality of cold process streams to be heated, the program product comprising a set of instructions, stored on a tangible computer readable medium, that when executed by a computer, cause the computer to perform the operations of:

matching a plurality of hot process streams and a plurality of cold process streams to attain one or more utilities energy consumption targets, the matching including a matching scheme comprising the operations of:

matching each hot process stream of the plurality of hot process streams having a higher starting temperature to a cooler stream prior to matching each other hot process stream of the plurality of hot process streams having a cooler starting temperature, specifically matching each of a plurality of the hot process streams having a high heat capacity flow rate and high overall heat transfer coefficient with a corresponding separate one of a plurality of the cold process streams each having a low heat capacity flow rate and low overall heat transfer coefficient, and specifically matching each of a plurality of the hot process streams having a low heat capacity flow rate and low overall heat transfer coefficient with a corresponding separate one of a plurality of the cold process streams each having a high heat capacity flow rate and high overall heat transfer coefficient; and determining a heat exchanger network design responsive to the operation of matching a plurality of hot process streams and a plurality of cold process streams.

16. Heat exchange network synthesizing program product to synthesize a grass-roots heat exchange network for a plurality of hot process streams to be cooled and a plurality of cold process streams to be heated, the program product comprising a set of instructions, stored on a tangible computer readable medium, that when executed by a computer, cause the computer to perform the operations of:

matching a plurality of hot process streams and a plurality of cold process streams to attain one or more utilities energy consumption targets, the matching including a matching scheme comprising the operations of:

matching each hot process stream of the plurality of hot process streams having a higher starting temperature to a cooler stream prior to matching each other hot process stream of the plurality of hot process streams having a cooler starting temperature, employing stream identity as an optimization variable to include: converting one of the plurality of hot process streams from being heterogeneous with mono-matching capability to being homogeneously and having bi-matching capability, the respective hot process stream being heterogeneously matched with a cold process stream of the plurality of cold process streams, the conversion including changing an identity of the respective hot process stream from being a hot process stream to that of being a cold process stream at a certain temperature level, excessively cooling the hot process stream to a temperature below an assigned target temperature, assigning the excessively cooled portion a cold stream of the plurality of hot process streams having a non-thermodynamic constraint to thereby heat the excessively cooled portion to a temperature at or above the assigned target temperature, and converting one of the plurality of cold process streams from being heterogeneous with mono-matching capability to being homogeneous and having bi-matching capability, the respective cold process stream being heterogeneously matched with a hot process stream of the plurality of hot process steams, the conversion including changing an identity of the respective cold process stream from being a cold process stream to that of being a hot process stream at a certain temperature level, excessively heating the cold process stream to a temperature above an assigned target temperature, assigning the excessively heated portion a hot stream identity, and matching the excessively heated portion to a cold process stream of the plurality of cold process streams having a non-thermodynamic constraint to thereby cool the excessively heated portion to a temperature at or below the assigned target temperature: and determining a heat exchanger network design responsive to the operation of a matching a plurality of hot process streams and a plurality of cold process streams.

17. Heat exchange network synthesizing program product to synthesize a grass-roots heat exchange network for a plurality of hot process streams to be cooled and a plurality of cold process streams to be heated, the program product comprising a set of instructions, stored on a tangible computer readable medium, that when executed by a computer, cause the computer to perform the operations of:

matching a plurality of hot process streams and a plurality of cold process streams to attain one or more utilities energy consumption targets, the matching including a matching scheme comprising the operations of:

matching each hot process stream of the plurality of hot process streams having a higher starting temperature to a cooler stream prior to matching each other hot process stream of the plurality of hot process streams having a cooler starting temperature, splitting one of the plurality of hot process streams into a plurality of hot process sub-streams for the respective hot process stream, heterogeneously matching one of the plurality of hot process sub-streams with a cold process stream or sub-stream, and homogeneously matching another of the plurality of hot process sub-streams, with a hot process stream or sub-stream to enhance heat transfer between streams to be matched, and splitting one of the plurality of cold process streams into a plurality of cold process sub-streams for the respective cold process stream, heterogeneously matching one of the plurality of cold process sub-streams with a hot process stream or sub-stream and homogeneously matching another of the plurality of cold process sub-streams with a cold process stream or sub-stream to enhance heat transfer between streams to be matched; and determining a heat exchanger network design responsive to the operation of matching a plurality of hot process streams and a plurality of cold process streams.

18. Heat exchange network synthesizing program product to synthesize a grass-roots heat exchange network for a plurality of hot process streams to be cooled and a plurality of cold process streams to be heated, the program product comprising a set of instructions, stored on a tangible computer readable medium, that when executed by a computer, cause the computer to perform the operations of:

matching a plurality of hot process streams and a plurality of cold process streams to attain one or more utilities energy consumption targets, the matching including a matching scheme comprising the operations of:

matching each hot process stream of the plurality of hot process streams having a higher starting temperature to a cooler stream prior to matching each other hot process stream of the plurality of hot process streams having a cooler starting temperature, switching a stream target temperature for a corresponding process stream from a desired target temperature value to an alternate target temperature value to provide the process stream an added heating or cooling capability respectively for processing to achieve one or more utility optimization objectives directly affected by application of the alternative target temperature value that at least partially offsets an inefficiency resulting from one or more non-thermodynamic stream matching constraints, and returning the temperature value for the corresponding process stream to the desired target temperature value; and determining a heat exchanger network design responsive to the operation of matching a plurality of hot process streams and a plurality of cold process streams.

19. Heat exchange network synthesizing program product to synthesize a grass-roots heat exchange network for a plurality of hot process streams to be cooled and a plurality of cold process streams to be heated, the program product comprising a set of instructions, stored on a tangible computer readable medium, that when executed by a computer, cause the computer to perform the operations of:

matching a plurality of hot process streams and a plurality of cold process streams to attain one or more utilities energy consumption targets, the matching including a matching scheme comprising the operations of:

matching each hot process stream of the plurality of hot process streams having a higher starting temperature to a cooler stream prior to matching each other hot process stream of the plurality of hot process streams having a cooler starting temperature, switching a stream supply temperature for a corresponding process stream from an actual supply temperature value to an alternate supply temperature value to provide the process stream an added heating or cooling capability respectively for processing to achieve one or more utility optimization objectives directly affected by application of the alternative supply temperature value that at least partially offsets an inefficiency resulting from the one or more non-thermodynamic stream matching constraints, and returning the temperature value for the corresponding process stream to the actual supply temperature value; and determining a heat exchanger network design responsive to the operation of a matching a plurality of hot process streams and a plurality of cold process streams.

20. A method of synthesizing a grass-roots heat exchanger network for a plurality of hot process streams to be cooled and a plurality of cold process streams to be heated according to a plurality of utilities targets, the method comprising the steps of:

receiving by a computer a plurality of operational attributes for each of a plurality of hot process streams and for each of a plurality of cold process streams, and indicia at least one minimum temperature approach value for each of the plurality of the hot process streams;

matching by the computer, the plurality of hot process streams and the plurality of cold process streams to attain one or more utilities energy consumption targets, the matching including a matching scheme comprising the step of:

matching each hot process stream of the plurality of hot process streams having a higher starting temperature prior to matching any other hot process stream of the plurality of hot process streams having a cooler starting temperature to any other cooler stream to thereby facilitate matching stream pairs at a same temperature interval where a temperature approach between the respective hot process stream to be matched and corresponding cold process stream is at a minimum, and specifically matching each of a plurality of the hot process streams with a corresponding one of a plurality of the cold process streams having substantially equal heat capacity flow rates with the respective hot process stream when so existing as an alternative to matching said plurality of the hot process streams with said plurality of the cold process streams having a maximum temperature range overlap therebetween, the matched hot process and cold process streams being matched at the same temperature interval; and determining a heat exchanger network design responsive to the step of matching the plurality of hot process streams and a plurality of cold process streams.

21. A method as defined in claim 20, wherein the heat exchanger network design is an initial exchanger network design, and where the method further comprises the steps of:

removing any redundant process-to-process heat exchangers from the initial design when so existing responsive to the step of determining an initial heat exchanger network design;

merging same-stream utility heat exchangers, when two or more same-stream utility heat exchangers exist responsive to the step of determining an initial heat exchanger network design; and providing a final heat exchanger network design responsive to one or more of the steps of: determining an initial heat exchanger network design, removing any redundant process to process heat exchangers from the initial design when so existing, and merging two or more same-stream utility heat exchangers when so existing.

22. A method as defined in claim 20, wherein the matching scheme further comprises the step of:

specifically matching each of a plurality of the hot process streams with a corresponding separate one of a plurality of the cold process streams having a heating requirement substantially equal to a cooling requirement for the respective hot process stream when so existing.

23. A method as defined in claim 20, wherein the matching scheme further comprises the step of:

specifically matching each of a plurality of the hot process streams with a corresponding separate one of a plurality of the cold process streams having a maximum overlap with the respective hot process stream when so existing.

24. A method as defined in claim 20, wherein the matching scheme further comprises one or more of the following steps:

specifically matching one of the plurality of cold process streams with one or more other of the plurality of cold process streams to achieve one or more utility optimization objectives; and specifically matching one of the plurality of hot process streams with one or more other of the plurality of hot process streams to achieve one or more utility optimization objectives.

25. A method of synthesizing a grass-roots heat exchanger network for a plurality of hot process streams to be cooled and a plurality of cold process streams to be heated according to a plurality of utilities targets, the method comprising the steps of:

receiving by a computer a plurality of operational attributes for each of a plurality of hot process streams and for each of a plurality of cold process streams, and indicia at least one minimum temperature approach value for each of the plurality of the hot process streams, the at least one minimum temperature approach value for each of the plurality of hot process streams comprising one or more of the following:

a plurality of discrete stream-specific minimum temperature approach values each separately assigned to a different one of the plurality of hot process streams, at least one of the stream-specific minimum temperature approach values assigned to a corresponding at least one of the plurality of hot process streams being different from at least one other of the plurality of stream-specific minimum temperature approach values assigned to a corresponding at least one other of the plurality of hot process streams;

a plurality of sets of at least two stream-specific minimum temperature approach values defining a range of stream-specified minimum temperature approach values, each of the plurality of sets of at least two stream-specific minimum temperature approach values separately assigned to a different one of the plurality of hot process streams; and a plurality of sets of dual stream minimum temperature approach values each separately assigned to a different one of the plurality of hot process streams;

matching by the computer, the plurality of hot process streams and the plurality of cold process streams to attain one or more utilities energy consumption targets, the matching including a matching scheme comprising the step of:

matching each hot process stream of the plurality of hot process streams having a higher starting temperature prior to matching each other hot process streams of the plurality of hot process streams having a cooler starting temperature; and determining a heat exchanger network design responsive to the step of matching the plurality of hot process streams and the plurality of cold process streams.

26. A method of synthesizing a grass-roots heat exchanger network for a plurality of hot process streams to be cooled and a plurality of cold process streams to be heated according to a plurality of utilities targets, the method comprising the steps of:

receiving by a computer a plurality of operational attributes for each of a plurality of hot process streams and for each of a plurality of cold process streams, and indicia at least one minimum temperature approach value for each of the plurality of the hot process streams;

matching by the computer, the plurality of hot process streams and the plurality of cold process streams to attain one or more utilities energy consumption targets, the matching including a matching scheme comprising the step of:

matching each hot process stream of the plurality of hot process streams having a higher starting temperature to a cooler stream prior to matching any other hot process stream of the plurality of hot process streams having a cooler starting temperature, specifically matching each of a plurality of the hot process streams having a high heat capacity flow rate and high overall heat transfer cofficient with a corresponding separate one of a plurality of the cold process streams each having a low heat capacity flow rate and low overall heat transfer coefficient, and specifically matching each of a plurality of the hot process streams having a low heat capacity flow rate and low overall heat transfer cofficient with a corresponding separate one of a plurality of the cold process streams each having a high heat capacity flow rate and high overall heat transfer coefficient; and determining a heat exchanger network design responsive to the step of matching the plurality of hot process streams and the plurality of cold process streams.

27. A method of synthesizing a grass-roots heat exchanger network for a plurality of hot process streams to be cooled and a plurality of cold process streams to be heated according to a plurality of utilities targets, the method comprising the steps of:

receiving by a computer a plurality of operational attributes for each of a plurality of hot process streams and for each of a plurality of cold process streams, and indicia at least one minimum temperature approach value for each of the plurality of the hot process streams;

matching by the computer, the plurality of hot process streams and the plurality of cold process streams to attain one or more utilities energy consumption targets, the matching including a matching scheme comprising the step of:

matching each hot process stream of the plurality of hot process streams having a higher starting temperature to a cooler stream prior to matching any other hot process stream of the plurality of hot process streams having a cooler starting temperature, employing stream identity as an optimization variable to include: converting one of the plurality of hot process streams from being heterogeneous with mono-matching capability to being homogeneous and having bi-matching capability, the respective hot process stream being heterogeneously matched with a cold process stream of the plurality of cold process streams, the conversion including changing an identity of the respective hot process stream from being a hot process stream to that of being a cold process stream at a certain temperature level, excessively cooling the hot process stream to a temperature below an assigned target temperature assigning the excessively cooled portion a cold stream identity, and homogeneously matching the excessively cooled portion to a hot process stream of the plurality of hot process streams having a non-therodynamic constraint to thereby heat the excessively cooled portion to a temperature at or above the assigned target temperature, and converting one of the plurality of cold process streams from being heterogeneous with mono-matching capability to being homogeneous and having bi-matching capability, the respective cold process stream being heterogengously matching with a hot process stream of the plurality of hot process streams, the conversion including changing an identity of the respective cold process stream from being a cold process stream to that of being a hot process stream at a certain temperature level, excessively heating the cold process stream to a temperature above an assigned target temperature, assigned the excessively heated portion a hot stream identity, and matching the excessively heating portion to a cold process stream of the plurality of cold process streams having a non-thermodynamic constraint to thereby cool the excessively heated portion to a temperature at or below the assigned target temperature; and determining a heat exchanger network design responsive to the step of matching the plurality of hot process streams and a plurality of cold process streams.

28. A method of synthesizing a grass-roots heat exchanger network for a plurality of hot process streams to be cooled and a plurality of cold process streams to be heated according to a plurality of utilities targets, the method comprising the steps of:

receiving by a computer a plurality of operational attributes for each of a plurality of hot process streams and for each of a plurality of cold process streams, and indicia at least one minimum temperature approach value for each of the plurality of the hot process streams;

matching by the computer, the plurality of hot process streams and the plurality of cold process streams to attain one or more utilities energy consumption targets, the matching including a matching scheme comprising the step of:

matching each hot process stream of the plurality of hot process streams having a higher starting temperature prior to matching each other hot process stream of the plurality of hot process streams having a cooler starting temperature, at least partially offsetting an inefficiency resulting from one or more non-thermodynamic stream matching constraints by performing the following sub-steps: switching a stream target temperature for a corresponding process stream from a desired target temperature value to an alternate target temperature value to provide the process stream an added heating or cooling capability respectively for processing to achieve one or more utility optimization objectives directly affected by application of the alternative target temperature value that at least partially offsets the inefficiency resulting from one or more non-thermodynamic stream matching constraints, and returning the temperature value of the corresponding process stream to the desired target temperature value, and at least partially offsetting an inefficiency resulting from one or more non-thermodynamic stream matching constraints by performing the following substeps: switching a stream supply temperature for a corresponding process stream from an actual supply temperature value to an alternate supply temperature value to provide the process stream an added heating or cooling capability respectively for processing to achieve one or more utility optimization objectives directly affected by application of the alternative supply temperature value that at least partially offsets the inefficiency resulting from the one or more non-thermodynamic stream matching constraints, and returning the temperature value of the corresponding process stream to the actual supply temperature value; and determining a heat exchanger network design responsive to the step of matching the plurality of hot process streams and a plurality of cold process streams.

29. A method of synthesizing a grass-roots heat exchanger network for a plurality of hot process streams to be cooled and a plurality of cold process streams to be heated according to a plurality of utilities targets, the method comprising the steps of:

receiving by a computer a plurality of operational attributes including a heat capacity flow rate, a supply temperature, and a target temperature for each of a first plurality of hot process streams and for each of a first plurality of cold process streams, and indicia of at least one minimum temperature approach value for each of the first plurality of the hot process streams, the at least one minimum temperature approach value for each of the first plurality of hot process streams comprising one or more of the following:

a plurality of discrete stream-specific minimum temperature approach values each separately assigned to a different one of the first plurality of hot process streams, at least one of the stream-specific minimum temperature approach values assigned to a corresponding at least one of the first plurality of hot process streams being different from at least one other of the plurality of stream-specific minimum temperature approach values assigned to a corresponding at least one other of the first plurality of hot process streams, a plurality of sets of at least two stream-specific minimum temperature approach values defining a range of stream-specific minimum temperature approach values, each of the plurality of sets of at least two stream-specific minimum temperature approach values separately assigned to a different one of the first plurality of hot process streams, and a plurality of sets of dual stream minimum temperature approach values each separately assigned to a different one of the first plurality of hot process streams;

matching by the computer, the first plurality of hot streams and the first plurality of cold streams to attain one or more utilities energy consumption targets, the matching including a matching scheme comprising the steps of:

specifically matching each hot process stream of the first plurality of hot process streams having a higher starting temperature prior to matching each other hot process stream of the first plurality of hot process streams having a cooler starting temperature, specifically matching each of a second plurality of the hot process streams with a corresponding one of a second plurality of the cold process streams having a heating requirement substantially equal to a cooling requirement for the respective hot process stream when so existing, specifically matching each of a third plurality of the hot process streams with a corresponding one of a third plurality of the cold process streams having a maximum overlap with the respective hot process stream when so existing, specifically matching each of a fourth plurality of the hot process streams with a corresponding one of a fourth plurality of the cold process streams having substantially equal heat capacity flow rates with the respective hot process stream when so existing, and specifically matching each of a fifth plurality of the hot process streams each having a high heat capacity flow rate and high overall heat transfer coefficient with a fifth plurality of the cold process stream each having a low heat capacity flow rate and low overall heat transfer coefficient; and determining an initial heat exchanger network design responsive to the step of matching the plurality of hot process streams and the plurality of cold process streams.

30. A method as defined in claim 29, further comprising the steps of:

removing any redundant process-to-process heat exchangers from the initial design when so existing responsive to the step of determining an initial heat exchanger network design;

merging same-stream utility heat exchangers, when two or more same-stream utility heat exchangers exist responsive to the step of determining an initial heat exchanger network design; and providing a final heat exchanger network design responsive to one or more of the steps of: determining an initial heat exchanger network design, removing any redundant process to process heat exchangers from the initial design when so existing, and merging two or more same-stream utility heat exchangers when so existing.

31. A method as defined in claim 29, further comprising the step of:
converting a pair of stream types of a pair of the first plurality of hot process streams from being heterogeneous with mono-matching capability to being homogeneous and having bi-matching capability.

32. A method as defined in claim 29, further comprising the step of:
converting a pair of stream types of a pair of the first plurality of cold process streams from being heterogeneous with mono-matching capability to being homogeneous and having bi-matching capability.

33. A method as defined in claim 29, further comprising the step of:
splitting one of the first plurality of hot process streams into a plurality of hot process sub-streams for the respective hot process stream, and matching one of the plurality of hot process sub-streams with a cold process stream or sub-stream to enhance heat transfer between streams to be matched.

34. A method as defined in claim 29, further comprising the step of:
splitting one of the first plurality of cold process streams into a plurality of cold process sub-streams for the respective cold process stream, and matching one of the plurality of cold process sub-streams with a hot process stream or sub-stream to enhance heat transfer between streams to be matched.

35. A method as defined in claim 29, further comprising the step of:
switching a stream target temperature of a corresponding process stream from a desired target temperature, value to an alternate target temperature value to provide the process stream an added heating or cooling capability respectively for processing to achieve one or more utility optimization objectives directly affected by application of the alternative target temperature value that at least partially offsets an inefficiency resulting from one or more non-thermodynamic stream matching constraints, and returning the temperature value of the corresponding process stream to the desired target temperature value.

36. A method as defined in claim 29, further comprising the step of:
switching a stream supply temperature of a corresponding process stream from an actual supply temperature value to an alternate supply temperature value to provide the process stream an added heating or cooling capability respectively for processing to achieve one or more utility optimization objectives directly affected by application of the alternative supply temperature value that at least partially offsets an inefficiency resulting from the one or more non-thermodynamic stream matching constraints, and returning the temperature value of the corresponding process stream to the actual supply temperature value.

37. A method as defined in claim 29, further comprising the steps of:
identifying one or more utility energy consumption targets;
identifying operational attributes of resource streams used within an industrial process in which affect the number of heat exchangers units used in the process;
identifying a low-quality utility suitable to replace at least a portion of a load on a high-quality utility to thereby minimize overall utilities costs; and
increasing the number of required heat exchangers responsive to the step of identifying the low-quality utility.

* * * * *

UNITED STATES PATENT AND TRADEMARK OFFICE
CERTIFICATE OF CORRECTION

| | | |
|---|---|---|
| PATENT NO. | : 8,032,262 B2 | Page 1 of 2 |
| APPLICATION NO. | : 12/767217 | |
| DATED | : October 4, 2011 | |
| INVENTOR(S) | : Mahmoud Bahy Noureldin | |

It is certified that error appears in the above-identified patent and that said Letters Patent is hereby corrected as shown below:

Column 41, line 13, delete the "," after the word 'heating'; and on line 64, delete "steam" and insert --stream--.

Column 42, line 15, delete the word "each"; and on line 58, delete "exchange" and insert --exchanger--.

Column 43, line 22, delete "exchange" and insert --exchanger--; on line 40, delete "homogeneously" and insert --homogeneous--; on line 50, insert the following after 'cold stream': --identity, and homogeneously matching the excessively cooled portion to a hot process stream--; and on the line 60, delete "steam" and insert --stream--.

Column 44, line 5, delete the ":" and insert --;--; on line 7, delete the "a" after the word 'of'; on line 10, delete "exchange" and insert --exchanger--; on line 31, delete the ","; and on line 47, delete "exchange" and insert --exchanger--.

Column 45, line 12, delete "exchange" and insert --exchanger--; and on line 42, delete the "a" after the word 'of'.

Column 46, line 13, delete the "a" and insert --the--; and on line 15, insert --heat-- after the word 'initial'.

Column 47, line 12, delete "specified" and insert --specific--; on line 29, delete "streams" and insert --stream--; on line 50, delete "step" and insert --steps--; on line 53, delete "any" and insert --each--; and on lines 58 and 64, delete "cofficient" and insert --coefficient--.

Signed and Sealed this
Sixth Day of December, 2011

David J. Kappos
*Director of the United States Patent and Trademark Office*

CERTIFICATE OF CORRECTION (continued)
U.S. Pat. No. 8,032,262 B2

Column 48, line 19, delete "step" and insert --steps--; on line 22, delete "any" and insert --each--; on line 38, insert a --,-- after the word 'temperature'; on line 42, delete "therodynamic" and insert --thermodynamic--; on line 49, delete "heterogengously matching" and insert --heterogeneously matched--; on line 56, delete "assigned" and insert --assigning--; on line 58, delete "heating" and insert --heated--; and on line 65, delete "a" and insert --the--.

Column 49, line 52, delete "a" and insert --the--.

Column 51, line 37, delete the "," after the word 'temperature'.